(12) United States Patent
Park et al.

(10) Patent No.: US 11,989,363 B2
(45) Date of Patent: May 21, 2024

(54) DISPLAY DEVICE HAVING A PRESSURE SENSOR INCLUDING A PROTRUSION INSERTED IN A WATERPROOF MEMBER

(71) Applicant: Samsung Display Co., Ltd., Yongin-si (KR)

(72) Inventors: Sung Kook Park, Suwon-si (KR); So Hee Park, Cheonan-si (KR); Hee Seomoon, Hwaseong-si (KR); Tae Hee Lee, Hwaseong-si (KR); Won Ki Hong, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/379,737

(22) Filed: Jul. 19, 2021

(65) Prior Publication Data

US 2021/0349568 A1    Nov. 11, 2021

Related U.S. Application Data

(62) Division of application No. 16/410,515, filed on May 13, 2019, now Pat. No. 11,086,438.

(30) Foreign Application Priority Data

Aug. 17, 2018    (KR) .................... 10-2018-0096115

(51) Int. Cl.
*G06F 3/041* (2006.01)
*G06F 3/044* (2006.01)
(52) U.S. Cl.
CPC .......... *G06F 3/0416* (2013.01); *G06F 3/0412* (2013.01); *G06F 3/044* (2013.01); *G06F 2203/04105* (2013.01)

(58) Field of Classification Search
None
See application file for complete search history.

(56) References Cited

U.S. PATENT DOCUMENTS 6,559,831 B1    5/2003  Armstrong
8,654,524 B2    2/2014  Pance et al.
(Continued)

FOREIGN PATENT DOCUMENTS

CN    108234706 A  *  6/2018
JP    2003015797 A  *  1/2003
(Continued)

OTHER PUBLICATIONS

Korean Office Action dated Feb. 7, 2023, in Korean Patent Application No. 10-2018-0096115.
(Continued)

*Primary Examiner* — Kirk W Hermann
(74) *Attorney, Agent, or Firm* — Lewis Roca Rothgerber Christie LLP

(57) ABSTRACT

A display device including a display panel; a pressure sensor disposed under the display panel and including a first protrusion at one side thereof; and a waterproofing member disposed under the display panel and including a first accommodation portion at one side thereof facing the one side. The protrusion of the pressure sensor is disposed to face the first accommodation portion of the waterproofing member, and the first protrusion is inserted in the first accommodation portion.

11 Claims, 43 Drawing Sheets

(56) References Cited

U.S. PATENT DOCUMENTS

| | | | |
|---|---|---|---|
| 9,141,227 B2 | 9/2015 | Hristov et al. | |
| 9,274,660 B2 | 3/2016 | Bernstein et al. | |
| 9,360,894 B1* | 6/2016 | Lin | H01H 13/06 |
| 9,641,920 B1* | 5/2017 | Jones, II | H04R 1/02 |
| 9,924,003 B2 | 3/2018 | Jun et al. | |
| 2008/0018611 A1* | 1/2008 | Serban | H03K 17/975 |
| | | | 345/173 |
| 2009/0008234 A1* | 1/2009 | Tolbert | H03K 17/962 |
| | | | 200/600 |
| 2009/0312051 A1* | 12/2009 | Hansson | G06F 1/1684 |
| | | | 455/556.1 |
| 2010/0079663 A1* | 4/2010 | Kim | G06F 3/0488 |
| | | | 345/173 |
| 2011/0115738 A1 | 5/2011 | Suzuki et al. | |
| 2011/0278078 A1* | 11/2011 | Schediwy | G06F 3/0446 |
| | | | 702/41 |
| 2012/0115551 A1* | 5/2012 | Cho | H04M 1/23 |
| | | | 455/575.8 |
| 2013/0016053 A1* | 1/2013 | Jung | G06F 3/0202 |
| | | | 345/173 |
| 2013/0275057 A1* | 10/2013 | Perlin | G01L 1/205 |
| | | | 702/41 |
| 2013/0307769 A1* | 11/2013 | Sharma | G06F 1/3215 |
| | | | 345/156 |
| 2014/0028575 A1 | 1/2014 | Parivar et al. | |
| 2014/0106814 A1* | 4/2014 | Schmidt | G06F 3/0393 |
| | | | 455/556.1 |
| 2015/0180527 A1 | 6/2015 | Fathollahi | |
| 2015/0221460 A1* | 8/2015 | Teplitxky | H01H 13/06 |
| | | | 29/622 |
| 2016/0041672 A1* | 2/2016 | Hoen | G06F 3/041 |
| | | | 345/173 |
| 2016/0086745 A1* | 3/2016 | Seo | G06F 1/1662 |
| | | | 200/51 R |
| 2017/0118319 A1 | 4/2017 | Jun et al. | |
| 2017/0154741 A1* | 6/2017 | Chen | H04B 1/3833 |
| 2017/0285864 A1* | 10/2017 | Pedder | G06F 3/044 |
| 2017/0372853 A1* | 12/2017 | Taniguchi | H01H 11/045 |
| 2018/0067601 A1* | 3/2018 | Winokur | G06F 3/0414 |
| 2018/0081485 A1 | 3/2018 | Shuma et al. | |
| 2018/0164938 A1 | 6/2018 | Li | |
| 2019/0289108 A1* | 9/2019 | Jo | H01K 13/06 |

FOREIGN PATENT DOCUMENTS

| | | |
|---|---|---|
| JP | 4760758 B2 * | 8/2011 |
| KR | 200356002 Y1 * | 7/2004 |
| KR | 10-2011-0039304 | 4/2011 |
| KR | 10-2017-0046542 | 5/2017 |
| KR | 2017-0053576 | 5/2017 |

OTHER PUBLICATIONS

Non-Final Office Action dated May 21, 2020, in U.S. Appl. No. 16/410,515.
Final Office Action dated Oct. 13, 2020, in U.S. Appl. No. 16/410,515.
Advisory Action dated Dec. 22, 2020, in U.S. Appl. No. 16/410,515.
Notice of Allowance dated Apr. 2, 2021, in U.S. Appl. No. 16/410,515.
Office Action issued from the Korean Patent Office on Jan. 31, 2024, for Korean Patent Application No. 2023-0135008 (with English Translation).

* cited by examiner

DISPLAY DEVICE HAVING A PRESSURE SENSOR INCLUDING A PROTRUSION INSERTED IN A WATERPROOF MEMBER

CROSS REFERENCE TO RELATED APPLICATION

This application is a Divisional of U.S. patent application Ser. No. 16/410,515, filed May 13, 2019, which claims priority from and the benefit of Korean Patent Application No. 10-2018-0096115 filed on Aug. 17, 2018, which are incorporated by reference for all purposes as if fully set forth herein.

BACKGROUND

Field

Exemplary embodiments of the invention relate generally to a display device.

Discussion of the Background

A display device for displaying an image is used for various electronic appliances for providing an image to a user, such as smart phones, tablet PCs, digital cameras, notebook computers, navigators, and televisions. The display device includes a display panel for generating and displaying an image and various input devices.

Recently, in the fields of smart phones and tablet PCs, a touch panel recognizing a touch input has been widely applied to a display device. The current trend in touch panels is to replace the existing physical input device, such as a keypad, because of the convenience of touching. Research has been conducted to implement various inputs by mounting a pressure sensor in addition to the touch panel on a display device.

The above information disclosed in this Background section is only for understanding of the background of the inventive concepts, and, therefore, it may contain information that does not constitute prior art.

SUMMARY

Exemplary embodiments of the invention provide a display device including pressure sensors having various shapes.

Additional features of the invention will be set forth in the description which follows, and in part will be apparent from the description, or may be learned by practice of the invention.

An exemplary embodiment of the invention provides a display device including a display panel; a pressure sensor disposed under the display panel and including a first protrusion at one side thereof; and a waterproofing member disposed under the display panel and including a first accommodation portion at one side thereof facing the one side. The protrusion of the pressure sensor faces the first accommodation portion of the waterproofing member, and the first protrusion is inserted in the first accommodation portion.

Another exemplary embodiment of the invention provides a display device including a cover window including a light transmitting area and a light blocking area; a display panel disposed under the light transmitting area; and a pressure sensor disposed under the light blocking area.

Another exemplary embodiment of the invention provides a display device, including: a display panel; a middle frame disposed under the display panel; a lower cover disposed under the middle frame and including a bottom surface and side surfaces bent upward from the bottom surface; and a pressure sensor disposed on the side surfaces of the lower cover.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
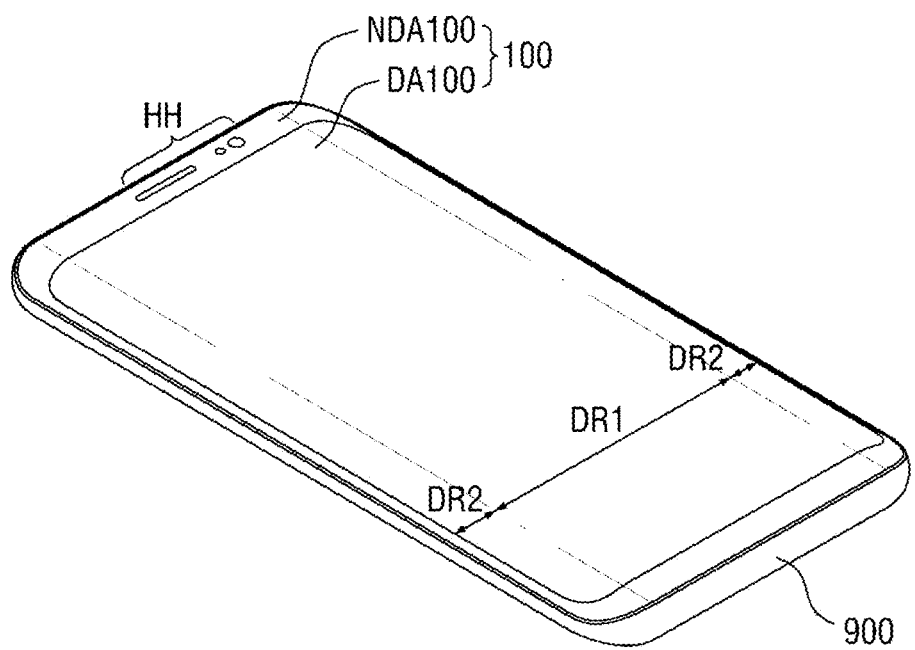
FIG. 1 is a perspective view of a display device according to an exemplary embodiment of the invention.

In the following description, for the purposes of explanation, numerous specific details are set forth in order to provide a thorough understanding of various exemplary embodiments of the invention. As used herein "embodiments" are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As is customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

It will be apparent to those skilled in the art that various modifications and variations can be made to the disclosed embodiments without departing from the spirit and scope of the inventive concepts. Thus, it is intended that the inventive concepts cover the modifications and variations of the disclosed embodiments provided they come within the scope of the appended claims and their equivalents.

Throughout the specification, the same reference numerals are used for the same or similar elements.

Hereinafter, exemplary embodiments of the present invention will be described with reference to the attached drawings.

Figure 2:
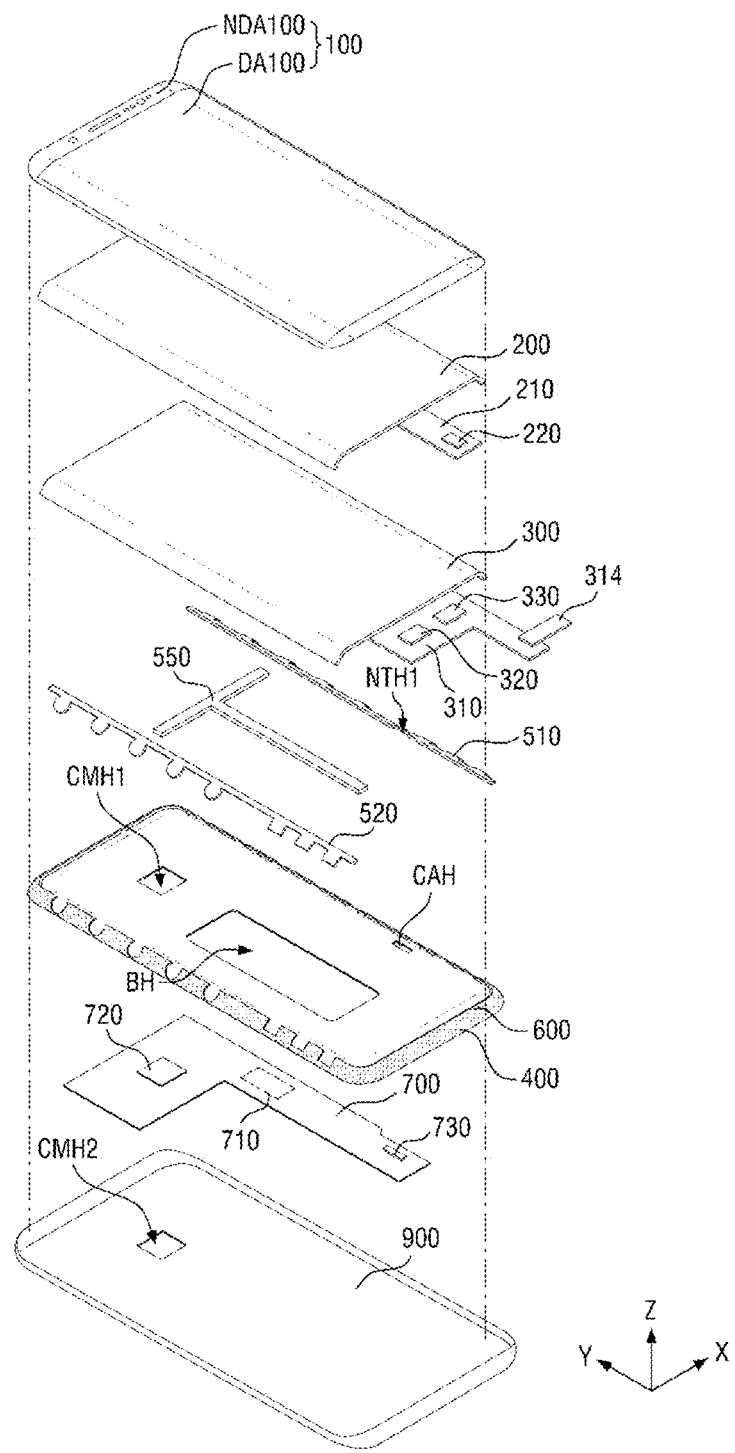
FIG. 2 is an exploded perspective view of a display device according to an exemplary embodiment of the invention.

FIG. 1 is a perspective view of a display device according to an exemplary embodiment, and FIG. 2 is an exploded perspective view of a display device according to an exemplary embodiment.

Referring to FIGS. 1 and 2, a display device 10 according to an exemplary embodiment includes a cover window 100, a touch sensing unit 200, a touch circuit board 210, a touch driving unit 220, a display panel 300, a display circuit board 310, a display driving unit 320, a pressure sensing unit 330, a pressure sensor, a pressure sensing circuit board 550, a middle frame 600, a main circuit board 700, and a lower cover 900.

In this specification, the "on", "over", "top", "upper side", or "upper surface" refers to a direction in which the cover window 100 is disposed, that is, a Z-axis direction, with respect to the display panel 300, and the "beneath", "under", "bottom", "lower side", or "lower surface" refers to a direction in which the middle is frame 600 is disposed, that is, a direction opposite to the Z-axis direction, with respect to the display panel 300. Further, the "left", "right", "upper", and "lower" refer to directions when the display panel 300 is viewed from the plane. For example, the "left" refers to a direction opposite to the X-axis direction, the "right" refers to the X-axis direction, the "upper" refers to the Y-axis direction, and the "lower" refers to a direction opposite to the Y-axis direction.

The display device 10 may have a rectangular shape in a plan view. For example, as shown in FIGS. 1 and 2, the display device 10 may have a rectangular planar shape having short sides in the first direction (X-axis direction) and long sides in the second direction (Y-axis direction). The edge where the short side in the first direction (X-axis direction) meets the long side in the second direction (Y-axis direction) may be formed to have a round shape of a predetermined curvature or have a right angle shape. The planar shape of the display device 10 is not limited to a rectangular shape, and may be formed in another polygonal shape, circular shape, or elliptical shape.

The display device 10 may include a first area DR1 formed flat and a second area DR2 extending from the right and left sides of the first area DR1. The second area DR2 may be formed to be flat or curved. When the second area DR2 is formed to be flat, the angle formed by the first area DR1 and the second area DR2 may be an obtuse angle. When the second area DR2 is formed to be curved, the second area DR2 may have a constant curvature or a variable curvature.

Although it is shown in FIG. 1 that the second area DR2 extends from the left and right sides of the first area DR1, the inventive concepts are not limited thereto. That is, the second area DR2 may extend from only one of the left and right sides of the first area DR1. In addition, the second area DR2 may extend from only one of the upper and lower sides of the first area DR1 as well as only one of the left and right sides of the first area DR1. Hereinafter, it is assumed that the second area DR2 is disposed along the left and right edges of the display device 10.

Figure 13:
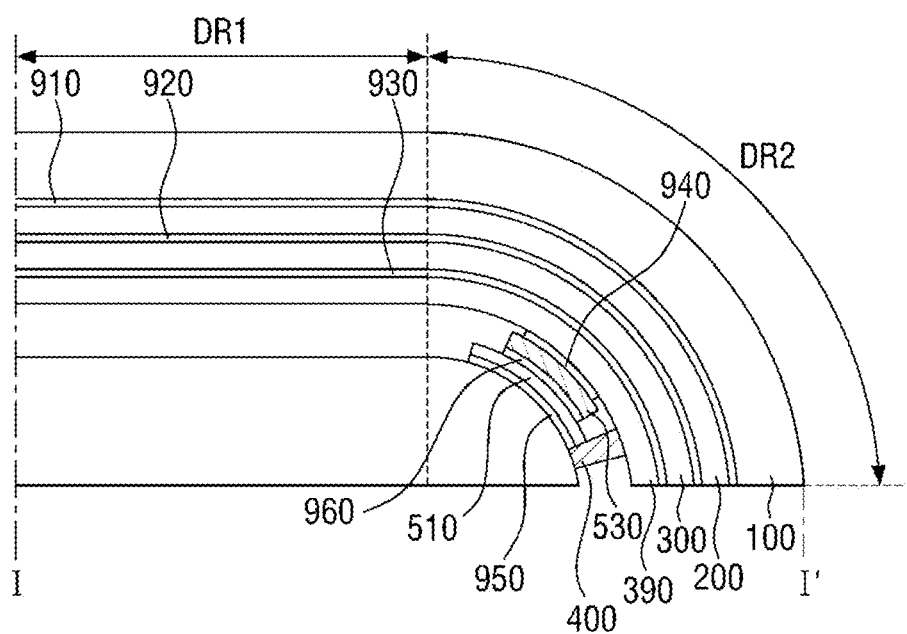
FIG. 13 is a cross-sectional view showing an example of line I-I' of FIGS. 3 and 4.

The cover window 100 may be disposed on the display panel 300 so as to cover the upper surface of the display panel 300. Thus, the cover window 100 may function to protect the upper surface of the display panel 300. The cover window 100 may be attached to the touch sensing unit 200 through a first adhesive member 910, as shown in FIG. 13. The first adhesive member 910 may be an optically clear adhesive (OCA) film or an optically clear resin (OCR) film.

The cover window 100 may include a light transmitting area DA100 corresponding to the display panel 300 and a light blocking area NDA100 corresponding to an area other than the display panel 300. The cover window 100 may be disposed in the first area DR1 and the second area DR2, and the light transmitting area DA100 may be disposed in a part of the first area DR1 and a part of the second area DR2. The light blocking area NDA100 may be formed to be opaque. Or, the light blocking area NDA100 may be formed as a decorative layer having a pattern that can be seen to a user when an image is not displayed. For example, a company logo such as "SAMSUNG" or various characters may be patterned on the light blocking area NDA100. Further, the light blocking area NDA100 may be provided with a plurality of holes HH for exposing a front camera, a front speaker, an infrared sensor, an iris recognition sensor, an ultrasonic sensor, an illuminance sensor, or the like, but the present invention is not limited thereto. For example, some or all of a front camera, a front speaker, an infrared sensor, an iris recognition sensor, an ultrasonic sensor, and an illuminance sensor may be mounted in the display panel 300. In this case, some or all of the plurality of holes HH may be omitted.

The cover window 100 may be made of glass, sapphire, and/or plastic. The cover window 100 may be rigid or flexible.

The touch sensing unit 200 may be disposed between the cover window 100 and the display panel 300. The touch sensing unit 200 may be disposed in the first area DR1 and the second area DR2. Thus, the touch sensing unit 200 may sense a user's touch in the second areas DR2 as well as the first area DR 1.

The touch sensing unit 200 may be attached to the lower surface of the cover window 100 through the first adhesive member 910 as shown in FIG. 13. The touch sensing unit 200 may be additionally provided thereon with a polarizing film in order to prevent the deterioration of visibility due to the reflection of external light. In this case, the polarizing film may be attached to the lower surface of the cover window 100 through the first adhesive member 910.

The touch sensing unit 200 is a unit for sensing a touch position of a user, and may be implemented as a capacitive type, such as a self-capacitance type or a mutual capacitance type. When the touch sensing unit 200 is implemented as a self-capacitive type, the touch sensing unit 200 may include only the touch driving electrodes, but when the touch sensing unit 200 is implemented as a mutual capacitance type, the touch sensing unit 200 may include both the touch driving electrodes and the touch sensing electrodes. Hereinafter, the touch sensing unit 200 will be described, assuming that the touch sensing unit 200 is implemented as a mutual capacitance type.

The touch sensing unit 200 may be a panel type or a film type. In this case, the touch sensing unit 200 may be attached onto a thin encapsulation film of the display panel 300 through a second adhesive member 920 as shown in FIG. 13. The second adhesive member 920 may be an optically clear adhesive (OCA) film or an optically clear resin (OCR) film.

The touch sensing unit 200 may be formed integrally with the display panel 300. In this case, the touch driving electrodes and touch sensing electrodes of the touch sensing unit 200 may be disposed on the thin encapsulation film of the display panel 300.

The touch circuit board 210 may be attached to one side of the touch sensing unit 200. Specifically, the touch circuit board 210 may be attached onto pads provided on one side of the touch sensing unit 200 using an anisotropic conductive film. Further, the touch circuit board 210 may be provided with a touch connection portion, and the touch connection portion may be connected to a touch connector 312a of the display circuit board 310. The touch circuit board 210 may be a flexible printed circuit board.

The touch driving unit 220 may apply touch driving signals to the touch driving electrodes of the touch sensing unit 200, sense sensing signals from the touch sensing electrodes of the touch sensing unit 200, and analyze the sensing signals to calculate a touch position of the user. The touch driving unit 220 may be formed as an integrated circuit and mounted on the touch circuit board 210.

The display panel 300 may be disposed under the touch sensing unit 200. The display panel 300 may be disposed to overlap the light transmitting area 100DA of the touch sensing unit 200. The display panel 300 may be disposed in the first area DR1 and the second areas DR2. Thus, the image of the display panel 300 may be seen not only in the first area DR1 but also in the second areas DR2.

The display panel 300 may be a light emitting display panel including a light emitting element. Examples of the display panel 300 may include an organic light emitting display panel using an organic light emitting diode, an ultra-small light emitting diode display panel using a micro LED, or a quantum dot light emitting diode display panel using a quantum dot light emitting diode.

The display panel 300 may include a substrate, and a thin film transistor layer, a light emitting element layer, and a thin film encapsulation layer, which are disposed on the substrate.

Since the display panel 300 is implemented to have flexibility, the display panel 300 may be formed of plastic. In this case, the substrate may include a flexible substrate and a support substrate. Since the support substrate is used to support the flexible substrate, the support substrate may have lower flexibility than the flexible substrate. For example, each of the flexible substrate and the support substrate may include polyethersulphone (PES), polyacrylate (PA), polyarylate (PAR), polyetherimide (PEI), polyethylenenapthalate (PEN), polyethylene terepthalate (PET), polyphenylenesulfide (PPS), polyallylate, polyimide (PI), polycarbonate (PC), cellulosetriacetate (CAT), cellulose acetate propionate (CAP), or a combination thereof.

The thin film transistor layer is disposed on the substrate. The thin film transistor layer may include scan lines, data lines, and thin film transistors. Each of the thin film transistors includes a gate electrode, a semiconductor layer, and source and drain electrodes. When a scan driving unit is formed directly on the substrate, the scan driving unit may be formed together with the thin film transistor layer.

The light emitting element layer is disposed on the thin film transistor layer. The light emitting element layer includes anode electrodes, a light emitting layer, a cathode electrode, and banks. The light emitting layer may include an organic light emitting layer containing an organic material. For example, the light emitting layer may include a hole injection layer, a hole transporting layer, an organic light emitting layer, an electron transporting layer, and an electron injection layer. The hole injection layer and the electron injection layer may be omitted. When a voltage is applied to the anode electrode and the cathode electrode, holes and electrons are transferred to the organic light emitting layer through the hole transporting layer and the electron transporting layer, respectively, and the holes and electrons are combined with each other in the organic light emitting layer to emit light. The light emitting element layer may be a pixel array layer in which pixels are formed, and thus the area where the light emitting element layer is formed may be defined as a display area for displaying an image. The area around the display area may be defined as a non-display area.

The thin film encapsulation layer is disposed on the light emitting element layer. The thin film encapsulation layer serves to prevent oxygen or moisture from penetrating into the light emitting element layer. The thin film encapsulation layer may include at least one inorganic film and at least one organic film.

The display circuit board 310 may be attached to one side of the display panel 300. Specifically, the display circuit board 310 may be attached to pads provided at one side of the display panel 300 using an anisotropic conductive film. The touch circuit board 210 may also be bent to the lower surface of the display panel 300, and the touch connection portion disposed at one end of the touch circuit board 210 may be connected to the touch connector 312a of the display circuit board 310. Details of the display circuit board 310 will be described later with reference to FIGS. 3 and 4.

The display driving unit 320 outputs signals and voltages for driving the display panel 300 through the display circuit board 310. The display driving unit 320 may be formed as an integrated circuit and mounted on the display circuit board 310, but the inventive concepts are not limited thereto. For example, the display driver 320 may be directly mounted on the substrate of the display panel 300, and, in this case, the display driving unit 320 may be attached to the upper surface or lower surface of the substrate of the display panel 300.

A panel lower member 390 may be disposed under the display panel 300, as shown in FIG. 13. The panel lower member 390 may be attached to the lower surface of the display panel 300 through a third adhesive member 930. The third adhesive member 930 may be an optically clear adhesive (OCA) film or an optically clear resin (OCR) film.

The panel lower member 390 may include at least one of a light absorbing member for absorbing external light, a buffer member for absorbing an external impact, a heat dissipating member for efficiently emitting heat of the display panel 300, and a light blocking layer for blocking external light.

The light absorbing member may be disposed under the display panel 300. The light absorbing member inhibits the transmission of light to prevent components disposed under the light absorbing member, that is, a first pressure sensor 510, a second pressure sensor 520, the display circuit board 310, and the like from being viewed from above the display panel 300. The light absorbing member may include a light absorbing material such as a black pigment or a dye.

The buffer member may be disposed under the light absorbing member. The buffer member absorbs an external impact to prevent the display panel 300 from being damaged. The buffer member may be composed of a single layer or a plurality of layers. For example, the buffer member may be formed of a polymer resin such as polyurethane, polycarbonate, polypropylene, or polyethylene, or may be formed of an elastic material such as a rubber, a urethane material, or a sponge formed by foaming an acrylic material. The buffer member may be a cushion layer.

The heat dissipating member may be disposed under the buffer member. The heat dissipating member may include a first heat dissipating layer including graphite or carbon nanotubes and a second heat dissipating layer capable of blocking electromagnetic waves and formed of a metal thin film of copper, nickel, ferrite or silver having excellent thermal conductivity.

In an exemplary embodiment, the pressure sensor may include a first pressure sensor 510 and a second pressure sensor 520. The first pressure sensor 510 and the second pressure sensor 520 may be disposed in the second area DR2. That is, the first pressure sensor 510 may be disposed under the display panel 300 at the right edge of the display panel 300. The second pressure sensor 520 may be disposed under the display panel 300 at the left edge of the display panel 300. The first pressure sensor 510 and the second pressure sensor 520 may be disposed to face each other in the first direction (X-axis direction).

Figure 3:
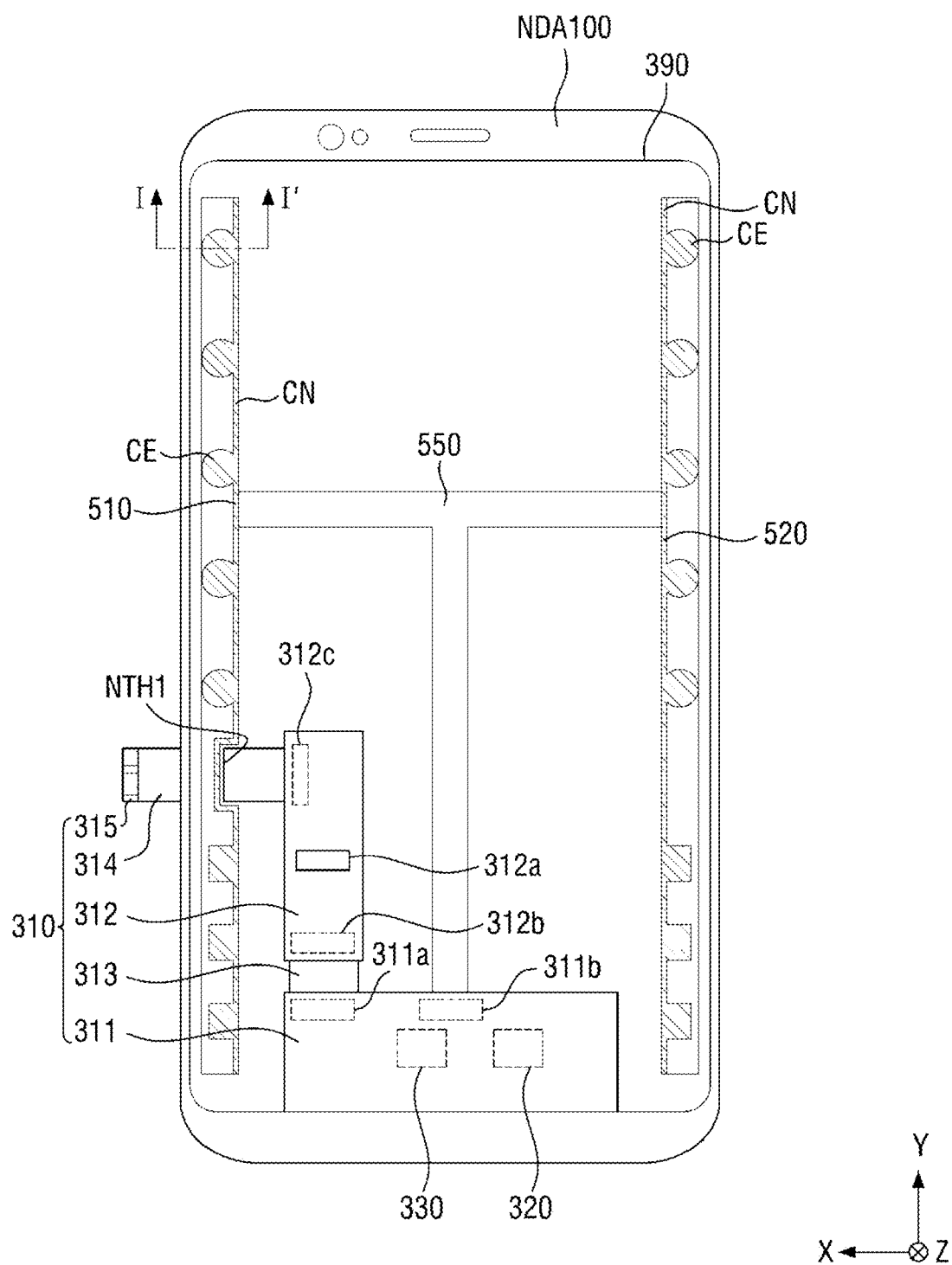
FIG. 3 is a bottom view showing an example of a display panel according to an exemplary embodiment of the invention.

The first pressure sensor 510 and the second pressure sensor 520 may be attached to the lower surface of the panel lower member 390. The first pressure sensor 510 and the second pressure sensor 520 may be connected to the display circuit board 310 through the pressure sensing circuit board 550. Although it is shown in FIG. 3 that the first pressure sensor 510 and the second pressure sensor 520 are connected to one pressure sensing circuit board 550, the inventive concepts are not limited thereto. The first pressure sensor 510 and the second pressure sensor 520 may be connected to the display circuit board 310 through different pressure sensing circuit boards 550.

As shown in FIG. 3, the pressure sensing unit 330 for sensing pressure by driving the first pressure sensor 510 and the second pressure sensor 520 may be mounted on the display circuit board 310. In this case, the pressure sensing unit 330 may be formed as an integrated circuit. The pressure sensing unit 330 may be integrated with the display driver 320 to form one integrated circuit.

Alternatively, the pressure sensing circuit board 550 may be connected to the touch circuit board 210 rather than the display circuit board 310. In this case, the pressure sensing unit 330 may be mounted on the touch circuit board 210. The pressure sensing unit 330 may be integrated with the touch driving unit 220 to form one integrated circuit.

The first pressure sensor 510 and the second pressure sensor 520 may include a connection portion CN and a plurality of pressure sensing cells CE protruding from the connection portion CN. The plurality of pressure sensing cells CE may be spaced apart from each other.

The middle frame 600 may be disposed under the panel lower member 330. The middle frame 600 may include a synthetic resin, a metal, or both a synthetic resin and a metal.

Figure 4:
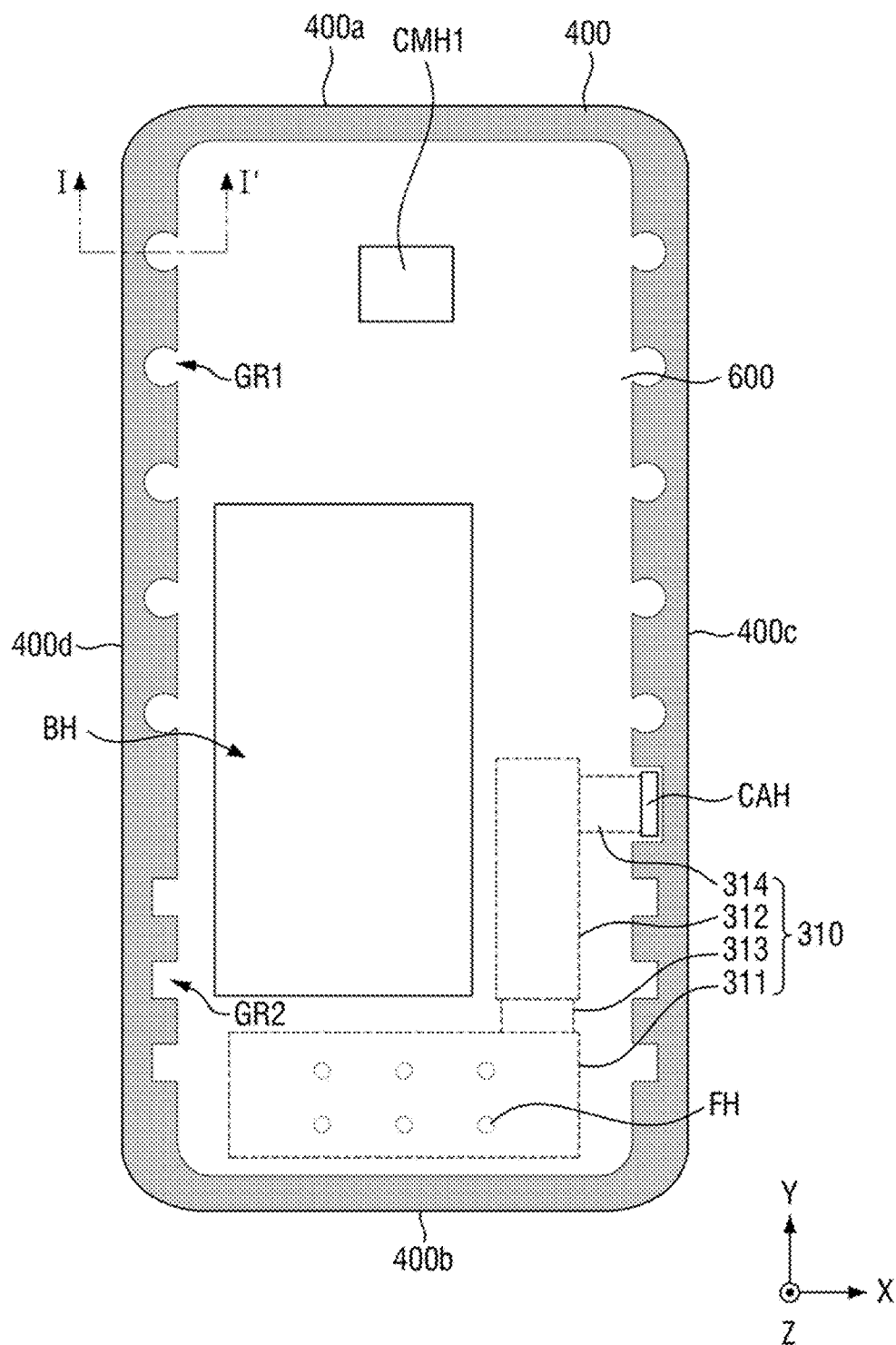
FIG. 4 is plan view showing an example of a middle frame according to an exemplary embodiment of the invention.

The waterproofing member 400 may be disposed at the edge of the middle frame 600. The waterproofing member 400 may be disposed outside the first pressure sensor 510 and outside the second pressure sensor 520. The waterproofing member 400 may be attached to the upper surface of the panel lower member 390 and the lower surface of the middle frame 600. As shown in FIG. 4, the waterproofing member 400 may include a plurality of accommodation portions GR1 and GR2, and may include a plurality of protrusions of the first pressure sensor 510 and the second pressure sensor 520. Each of the plurality of protrusions may be provided with the pressure sensing cell CE. The pressure sensing cells CE may be inserted and accommodated in the accommodation portions GR1 and GR2.

According to the exemplary embodiment shown in FIGS. 1 and 2, the waterproofing member 400 is disposed outside the first pressure sensor 510 and outside the second pressure sensor 520, and the pressure sensing cells CE disposed at the protrusions of the first pressure sensor 510 and the second pressure sensor 520 are inserted and accommodated in the accommodation portions GR1 and GR2, so that it is possible to prevent water or dust from penetrating between the display panel 300 and the middle frame 600 without restriction of space. That is, a waterproof and dustproof display device 10 may be provided.

The middle frame 600 may provided with a first camera hole CMH1 into which a camera device 720 is inserted, a battery hole BH through which heat is discharged from a battery, and a cable hole CAH through which a second connection cable 314 connected to the display circuit board 310 passes. Specifically, the cable hole CAH may be disposed at the right edge of the middle frame 600, and in this case, the cable hole CAH may be shrouded by the first pressure sensor 510 disposed under the panel lower member 390 at the right edge of the display panel 300. Therefore, the first pressure sensor 510 may include a first notch portion formed concavely in a notch shape at one side of the first pressure sensor 510 in order to expose the cable hole CAH without being shrouded.

Further, the middle frame 600 is disposed under the lower panel member 390 of the display panel 300, the first pressure sensor 510, and the second pressure sensor 520. When pressure is applied to the first pressure sensor 510 and the second pressure sensor 520, the middle frame 600 may support the first pressure sensor 510 and the second pressure sensor 520. Accordingly, the first pressure sensor 510 and the second pressure sensor 520 may sense the applied pressure.

The main circuit board 700 may be disposed under the middle frame 600. The main circuit board 700 may be a printed circuit board or a flexible printed circuit board.

The main circuit board 700 may include a main processor 710, a camera device 720, and a main connector 730. The main processor 710 and the main connector 730 may be disposed on the lower surface of the main circuit board 700, facing the lower cover 900. The camera device 720 may be disposed on both the upper surface and lower surface of the main circuit board 700.

The main processor 710 may control all the functions of the display device 10. For example, the main processor 710 may output image data to the display driving unit 320 of the display circuit board 310 such that the display panel 300 displays an image. Further, the main processor 710 may receive touch data from the touch driving unit 220, determine the touch position of a user, and then execute an application indicated by an icon displayed at the touch position of the user. Further, the main processor 710 may receive pressure sensing data from the touch driving unit 220 or the display driving unit 320, and may control the display device 10 to output a home screen, to control the volume of the sound of the display device 10 or to implement haptic. The main processor 710 may be an application processor, a central processing unit, or a system chip, which includes an integrated circuit.

The camera device 720 processes an image frame such as a still image or a moving image obtained by an image sensor in a camera mode, and outputs the processed image frame to the main processor 710.

The second connection cable 314 having passed through the connector hole CAH of the middle frame 600 may be connected to the main connector 730 disposed on the lower surface of the main circuit board 700 through the a gap between the middle frame 600 and the main circuit board 700. Thus, the main circuit board 910 can be electrically connected to the display circuit board 310 and the touch circuit board 210.

In addition, the main circuit board 700 may be further provided with a mobile communication module capable of transmitting and receiving a radio signal to/from at least one of a base station, an external terminal, and a server. The radio signal may include various types of data depending on a voice signal, a video call signal, or a text/multimedia message transmission/reception. Further, the main circuit board 700 may be further provided with an acoustic output device capable of outputting sound and a vibration device capable of generating vibration for haptic implementation.

The lower cover 900 may be disposed under the middle frame 600 and the main circuit board 700. The lower cover 900 may be engaged and fixed to the middle frame 600. The lower cover 900 may form a lower surface appearance of the display device 10. The lower cover 900 may include plastic and/or metal.

The lower cover may be provided with a second camera hole CMH2 into which the camera device is inserted to protrude outward. The position of the camera device 720 and the positions of the first and second camera holes CMH1 and CMH2 corresponding to the camera device 720 are limited to the exemplary embodiment shown in FIGS. 1, 2, 4, and 5.

Figure 5:
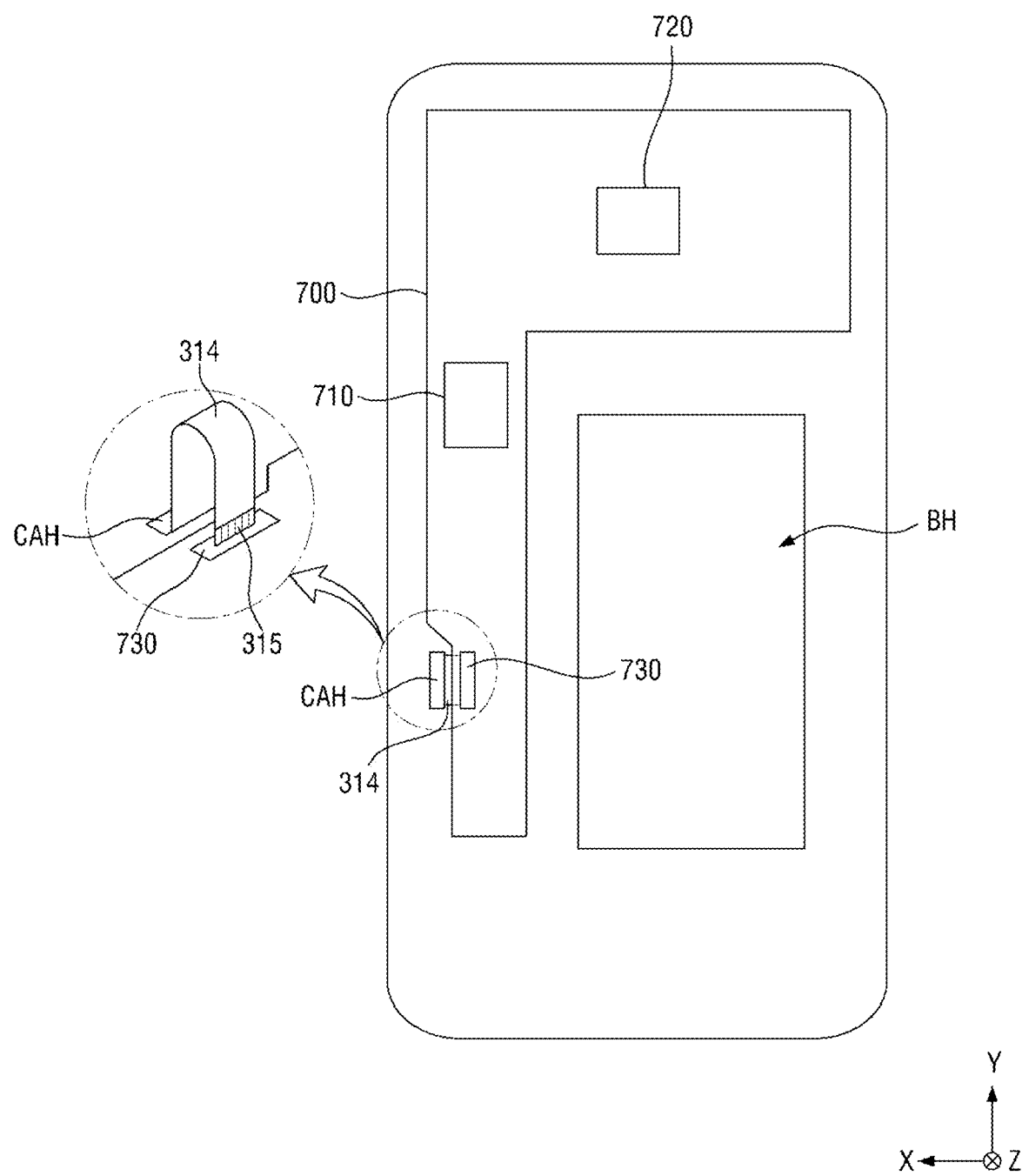
FIG. 5 is a bottom view of a middle frame and a main circuit board according to an exemplary embodiment of the invention.

FIG. 3 is a bottom view showing an example of a display panel according to an exemplary embodiment. FIG. 4 is plan view showing an example of a middle frame according to an exemplary embodiment. FIG. 5 is a bottom view of a middle frame and a main circuit board according to an exemplary embodiment.

Hereinafter, the connection between the display circuit board 310 and the pressure sensing circuit board 550 and the connection between the second connection cable 314 and the main connector 730 of the main circuit board 700 will be described in detail with reference to FIGS. 3 to 5. Because FIG. 4 is a plan view while FIGS. 3 and 5 are bottom views, it should be noted that FIGS. 3 and 5 illustrate that the left and right of the display device 10 in FIG. 4 are reversed. For convenience of explanation, in FIG. 4, the display circuit board 310 is expressed by a dotted line, and in FIG. 5, the second connection cable 314 is expressed by a dotted line.

Referring to FIGS. 3 to 5, the display circuit board 310 may include a first circuit board 311, a second circuit board 312, and a first connection cable 313.

The first circuit board 311 may be attached to one side of the upper surface or lower surface of the substrate of the display panel 300, and may be bent toward the lower surface of the substrate of the display panel 300. As shown in FIG. 4, the first circuit board 311 may be fixed to fixing holes FH formed in the middle frame 600 by fixing members.

The first circuit board 311 may include a display driving unit 320, a pressure sensing unit 330, a first connector 311a, and a second connector 311b. The display driving unit 320, the pressure sensing unit 330, the first connector 311a, and the second connector 311b may be disposed on one surface of the first circuit board 311.

The first connector 311a may be connected to one end of the first connection cable 313 connected to the second circuit board 312. Thus, the display driving unit 320 and the pressure sensing unit 330 mounted on the first circuit board 311 may be electrically connected to the second circuit board 312 through the first connection cable 313.

The second connector 311b may be connected to one end of the pressure sensing circuit board 550 connected to the first pressure sensor 510 and the second pressure sensor 520. Thus, the first pressure sensor 510 and the second pressure sensor 520 may be electrically connected to the pressure sensing part 330.

The second circuit board 312 may include a touch connector 312a, a first connection connector 312b, and a second connection connector 312c. The first connector 312b and the second connector 312c may be disposed on one surface of the second circuit board 312, and the touch connector 312a may be disposed on the other surface of the second circuit board 312.

The touch connector 312a may be connected to the touch connection portion provided at one end of the touch circuit board 210. Thus, the touch driving unit 220 may be electrically connected to the second circuit board 312.

The first connection connector 312b may be connected to the other end of the first connection cable 313 connected to the first circuit board 311. Thus, the display driving unit 320 and the pressure sensing unit 330 mounted on the first circuit board 311 may be electrically connected to the second circuit board 312 through the first connection cable 313.

The second connection connector 312c may be connected to one end of the second connection cable 314 connected to the main connector 730 of the main circuit board 700. Thus, the second circuit board 312 may be electrically connected to the second circuit board 312 through the second connection cable 314.

A connector connection portion 315 may be formed at the other end of the second connection cable 314. The connector connection portion 315 of the second connection cable 314 may extend to the lower surface of the middle frame 600 through the cable hole CAH of the middle frame 600 as shown in FIGS. 3 and 4. Since the first pressure sensor 510 may be provided inside thereof with a first notch portion NTH1 having a notch shape in a region corresponding to the cable hole CAH of the middle frame 600, the cable hole CAH of the middle frame 600 may be exposed without being covered by the first pressure sensor 510.

Further, since a gap is formed between the middle frame 600 and the main circuit board 700, the connector connection portion 315 of the second connection cable 314, having passed through the cable hole CAH, may come out of the gap between the middle frame 600 and the main circuit board 700, and may extend to the lower surface of the main circuit board 700. Finally, the connector connection portion 315 of the second connection cable 314 may be connected to the main connector 730 disposed on the lower surface of the main circuit board 700.

According to the exemplary embodiment shown in FIGS. 3 to 5, the first notch portion NTH1 having a notch shape is formed in one side of the first pressure sensor 510 so as not to cover the cable hole CAH of the middle frame 600. Thus, the second connection cable 314 connected to the display circuit board 310 may extend to the lower surface of the middle frame 600 through the cable hole CAH, and thus, may be connected to the main connector 730 of the main circuit board 700. Thus, the display circuit board 310 and the main circuit board 700 may be stably connected to each other.

Each of the first pressure sensor 510 and the second pressure sensor 520 may include a connection portion CN and protrusions disposed on one side of the connection portion CN. The pressure sensing cells CE are disposed in the protrusions, respectively, depending on the shape of each of the protrusions. Hereinafter, the shape of the pressure sensing cells CE will be described as an example. It should be understood that each protrusion has a shape corresponding to the shape of each pressure sensing cell CE.

The first pressure sensor 510 may include a connection portion CN extending in the second direction (Y-axis direction) and a plurality of pressure sensing cells CE protruding from the connection portion in the first direction (X-axis direction), and the second pressure sensor 520 may include a connection portion CN extending in the second direction (Y-axis direction) and a plurality of pressure sensing cells CE protruding from the connection portion in a direction opposite to the first direction (X-axis direction). However, the inventive concepts are not limited thereto, and the plurality of pressure sensing cells CE may protrude in various directions depending on the position where the first pressure sensor 510 and the second pressure sensor 520 are disposed.

In an exemplary embodiment, among the plurality of pressure sensing cells CE, the shape of the pressure sensing cell CE disposed at the upper end in the second direction (Y-axis direction) may be different from the shape of the pressure sensing cell CE disposed at the lower end in the second direction (Y-axis direction). For example, the pressure sensing cell CE disposed at the upper end may have a circular shape, and the pressure sensing cell CE disposed at the lower end may have a rectangular shape. However, the inventive concepts are not limited thereto, and the pressure sensing cells CE may have various shapes, such as an elliptical shape and a polygonal shape. The plurality of pressure sensing cells CE may alternate with each other in the second direction (Y-axis direction), may have different shapes, and may have different shapes in groups.

The plurality of pressure sensing cells CE may be spaced apart from each other, and may have different sizes from each other. For example, the plurality of pressure sensing cells CE may have the same shape but different sizes, and may have different shapes and different sizes.

The waterproofing member 400 may include a plurality of accommodation portions GR1 and GR2 facing inwardly. For example, the waterproofing member 400 may include first and second short sides 400a and 400b facing each other and extending in the first direction (X-axis direction) and first and second long sides 400c and 400d connecting the first and second short sides 400a and 400b in the second direction (Y-axis direction) and facing each other, and the plurality of accommodation portions GR1 and GR2 may be disposed inside the first and second long sides 400c and 400d. However, the inventive concepts are not limited thereto. The plurality of accommodation portions GR1 and GR2 may be disposed in one of the first and second long sides 400c and 400d; may be disposed in at least one of the first and second short sides 400a and 400b; may be disposed in three sides of the first and second short sides 400a and 400b and the first and second long sides 400c and 400d, and may be disposed in each of the first and second short sides 400a and 400b and the first and second long sides 400c and 400d.

In an exemplary embodiment, the plurality of accommodation portions GR1 and GR2 may include a first accommodation portion GR1 and a second accommodation portion GR2, and the accommodation portion GR1 and the second accommodation portion GR2 may have different shapes from each other. For example, the first accommodation portion GR1 may be disposed at the upper end in the second direction (Y-axis direction), and the second accommodation portion GR2 may be disposed at the lower end in the second direction (Y-axis direction). Further, the first accommodation portion GR1 may have a round shape, and the second accommodation portion GR2 may have a rectangular shape. However, the inventive concepts are not limited thereto. The first accommodation portion GR1 and the second accommodation portion GR2 may have various shapes, such as an elliptical shape and a polygonal shape. The first accommodation portion GR1 and the second accommodation portion GR2 may have different shapes, and may be disposed alternately in the second direction (Y-axis direction). The first accommodation portion GR1 and the second accommodation portion GR2 may have the same shape.

The first accommodation portion GR1 and the second accommodation portion GR2 may be spaced apart from each other, and may have different sizes from each other. For example, the first accommodation portion GR1 and the second accommodation portion GR2 may have the same shape but different sizes, and may have different shapes and sizes.

In an exemplary embodiment, since the pressure sensing cells CE disposed at the protrusions of the first pressure sensor 510 and the second pressure sensor 520 are respectively inserted into the plurality of accommodation portions GR1 and GR2 of the waterproofing member 400, it is preferred that the shapes of the plurality of pressure sensing cells CE are formed corresponding to those of the accommodation portions GR1 and GR2 of the waterproof member 400, but the present invention is not limited thereto. For example, when the plurality of pressure sensing cells CE are inserted into one accommodation portion GR1 or GR2 in group units, the shape of each of the plurality of pressure sensing cells CE may be different from the shape of the accommodation portion GR1 or GR2.

Figure 6:
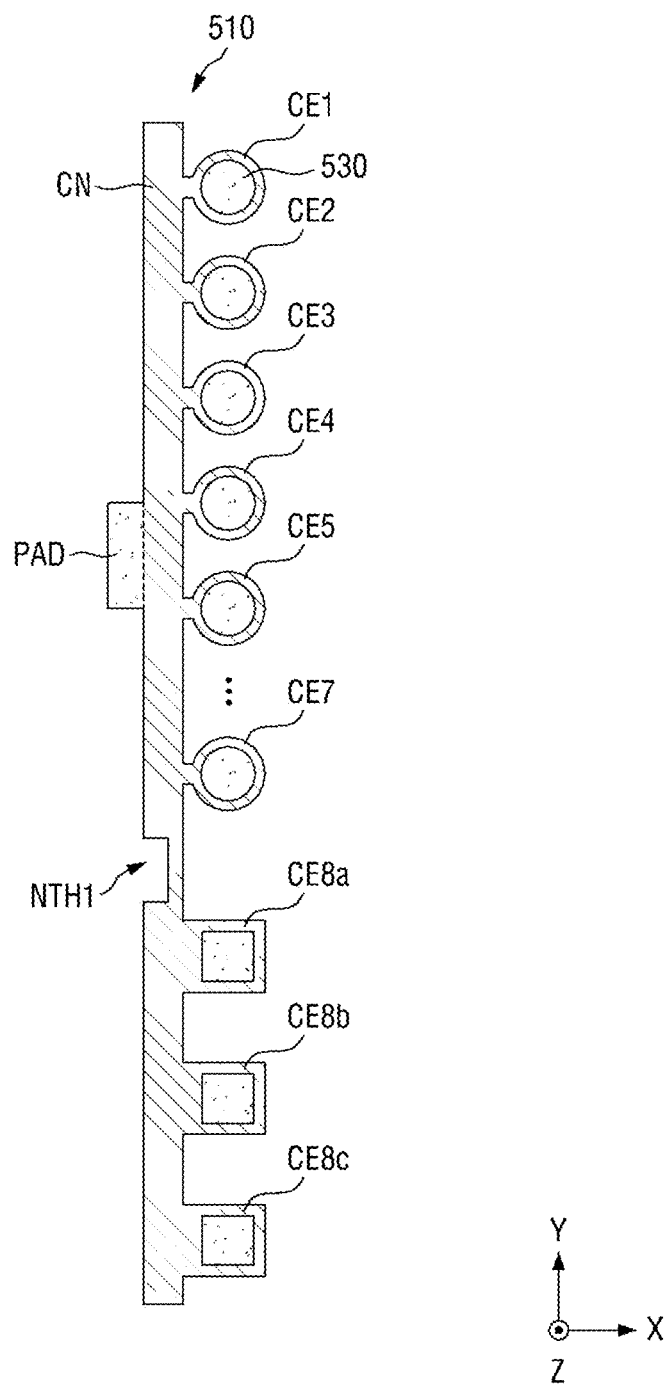
FIG. 6 is a plan view showing a first pressure sensor and a first bump according to an exemplary embodiment of the invention.
Figure 7:
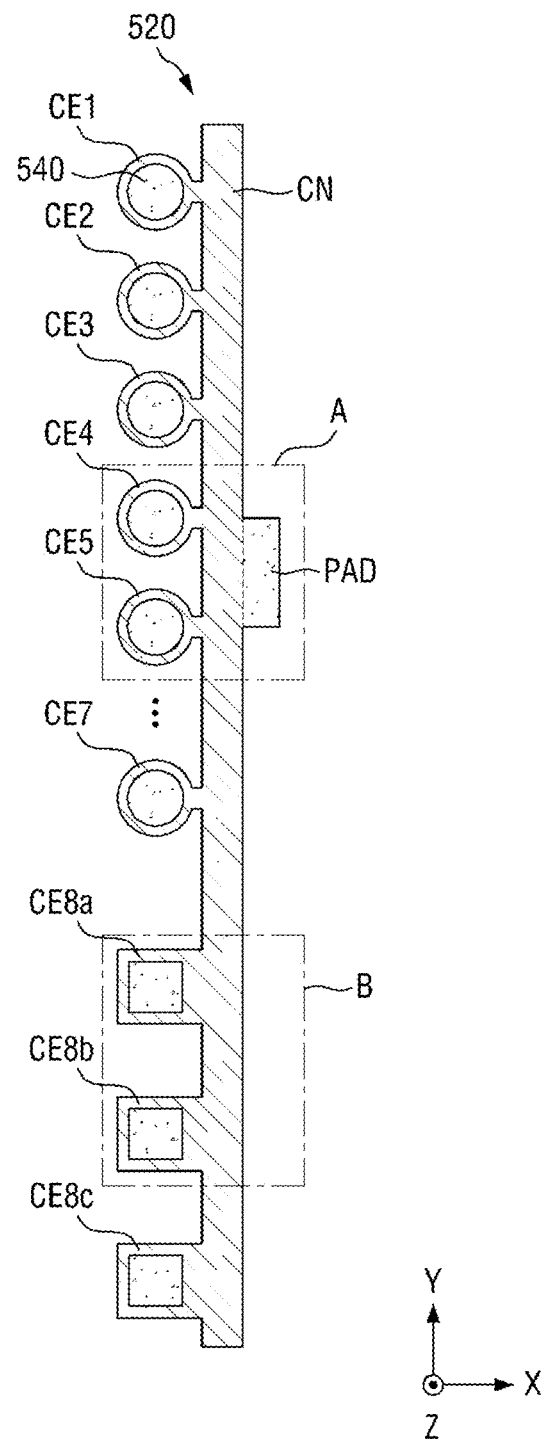
FIG. 7 is a plan view showing a second pressure sensor and a second bump according to an exemplary embodiment of the invention.

FIG. 6 is a plan view showing a first pressure sensor and a first bump according to an exemplary embodiment, and FIG. 7 is a plan view showing a second pressure sensor and a second bump according to an exemplary embodiment.

Referring to FIG. 6, the first pressure sensor 510 of an exemplary embodiment may include a connection portion CN extending in the second direction (Y-axis direction) and a plurality of pressure sensing cells protruding from the connection portion CN in the first direction (X-axis direction).

The connecting portion CN of the first pressure sensor 510 may have a rectangular planar shape having short sides in the first direction (X-axis direction) and long sides in the second direction (Y-axis direction). However, the planar shape of the connection portion CN is not limited thereto, and may vary depending on the applied position.

In an exemplary embodiment, the first pressure sensor 510 includes ten pressure sensing cells CE1 to CE8c, but the number of pressure sensing cells is not limited thereto.

Each of the plurality of pressure sensing cells CE1 to CE8c of the first pressure sensor 510 may independently sense the pressure at the corresponding position. Although it is illustrated in FIG. 6 that the pressure sensing cells CE1 to CE8c are arranged in one row, the inventive concepts are not limited thereto. The pressure sensing cells CE1 to CE8c may be arranged in a plurality of rows, if necessary. The respective pressure sensing CE1 to CE8c may be spaced apart from each other at predetermined intervals as shown in FIG. 6, or may be arranged continuously.

In an exemplary embodiment, among the plurality of pressure sensing cells CE1 to CE8c of the first pressure sensor 510, the shapes of the pressure sensing cells CE1 to CE7 disposed at the upper end in the second direction (Y-axis direction) may be different from the shapes of the pressure sensing cells CE8a, CE8b, and CE8c disposed at the lower end in the second direction (Y-axis direction). For example, the shapes of the pressure sensing cells CE1 to CE7 disposed at the upper end may be circular shapes, and the shapes of the pressure sensing cells CE8a, CE8b, and CE8c disposed at the lower end may be rectangular shapes. However, the inventive concepts are not limited thereto.

Figure 11:
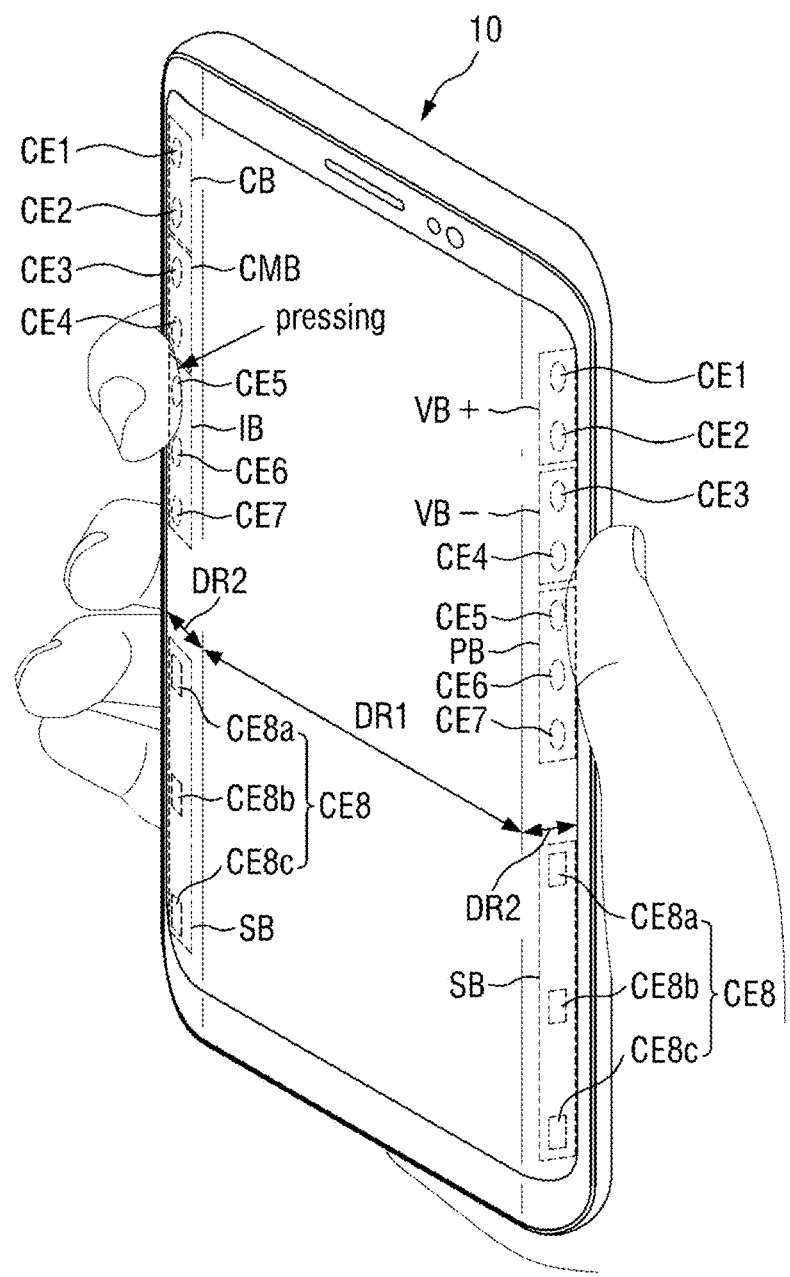
FIG. 11 and FIG. 12 are exemplary views showing a display device utilizing first and second pressure sensors as physical buttons according to an exemplary embodiment of the invention.
Figure 12:
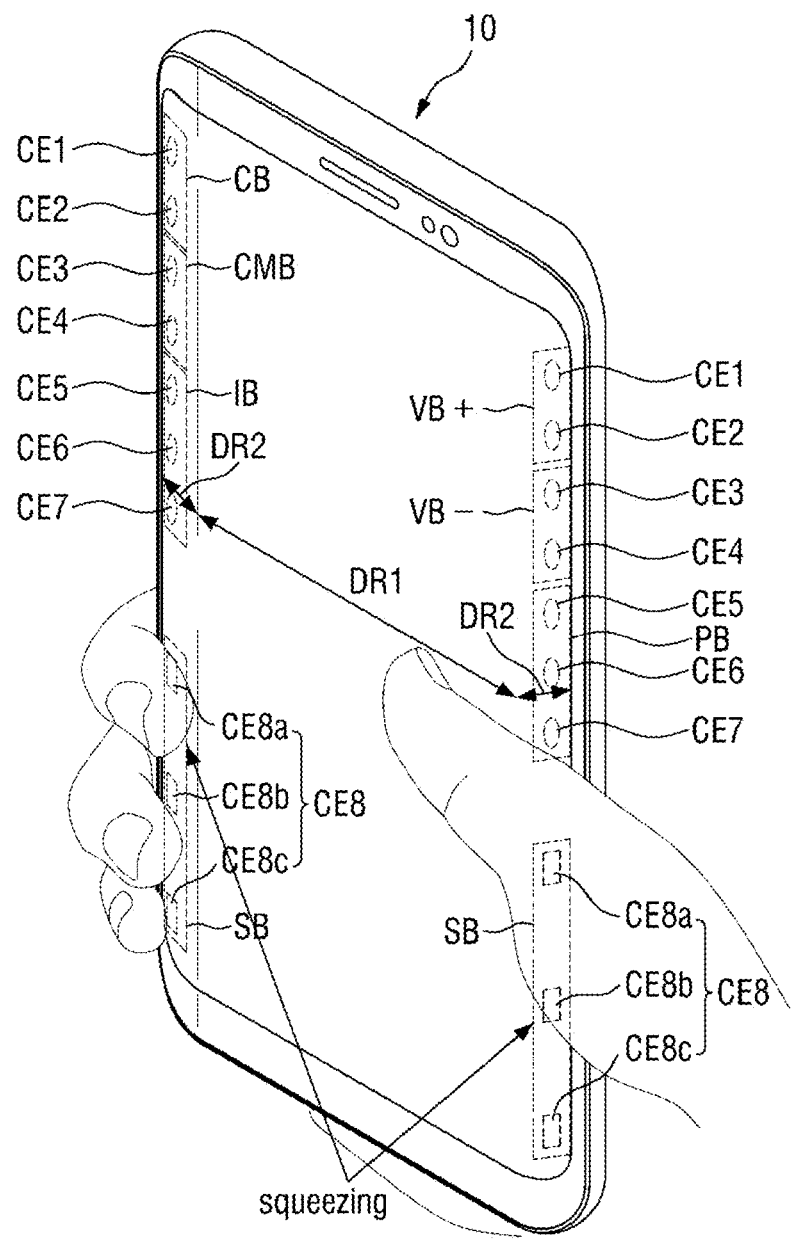

The pressure sensing cells CE1 to CE8c may have different shapes and areas depending on the application. For example, as shown in FIG. 11, the first to seventh circular pressure sensing cells CE1 to CE7 may be used as physical buttons, such as volume control buttons VB+ and VB− or power buttons PB disposed on the edge of one side of the display device 10. Or, as shown in FIG. 12, the eighth to tenth rectangular pressure sensing cells CE8a, CE8b, and CE8c may be used as buttons for sensing the squeezing pressure of a user.

Although it is illustrated in FIG. 6 that the first to seventh circular pressure sensing cells CE1 to CE7 used as physical buttons are formed to have the same area, the inventive concepts are not limited thereto. That is, the areas of the first to seventh pressure sensing cells CE1 to CE7 may be different from each other. Alternatively, the areas of some of the first to seventh pressure sensing cells CE1 to CE7 are equal to each other and the areas of the others of the first to seventh pressure sensing cells CE1 to CE7 are equal to each other, but the area of each of some of the first to seventh pressure sensing cells CE1 to CE7 and the area of each of the others of the first to seventh pressure sensing cells CE1 to CE7 may be different from each other.

Further, although it is illustrated in FIG. 6 that the eighth to tenth rectangular pressure sensing cells CE8a, CE8b, and CE8c used as physical buttons are formed to have the same area, the inventive concepts are not limited thereto. That is, the areas of the eighth to tenth pressure sensing cells CE8a, CE8b, and CE8c may be different from each other. Alternatively, the areas of some of the eighth to tenth rectangular pressure sensing cells CE8a, CE8b, and CE8c are equal to each other and the areas of the others of the eighth to tenth rectangular pressure sensing cells CE8a, CE8b, and CE8c are equal to each other, but the area of each of some of the eighth to tenth rectangular pressure sensing cells CE8a, CE8b, and CE8c and the area of each of the others of the eighth to tenth rectangular pressure sensing cells CE8a, CE8b, and CE8c may be different from each other.

A plurality of bumps 530 may be disposed on the first to tenth pressure sensing cells CE1 to CE8c to overlap the first to tenth pressure sensing cells CE1 to CE8c. The plurality of bumps 530 may serve to press the first to tenth pressure sensing cells CE1 to CE8c according to the pressure of the user. Therefore, the pressure of the user may be sensed by the first to tenth pressure sensing cells CE1 to CE8c.

In order to increase the pressure applied to the first to tenth pressure sensing cells CE1 to CE8c by each of the plurality of first bumps 530, each of the plurality of bumps 530 may be formed to have a smaller area than each of the first to tenth pressure sensing cells CE1 to CE8c. Each of the plurality of first bumps 530 may be formed to have a smaller area than the pressure sensing layer of each of the first to tenth pressure sensing cells CE1 to CE8c. However, the inventive concepts are not limited thereto.

In an exemplary embodiment, the plurality of first bumps 530 may have shapes corresponding to the shapes of the first to tenth pressure sensing cells CE1 through CE8c, respectively. For example, the first bumps 530 respectively disposed on the first to seventh pressure sensing cells CE1 to CE7 may have circular shapes in correspondence with the shapes of the first to seventh pressure sensing cells CE1 to CE7, and the first bumps 530 respectively disposed on the eighth to tenth pressure sensing cells CE8a, CE8b, and CE8c may be rectangular shapes in correspondence with the shapes of the eighth to tenth pressure sensing cells CE8a, CE8b, and CE8c. However, the inventive concepts are not limited thereto. The first bumps 530 respectively disposed on the first to seventh pressure sensing cells CE1 to CE7 may be rectangular shapes, the first bumps 530 respectively disposed on the eighth to tenth pressure sensing cells CE8a, CE8b, and CE8c may be circular shapes, and all of the first bumps 530 respectively disposed on the first to tenth pressure sensing cells CE1 to CE8c may have the same shape.

In order not to cover the cable hole CAH of the middle frame 600, a first notch portion NTH1 having a notch shape may be formed in an area corresponding to the cable hole CAH of the middle frame 600 in the first pressure sensor 510.

Meanwhile, the second pressure sensor 520 and the second bumps 540 shown in FIG. 7 are different from the first pressure sensor 510 and the first bumps 540 shown in FIG. 6 in that the second pressure sensor 520 does not include the first notch portion NTH1. A detailed description of the second pressure sensor 520 and the second bumps 540 shown in FIG. 7 will be omitted.

Figure 8:
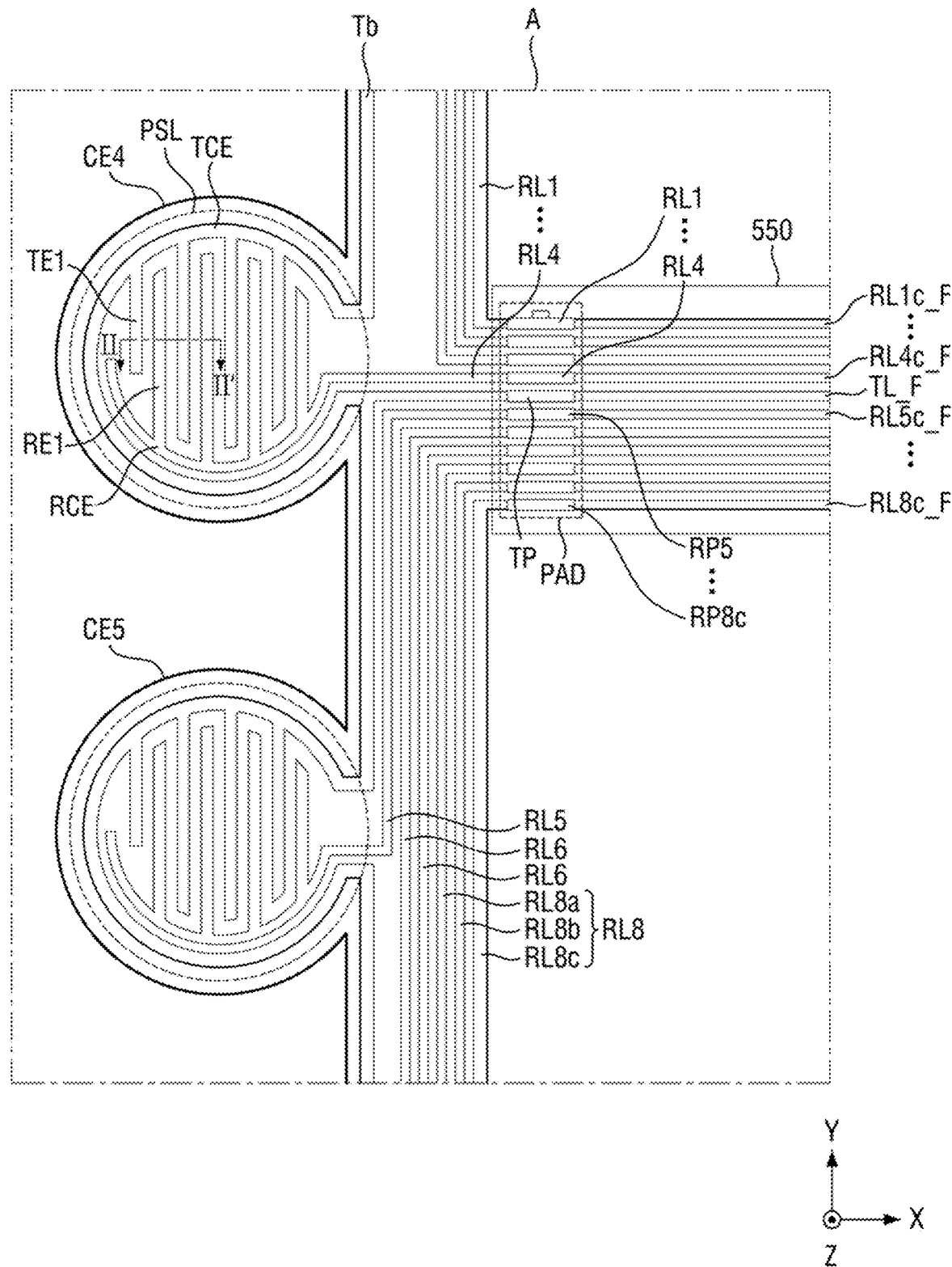
FIG. 8 is a plan view specifically showing the area A of FIG. 7.
Figure 9:
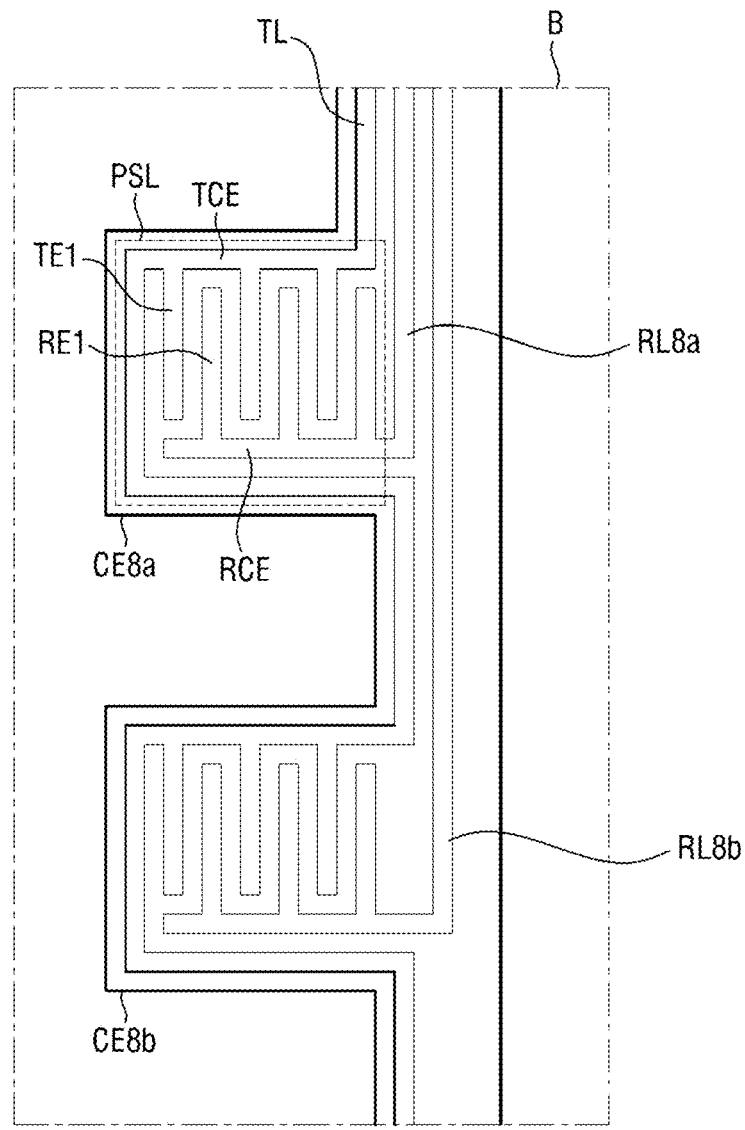
FIG. 9 is a plan view specifically showing the area B of FIG. 7.

FIG. 8 is a plan view specifically showing the area A of FIG. 7; FIG. 9 is a plan view specifically showing the area B of FIG. 7; and FIG. 10 is a cross-sectional view taken along the line of FIG. 8.

Figure 10:
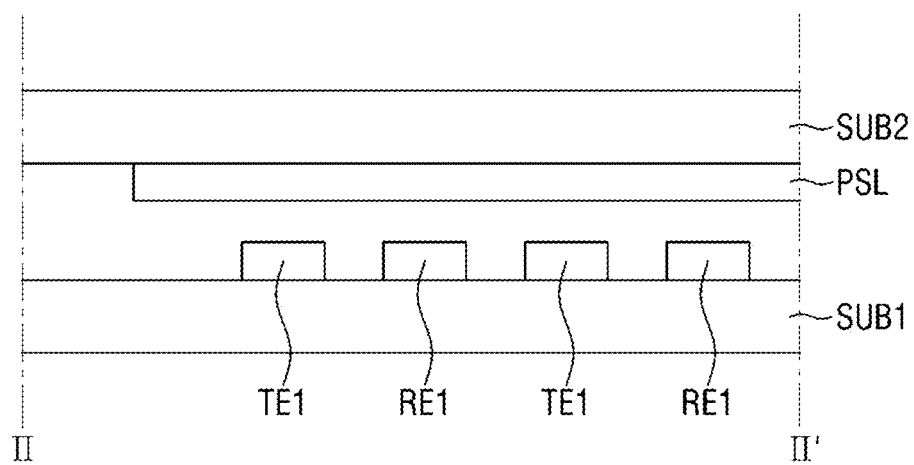
FIG. 10 is a cross-sectional view taken along the line of FIG. 8.

Referring to FIGS. 8 to 10, the second pressure sensor 520 includes a first substrate SUB1, a second substrate SUB2, a driving line TL, first to tenth sensing lines RL1 to RL8c, a driving pad TP, first to tenth sensing pads RP1 to RP8c, and first to tenth pressure sensing cells CE1 to CE8c.

For convenience of explanation, FIG. 8 shows a fourth pressure sensing cell CE4, a fifth pressure sensing cell CE5, and a pad region PAD, and FIG. 9 shows an eighth pressure sensing cell CE8a and a ninth pressure sensing cell CE8b. Further, for convenience of explanation, FIGS. 8 and 9 omit illustration of a second substrate SUB2.

The first substrate SUB1 and the second substrate SUB2 are disposed to face each other. Each of the first substrate SUB1 and the second substrate SUB2 may include polyethylene, polyimide, polycarbonate, polsulfone, polyacrylate, polystyrene, polyvinyl chloride, polyvinyl alcohol, polynorbonene, or polyester. In an exemplary embodiment, each of the first substrate SUB1 and the second substrate SUB2 may be formed of a polyethylene terephthalate (PET) film or a polyimide film.

A plurality of pressure sensing cells CE1 to CE8c are arranged between the first substrate SUB1 and the second substrate SUB2. A driving line TL, a plurality of sensing lines RL1 to RL8c, a driving pad TP, and a plurality of sensing pads RP1 to RP8c are arranged on the first substrate SUB1 facing the second substrate SUB2.

Each of the plurality of pressure sensing cells CE1 to CE8c may be connected to at least one driving line and at least one sensing line. For example, the plurality of pressure sensing cells CE1 to CE8c may be commonly connected to one driving line TL, whereas they may be connected on a one-to-one basis to the plurality of sensing lines RL1 to RL8. As shown in FIGS. 8 and 9, the fourth pressure sensing cell CE4 may be connected to the driving line TL and the fourth sensing line RL4, the fifth pressure sensing cell CE5 may be connected to the driving line TL and the fifth sensing line RL5, the eighth pressure sensing cell CE8a may be connected to the driving line TL and the eighth sensing line RL8a, and the ninth pressure sensing cell CE8b may be connected to the driving line TL and the ninth sensing line RL8b. However, the inventive concepts are not limited thereto, and the eighth pressure sensing cell CE8a and the ninth pressure sensing cell CE8b may be connected to the same eighth sensing line RL8a.

The driving line TL may be connected to the driving pad TP, and the plurality of sensing lines RL1 to RL8c may be connected one to one to the plurality of sensing pads RP1 to RP8c. The first sensing line RL1 may be connected to the first sensing pad RP1, the second sensing line RL2 may be connected to the second sensing pad RP2, the third sensing line RL3 may be connected to the third sensing pad RP3, the fourth sensing line RL4 may be connected to fourth sensing pad RP4, and the fifth sensing line RL5 may be connected to the fifth sensing pad RP5. The sixth sensing line RL6 may be connected to the sixth sensing pad RP6, the seventh sensing line RL7 may be connected to the seventh sensing pad RP7, the eighth sensing line RL8a may be connected to the eighth sensing pad RP8a, the ninth sensing line RL8b may be connected to the ninth sensing pad RP8b, and the tenth sensing line RL8c may be connected to the tenth sensing pad RP8c.

The pad region PAD may protrude from one side of the first substrate SUB1. One side of the first substrate SUB1 may be the long side of the second pressure sensor 520. Although it is illustrated in FIG. 8 that the pad region PAD protrudes from the center of the long side of the first substrate SUB1, the inventive concepts are not limited hereto. That is, the pad region PAD may protrude from one end or the other end of the long side of the first substrate SUB1.

The driving pad TP and the plurality of sensing pads RP1 to RP8c may be disposed in the pad region PAD. The driving pad TP and the plurality of sensing pads RP1 to RP8c may be connected one-to-one to a driving lead line TL_F and a plurality of sensing lead lines RL1_F to RL8c_F of the third circuit board 550 through an anisotropic conductive film. The driving pad TP may be connected to the driving lead line TL_F, the first sensing pad RP1 may be connected to the first sensing lead line RL1_F, the second sensing pad RP2 may be connected to the second sensing lead line RL2_F, the third sensing pad RP3 may be connected to the third sensing lead line RL3_F, the fourth sensing pad RP4 may be connected to the fourth sensing lead line RL4_F, and the fifth sensing pad RP5 may be connected to the fifth sensing lead line RL5_F. Further, the sixth sensing pad RP6 may be connected to the sixth sensing lead line RL6_F, the seventh sensing pad RP7 may be connected to the seventh sensing lead line RL7_F, the eighth sensing pad RP8a may be connected to the eighth sensing lead line RL8a_F, the ninth sensing pad RP8b may be connected to the eighth sensing lead line RL8b_F, and the tenth sensing pad RP8c may be connected to the tenth sensing lead line RL8c_F.

Since the third circuit board 550 is connected to the display circuit board 310 as shown in FIG. 3, the third circuit board 550 may be electrically connected to the pressure sensing unit 330 mounted on the display circuit board 310. The pressure sensing unit 330 applies a driving voltage to the driving line TL through the driving lead line TL_F of the third circuit board 550 and the driving pad TP of the second pressure sensor 520, and senses current values or voltage values from the plurality of sensing lines RL1 to RL8c through the plurality of sensing lead lines RL1_F to RL8c_F connected to the plurality of sensing pads RP1 to RPc of the second pressure sensor 520, thereby sensing the pressure applied to the plurality of pressure sensing cells CE1 to CE8c.

The second pressure sensor 520 may further include a bonding layer disposed between the first substrate SUB1 and the second substrate SUB2 to bond the first substrate SUB1 and the second substrate SUB2 to each other. The bonding layer may be a pressure-sensitive adhesive layer or an adhesive layer. The bonding layer may be disposed along the periphery of the first substrate SUB1 and the second substrate SUB2. In an exemplary embodiment, the bonding layer may serve to encapsulate the inside of the pressure sensor 10 by completely surrounding the edges of the first substrate SUB1 and the second substrate SUB2. Moreover, the bonding layer may serve as a spacer that maintains a constant distance between the first substrate SUB1 and the second substrate SUB2.

A shown in FIGS. 9 and 10, each of the plurality of pressure sensing cells CE1 to CE8c includes a driving connection electrode TCE, a sensing connection electrode RCE, driving electrodes TE1, sensing electrodes RE1, and a pressure sensing layer PSL.

The driving connection electrode TCE, the sensing connection electrode RCE, the driving electrodes TE1, and the sensing electrodes RE1 may be disposed on the first substrate SUB1 facing the second substrate SUB2.

The driving connection electrode TCE is connected to the driving line TL and the driving electrodes TE1. In the plurality of pressure sensing cells CE1 to CE8c, the driving connection electrode TCE may have a different shape. Specifically, as shown in FIG. 8, in each of the fourth pressure sensing cell CE4 and the fifth pressure sensing cell CE5, the driving connection electrode TCE may be formed of a circular rim partly opened corresponding to the shape of the fourth pressure sensing cell CE4 and the fifth pressure sensing cell CE5, and the driving connection electrode TCE is connected to the driving line TL at one end. The plurality of driving electrodes TE1 may be branched in a direction opposite to the second direction (Y-axis direction) of the driving connection electrode TCE. As shown in FIG. 9, in each of the eighth pressure sensing cell CE8a and the ninth pressure sensing cell CE8b, the driving connection electrode TCE may be formed of a rectangular rim partly opened corresponding to the shape of the eighth pressure sensing cell CE8a and the ninth pressure sensing cell CE8b, and the driving connection electrode TCE is connected to the driving line TL at one end. The plurality of driving electrodes TE1 may be branched in a direction opposite to the second direction (Y-axis direction) of the driving connection electrode TCE.

The sensing connection electrode RCE is connected to any one of the plurality of sensing lines RL1 to RL8c and the sensing electrode RE1. In the plurality of pressure sensing cells CE1 to CE8c, the sensing connection electrode RCE may have a different shape. Specifically, as shown in FIG. 8, in each of the fourth pressure sensing cell CE4 and the fifth pressure sensing cell CE5, the sensing connection electrode RCE may have a curved shape disposed inside the circular rim of the driving connection electrode TCE. The plurality of sensing electrodes RE1 may be branched in the second direction (Y-axis direction) of the sensing connection electrode RCE. As shown in FIG. 9, in each of the eighth pressure sensing cell CE8a and the ninth pressure sensing cell CE8b, the sensing connection electrode RCE may be disposed to extend to the inside of the rectangular rim of the opened side of the driving connection electrode TCE, and the plurality of sensing electrodes RE1 may be branched in the second direction (Y-axis direction) of the sensing connection electrode RCE.

The plurality of driving electrodes TE1 and the plurality of sensing electrodes RE1 may be disposed on the same layer. The plurality of driving electrodes TE1 and the plurality of sensing electrodes RE1 may be made of the same material. For example, the plurality of driving electrodes TE1 and the plurality of sensing electrodes RE1 may include a conductive material such as silver (Ag) or copper (Cu). The plurality of driving electrodes TE1 and the plurality of sensing electrodes RE1 may be formed on the first substrate SUB1 by a screen printing method.

The plurality of driving electrodes TE1 and the plurality of sensing electrodes RE1 are disposed adjacent to each other, but are not connected to each other. The plurality of driving electrodes TE1 and the plurality of sensing electrodes RE11 may be arranged in parallel with each other. The plurality of driving electrodes TE1 and the plurality of sensing electrodes RE1 may be alternately arranged in the first direction (X-axis direction).

The pressure sensing layer PSL is disposed on one surface of the second substrate SUB2 facing the first substrate SUB1, as shown in FIG. 10. The pressure sensing layer PSL may be disposed to overlap the driving electrodes TE1 and the sensing electrodes RE1.

The pressure sensing layer PSL may include a pressure-sensitive material and a polymer resin in which the pressure-sensitive material is provided. The pressure-sensitive material may include fine metal particles (or metal nanoparticles) of nickel, aluminum, titanium, tin, or copper. For example, the first pressure sensing layer PSL may be a quantum tunneling composite (QTC).

When pressure is not applied to the second substrate SUB2 in the height direction (Z-axis direction) of the second pressure sensor 520, as shown in FIG. 10, gaps exist between the pressure sensing layer PSL and the driving electrodes TE1 and between the pressure sensing layer PSL and the sensing electrodes RE1. That is, when pressure is not applied to the second substrate SUB2, the pressure sensing layer PSL is spaced apart from the driving electrodes TE1 and the sensing electrodes RE1.

When pressure is applied to the second substrate SUB2 in the height direction (Z-axis direction) of the second pressure sensor 520, the pressure sensing layer PSL may be brought into contact with the plurality of driving electrodes TE1 and the plurality of sensing electrodes RE1. In this case, at least one of the plurality of driving electrode TE1 and at least one of the plurality of sensing electrodes RE1 may be physically connected through the pressure sensing layer PSL, and the pressure sensing layer PSL may act as an electrical resistance.

Accordingly, according to the exemplary embodiment shown in FIGS. 8 to 10, since the contact area of the pressure sensing layer PSL with the plurality of driving electrodes TE1 and the plurality of sensing electrode RE1 is changed depending on the pressure applied to the pressure sensing cell of the second pressure sensor 520, the resistance value of the sensing line electrically connected to the plurality of sensing electrodes RE1 may be changed. For example, the higher the pressure applied to the pressure sensing cell of the second pressure sensor 520, the lower the resistance value of the sensing line. The pressure sensing unit 330 senses a change in a current value or a voltage value from the plurality of sensing lines RL1 to RL8c, thereby sensing the pressure pressed by a user's hand.

Meanwhile, since the first pressure sensor 510 is substantially the same as the second pressure sensor 520 shown in FIGS. 8 to 10, a detailed description of the first pressure sensor 510 will be omitted.

FIGS. 11 and 12 are exemplary views showing a display device utilizing first and second pressure sensors as physical buttons according to an exemplary embodiment.

FIGS. 11 and 12 show the first to tenth pressure sensing cells CE1 to CE8c of the first pressure sensor 510 and the second pressure sensor 520 disposed in the second areas DR2 of the display device 10. The eighth to tenth pressure sensing cells CE8a, CE8b, and CE8c are assumed to be an eighth pressure sensing cell CE8 connected to one sensing line and performing one function.

It is shown in FIG. 11 that a user presses the fifth pressure sensing cell CE5 of the left curved portion corresponding to the second area DR2 of the display device 10 with a forefinger in a state in which the user grips the display device 10 by hand. It is shown in FIG. 12 that a user squeezes the eighth pressure sensing cell CE8 of the left curved portion corresponding to the second area DR2 of the eighth pressure sensing cell CE8 of the display device 10 with a middle finger, a ring finger and a little finger in a state in which the user grips the display device 10 by hand, and that the user squeezes the eighth pressure sensing cell CE8 of the right curved portion corresponding to the second area DR2 of the eighth pressure sensing cell CE8 of the display device 10 with a palm in this state.

Referring to FIGS. 11 and 12, the first pressure sensor 510 and the second pressure sensor 520 may be used instead of the physical buttons of the display device 10. Specifically, when pressure is applied to the first to eighth pressure sensing cells CE1 to CE8 of the first pressure sensor 510 formed on the right curved portion of the display device 10 and the first to eighth pressure sensing cells CE1 to CE8 of the second pressure sensor 520 formed on the left curved portion of the display device 10, predetermined application or operation may be executed.

For example, among the first to eighth pressure sensing cells CE1 to CE8 of the first pressure sensor 510 formed on the right curved portion of the display device 10, the first pressure sensing cell CE1 and the second pressure sensing cell CE2 may be used as volume up buttons VB+ that are pressed by a user so as to increase the volume of the display device 10, the third pressure sensing cell CE3 and the fourth pressure sensing cell CE4 may be used as volume down buttons VB− that are pressed by the user so as to increase the volume of the display device 10, and the fifth pressure sensing cell CE5, the sixth pressure sensing cell CE6, and the seventh pressure sensing cell CE7 may be used as power buttons PWB pressed by the user so as to turn a power off.

When pressure is sensed from the first pressure sensing cell CE1 and the second pressure sensing cell CE2 formed on the right curved portion of the display device 10, the main processor 710 may control the volume of a speaker of the display device 10 to increase. When pressure is sensed from the first pressure sensing cell CE1 and the second pressure sensing cell CE2 formed on the right curved portion of the display device 10, the main processor 710 may control the volume of a speaker of the display device 10 to increase. Further, when pressure is sensed from the third pressure sensing cell CE3 and the fourth pressure sensing cell CE4 formed on the right curved portion of the display device 10, the main processor 710 may control the volume of the speaker of the display device 10 to increase. Further, when pressure is sensed from the fifth pressure sensing cell CE5, the sixth pressure sensing cell CE6, and the seventh pressure sensing cell CE7 formed on the right curved portion of the display device 10, the main processor 710 may turn off a screen of the display device, or may output a screen which can select the turning off of the display device 10.

Further, among the first to eighth pressure sensing cells CE1 to CE8 formed on the left curved portion of the display device 10, the first pressure sensing cell CE1 and the second pressure sensing cell CE2 may be used as call buttons CB that are pressed by a user so as to execute a call application, the third pressure sensing cell CE3 and the fourth pressure sensing cell CE4 may be used as camera buttons CMB that are pressed by the user so as to execute a camera application, and the fifth pressure sensing cell CE5, the sixth pressure sensing cell CE6, and the seventh pressure sensing cell CE7 may be used as internet buttons IB pressed by the user so as to execute an internet application.

In this case, when pressure is sensed from the first pressure sensing cell CE1 and the second pressure sensing cell CE2 formed on the right curved portion of the display device 10, the main processor 710 may control a call application to be executed. Further, when pressure is sensed from the third pressure sensing cell CE3 and the fourth pressure sensing cell CE4 formed on the right curved portion of the display device 10, the main processor 710 may control a camera application to be executed. Further, when pressure is sensed from the fifth pressure sensing cell CE5, the sixth pressure sensing cell CE6, and the seventh pressure sensing cell CE7 formed on the left curved portion of the display device 10, the main processor 710 may control an internet application to be executed.

Since the exemplary embodiment shown in FIGS. 11 and 12 is only one example, the inventive concepts are not limited thereto. That is, when pressure is applied to the first to seventh pressure sensing cells CE1 to CE7 of the first pressure sensor 510 located on the right curved portion of the display device 10 and the first to seventh pressure sensing cells CE1 to CE7 of the second pressure sensor 520 located on the left curved portion of the display device 10, the display device may include the aforementioned functions or may execute various functions other than these functions. Further, the display device 10 may be programmed such that different operations from each other are executed for each of the first to seventh pressure sensing cells CE1 to CE7 of the first pressure sensor 510 located on the right curved portion of the display device 10 and the first to seventh pressure sensing cells CE1 to CE7 of the second pressure sensor 520 located on the left curved portion of the display device 10.

Further, each of the eighth pressure sensing cells CE8 respectively formed on the right curved portion and right curved portion of the display device 10 may be used as a squeezing sensing button SB. The squeezing pressure applied to the eighth pressure sensing cell CE8 may be greater than the pressure applied to the first to seventh pressure sensing cells CE1 to CE7. When the squeezing pressure is sensed from the eighth pressure sensing cell CE8 formed on each of the left curved portion and the right curved portion, the main processor 710 may control a predetermined application or operation to be executed. For example, when the squeezing pressure is sensed from the eighth pressure sensing cell CE8 formed on each of the left curved portion and the right curved portion, the main processor 710 may control the display device 10 to be turned on in a sleep mode.

According to the exemplary embodiment shown in FIGS. 11 and 12, the first pressure sensor 510 and the second pressure sensor 520 are disposed in the second areas DR2 corresponding to the curved portions of the display device 10, so that the first pressure sensor 510 and the second pressure sensor 520 may be used as physical buttons such as volume control buttons, power buttons, call buttons, camera buttons, internet buttons, and squeezing sensing buttons.

Figure 14:
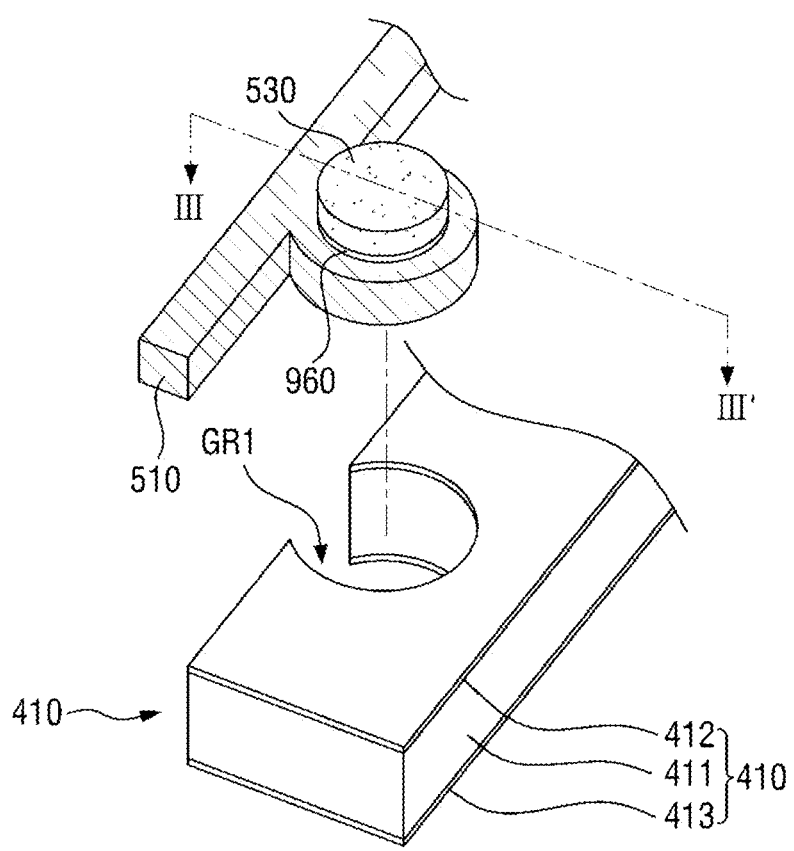
FIG. 14 is an exploded perspective view showing a first accommodation portion of a waterproof member and a part of a first pressure sensor corresponding thereto.
Figure 15:
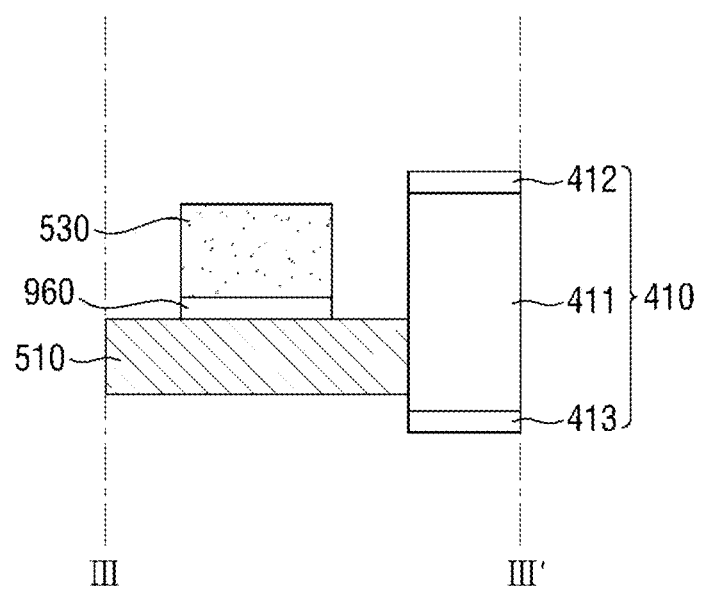
FIG. 15 is a cross-sectional view taken along the line of FIG. 14.

FIG. 13 is a cross-sectional view showing an example of I-I' of FIGS. 3 and 4. FIG. 14 is an exploded perspective view showing a first accommodation portion of a waterproof member and a part of a first pressure sensor corresponding thereto. FIG. 15 is a cross-sectional view taken along the line of FIG. 14.

Referring to FIGS. 13 to 15, the cover window 100, the touch sensing unit 200, the display panel 300, the panel lower member 390, and the middle frame 600 may be formed to be flat in the first area DR1, and may be formed to be curved in the second area DR2.

The first pressure sensor 510 may be disposed in the second area DR2 corresponding to the curved portion of the display device 10. First bumps 530 may be disposed on the first pressure sensor 510. Each of the first bumps 530 may be attached to the lower surface of the panel lower member 390 through a fourth adhesive member 940, and may be attached to the upper surface of the first pressure sensor 510 through a sixth adhesive member 960. Further, the first pressure sensor 510 may be attached to the upper surface of the middle frame 600 through a fifth adhesive member 950. The fourth adhesive member 940, the fifth adhesive member 950, and the sixth adhesive member 960 may be pressure-sensitive adhesives (PSA). Any one of the fourth adhesive member 940 and the fifth adhesive member 950 may be omitted.

The waterproofing member 400 may be disposed outside the first pressure sensor 510. That is, the waterproofing member 400 may be disposed on one side surface of the first pressure sensor 510, and one side surface of the first pressure sensor 510 may be disposed closer to one side edge of the display panel 300 as compared with other side surfaces of the first pressure sensor 510. For example, when the first pressure sensor 510 is disposed at the right edge of the display panel 300, the waterproofing member 400 may be disposed on the right surface of the first pressure sensor 510, and the pressure sensing cell CE of the first pressure sensor 510 may be inserted and disposed in the accommodation portion GR of the waterproofing member 400.

The layout of the first accommodation portion GR1 of the waterproofing member 400 and the pressure sensing cell CE of the first pressure sensor 510 will be described with reference to FIGS. 14 and 15. The first accommodation portion GR1 may have a round shape, and the pressure sensing cell CE of the first pressure sensor 510, corresponding to the first accommodation portion GR1, may have a circular shape. Specifically, the first accommodation portion GR1 may have a circular shape having a portion thereof opened, and the pressure sensing cell CE of the first pressure sensor 510 may have a circular shape protruding from the connection portion CN. The first bump 530 having a smaller size than the pressure sensing cell CE may be disposed on the pressure sensing cell CE, and the first bump 530 may be attached and fixed onto the pressure sensitive cell CE by the sixth adhesive member 960.

The circular shape of the pressure sensing cell CE may have a smaller size than the first accommodation portion GR1, and thus, the pressure sensing cell CE may be inserted and fixed into the first accommodation portion GR1. Similar to this, since the pressure sensing cell CE of the first pressure sensor 510 is inserted into the first accommodation portion GR1 of the waterproof member 400, a space for disposing the first pressure sensor 510 can be significantly reduced.

The waterproof member 400 may be attached to the lower surface of the panel lower member 390 and the upper surface of the middle frame 600. For this purpose, the waterproofing member 400 may include a base film 411, a first adhesive film 412 disposed on one surface of the base film 411, and a second adhesive film 413 disposed on the other surface of the base film 411. The base film 411 may be a polyethylene terephthalate (PET) film, a polyethylene terephthalate (PET) film and a cushion layer, or a polyethylene foam (PE-foam). Each of the first adhesive film 412 and the second adhesive film 413 may be a pressure-sensitive adhesive layer. The first adhesive film 412 may be adhered to the lower surface of the panel lower member 390, and the second adhesive film 413 may be adhered to the upper surface of the middle frame 600.

The waterproofing member 400 is pressed and attached to the lower surface of the panel lower member 390 and the upper surface of the middle frame 600. When the height of the waterproofing member 400 is less than the sum of the height of the first pressure sensor 510 and the height of the first bump 530, the first pressure sensor 510 may be damaged by the force for attaching the waterproofing member 400. Therefore, the height of the waterproofing member 400 may be greater than the sum of the height of the first pressure sensor 510 and the height of the first bump 530. However, if the height of the waterproofing member 400 is much greater than the sum of the height of the first pressure sensor 510 and the height of the first bump 530, the pressure may not be sensed by the first pressure sensor 510. Therefore, the height of the waterproofing member 400 may be previously determined, considering that the first pressure sensor 510 is damaged by the force for attaching the waterproofing member 400 and considering whether or not pressure is sensed by the first pressure sensor 510 after attachment of the waterproofing member 400.

Further, in order for the first bump 530 to press the plurality of pressure sensing cells CE1 to CE8c of the first pressure sensor 510, the height of the first bump 530 may be higher than the height of the first pressure sensor 510, but the inventive concepts are not limited thereto.

Figure 16:
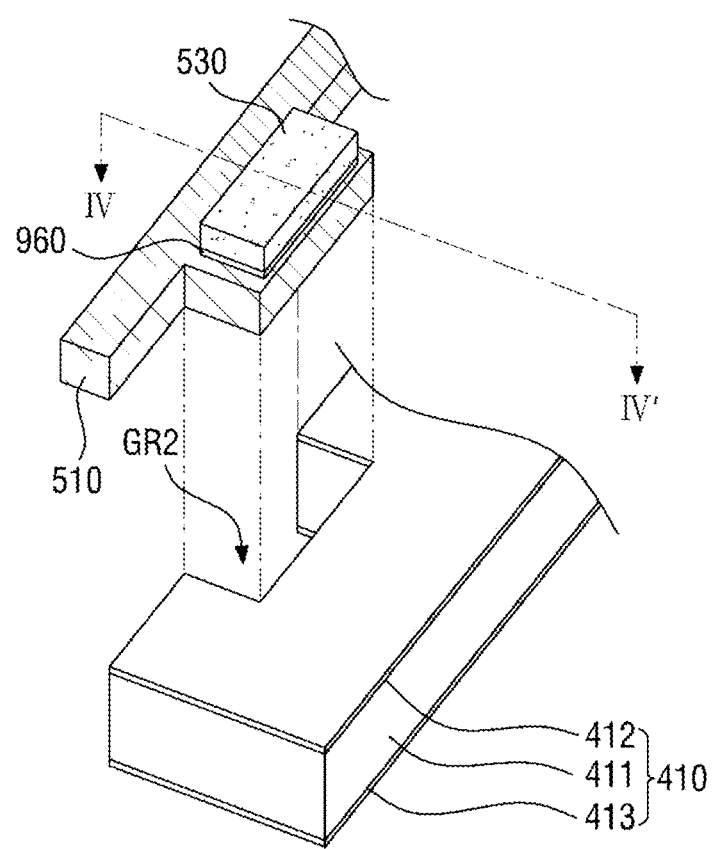
FIG. 16 is an exploded perspective view showing a second accommodation portion of a waterproof member and a part of a second pressure sensor corresponding thereto.
Figure 17:
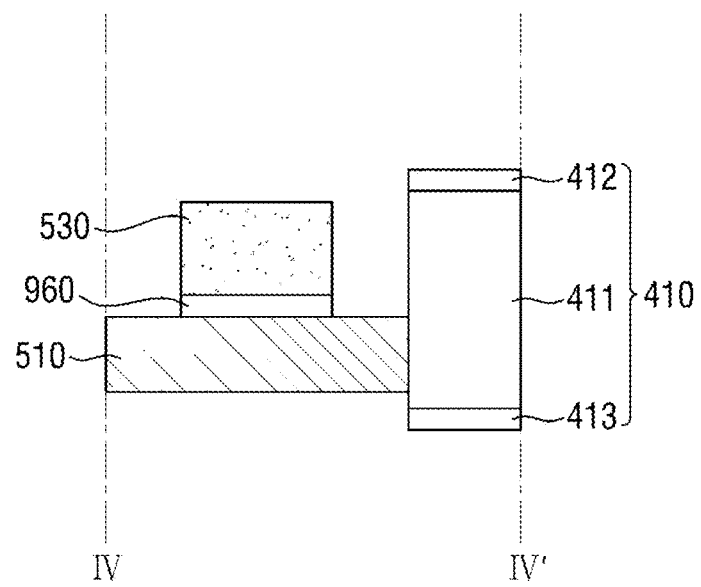
FIG. 17 is a cross-sectional view taken along the line IV-IV' of FIG. 16.

FIG. 16 is an exploded perspective view showing a second accommodation portion of a waterproof member and a part of a second pressure sensor corresponding thereto, and FIG. 17 is a cross-sectional view taken along the line IV-IV' of FIG. 16.

Referring to FIGS. 16 and 17, the second accommodation portion GR2 of the waterproofing member 400 may have a rectangular shape, and the pressure sensing cell CE of the first pressure sensor 510, corresponding to the second accommodation portion GR2, may have a rectangular shape. Specifically, the second accommodation portion GR2 may have a rectangular shape with a part thereof opened, and the pressure sensing cell CE of the first pressure sensor 510 may have a rectangular shape protruding from the connection portion CN. The first bump 530 having a smaller size than the pressure sensing cell CE may be disposed on the pressure sensing cell CE, and the first bump 530 may be attached and fixed onto the pressure sensitive cell CE by the sixth adhesive member 960.

The rectangular shape of the pressure sensing cell CE may have a smaller size than the second accommodation portion GR2, and thus the pressure sensing cell CE may be inserted and fixed into the second accommodation portion GR2. Like this, since the pressure sensing cell CE of the first pressure sensor 510 is inserted into the second accommodation portion GR2 of the waterproof member 400, a space for disposing the first pressure sensor 510 can be substantially reduced. Further, the spatial restriction for arranging pressure sensors can be reduced by changing the shape of the pressure sensing cell for each area.

Figure 18:
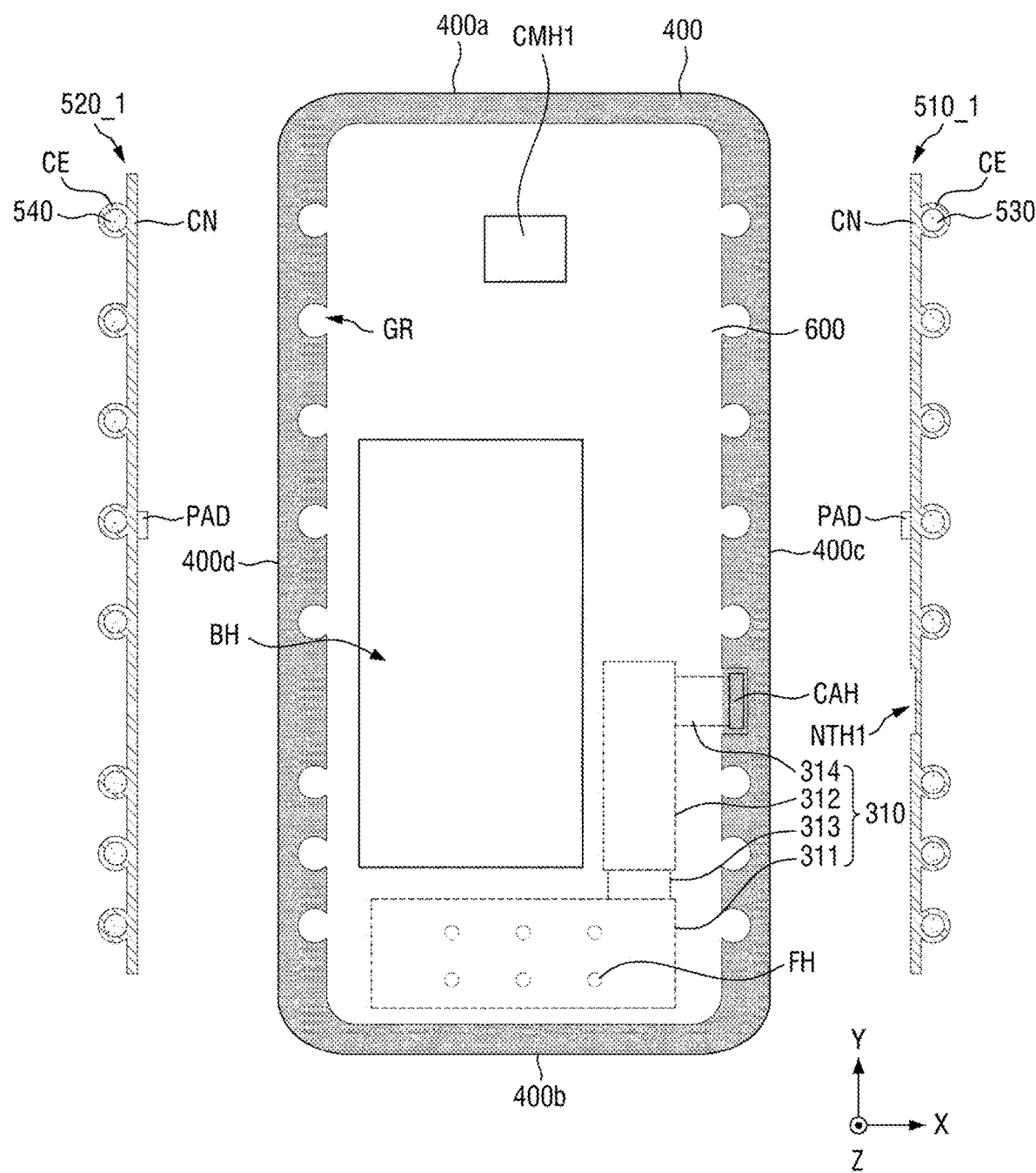
FIG. 18 is a plan view showing a waterproofing member and first and second pressure sensors according to another exemplary embodiment of the invention.

FIG. 18 is a plan view showing a waterproofing member and first and second pressure sensors according to another exemplary embodiment.

Referring to FIG. 18, in an exemplary embodiment, the waterproof member 400 may include a plurality of accommodation portions GR, and the plurality of accommodation portions GR may have the same shape. For example, the plurality of rounded accommodation portions GR may be disposed in the first long side 400c and the second long side 400d of the waterproof member 400. Specifically, each of the plurality of accommodation portions GR may have a circular shape with a part thereof opened.

Each of a first pressure sensor 510_1 and a second pressure sensor 520_1 may include a plurality of circular pressure sensing cells CE protruding from a connection portion CN corresponding to the plurality of accommodation portions GR of the waterproof member 400. For example, the first pressure sensor 510_1 may include a connecting portion CN extending in the second direction (Y-axis direction) and a plurality of circular pressure sensing cells CE protruding from the connecting portion CN in the first direction (X-axis direction), and the second pressure sensor 520_1 may include a connecting portion CN extending in the second direction (Y-axis direction) and a plurality of circular pressure sensing cells CE protruding from the connecting portion CN in a direction opposite to the first direction (X-axis direction). Since the plurality of circular pressure sensing cells CE of the first pressure sensor 510_1 and the second pressure sensor 520_1 are inserted and accommodated in the plurality of accommodation portions GR of the waterproof member 400, a space for disposing the first pressure sensor 510_1 and the second pressure sensor 520_1 can be substantially reduced.

Figure 19:
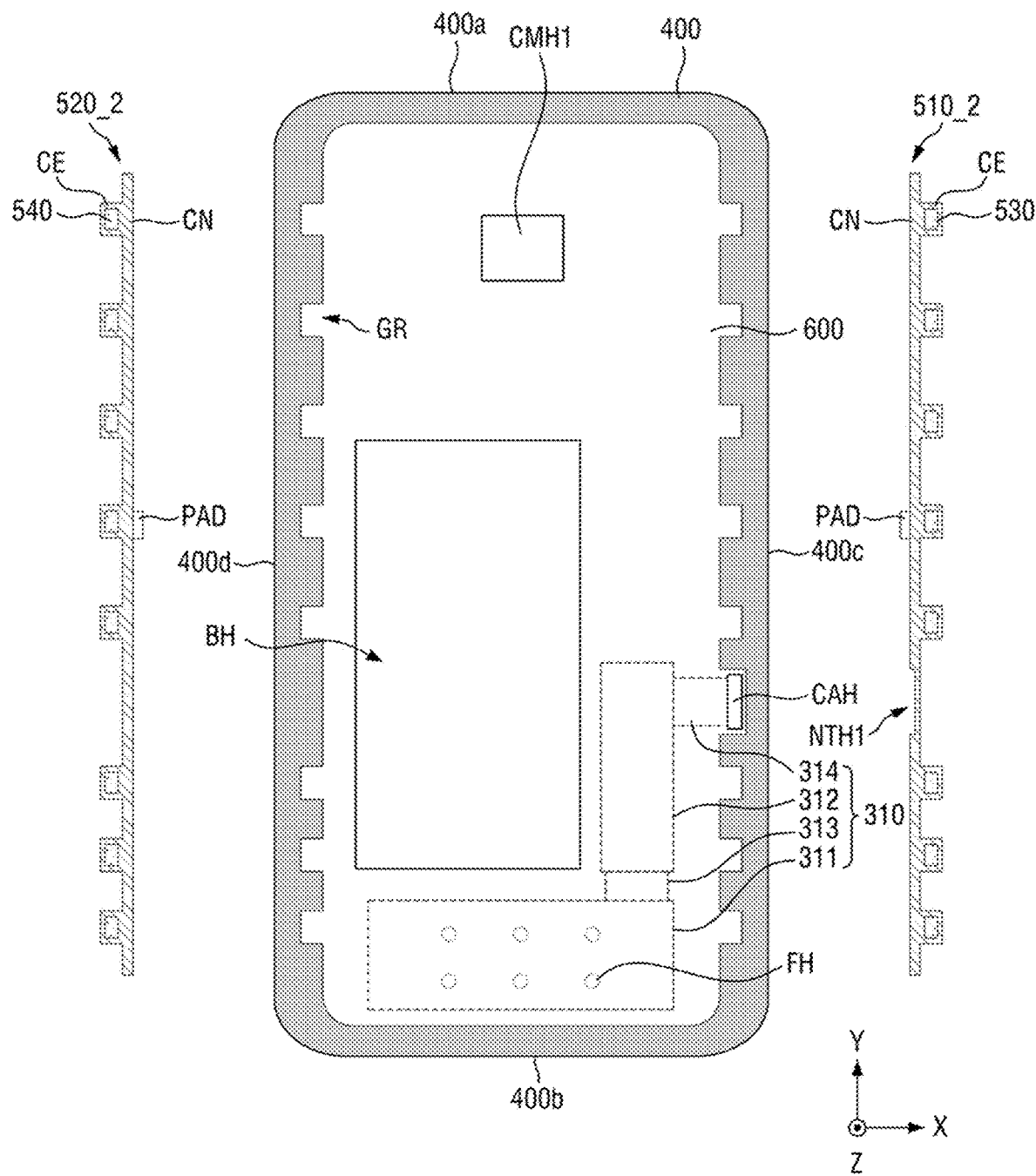
FIG. 19 is a plan view showing a waterproofing member and first and second pressure sensors according to another exemplary embodiment of the invention.

FIG. 19 is a plan view showing a waterproofing member and first and second pressure sensors according to another exemplary embodiment.

Referring to FIG. 19, in an exemplary embodiment, the waterproof member 400 may include a plurality of accommodation portions GR, and the plurality of accommodation portions GR may have the same shape. For example, the plurality of rectangular accommodation portions GR may be disposed in the first long side 400c and the second long side 400d of the waterproof member 400. Specifically, each of the plurality of accommodation portions GR may have a rectangular shape with one side thereof opened.

Each of a first pressure sensor 510_2 and a second pressure sensor 520_2 may include a plurality of rectangular pressure sensing cells CE protruding from a connection portion CN corresponding to the plurality of accommodation portions GR of the waterproof member 400. For example, the first pressure sensor 510_2 may include a connecting portion CN extending in the second direction (Y-axis direction) and a plurality of rectangular pressure sensing cells CE protruding from the connecting portion CN in the first direction (X-axis direction), and the second pressure sensor 520_2 may include a connecting portion CN extending in the second direction (Y-axis direction) and a plurality of rectangular pressure sensing cells CE protruding from the connecting portion CN in a direction opposite to the first direction (X-axis direction). Since the plurality of rectangular pressure sensing cells CE of the first pressure sensor 510_2 and the second pressure sensor 520_2 are inserted and accommodated in the plurality of accommodation portions GR of the waterproof member 400, a space for disposing the first pressure sensor 510_2 and the second pressure sensor 520_2 can be substantially reduced.

Figure 20:
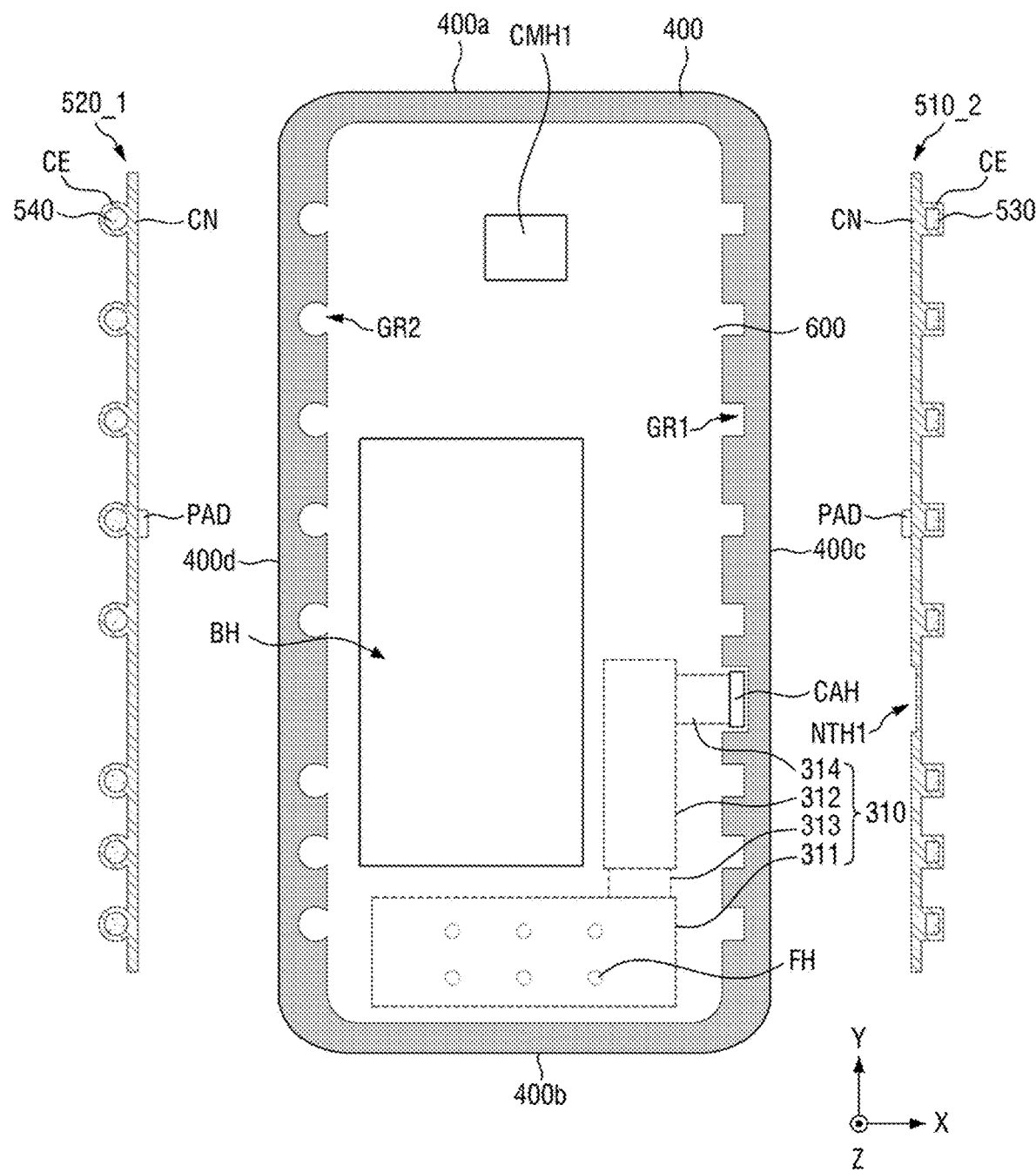
FIG. 20 is a plan view showing a waterproofing member and first and second pressure sensors according to another exemplary embodiment of the invention.

FIG. 20 is a plan view showing a waterproofing member and first and second pressure sensors according to another exemplary embodiment.

Referring to FIG. 20, in an exemplary embodiment, the waterproof member 400 may include a plurality of first accommodation portions GR1 and a plurality of second accommodation portions GR2, and the plurality of first accommodation portions GR1 and the plurality of second accommodation portions GR2 may have the same shape. For example, the plurality of first rectangular accommodation portions GR1 with one side thereof opened may be disposed in the first long side 400c of the waterproof member 400, and the plurality of second circular accommodation portions GR2 with a part thereof opened may be disposed in the second long side 400d of the waterproof member 400.

A first pressure sensor 510_2 may include a plurality of rectangular pressure sensing cells CE protruding from a connection portion CN corresponding to the plurality of first accommodation portions GR1 of the waterproof member 400, and a second pressure sensor 520_1 may include a plurality of circular pressure sensing cells CE protruding from a connection portion CN corresponding to the plurality of second accommodation portions GR2 of the waterproof member 400. Specifically, the first pressure sensor 510_2 may include a connecting portion CN extending in the second direction (Y-axis direction) and a plurality of rectangular pressure sensing cells CE protruding from the connecting portion CN in the first direction (X-axis direction), and the second pressure sensor 520_1 may include a connecting portion CN extending in the second direction (Y-axis direction) and a plurality of circular pressure sensing cells CE protruding from the connecting portion CN in a direction opposite to the first direction (X-axis direction). Since the plurality of rectangular pressure sensing cells CE of the first pressure sensor 510_2 are inserted and accommodated in the plurality of first accommodation portions GR1 of the waterproof member 400 and the plurality of circular pressure sensing cells CE of the second pressure sensor 520_1 are inserted and accommodated in the plurality of second accommodation portions GR2 of the waterproof member 400, a space for disposing the first pressure sensor 510_2 and the second pressure sensor 520_1 can be substantially reduced.

Figure 21:
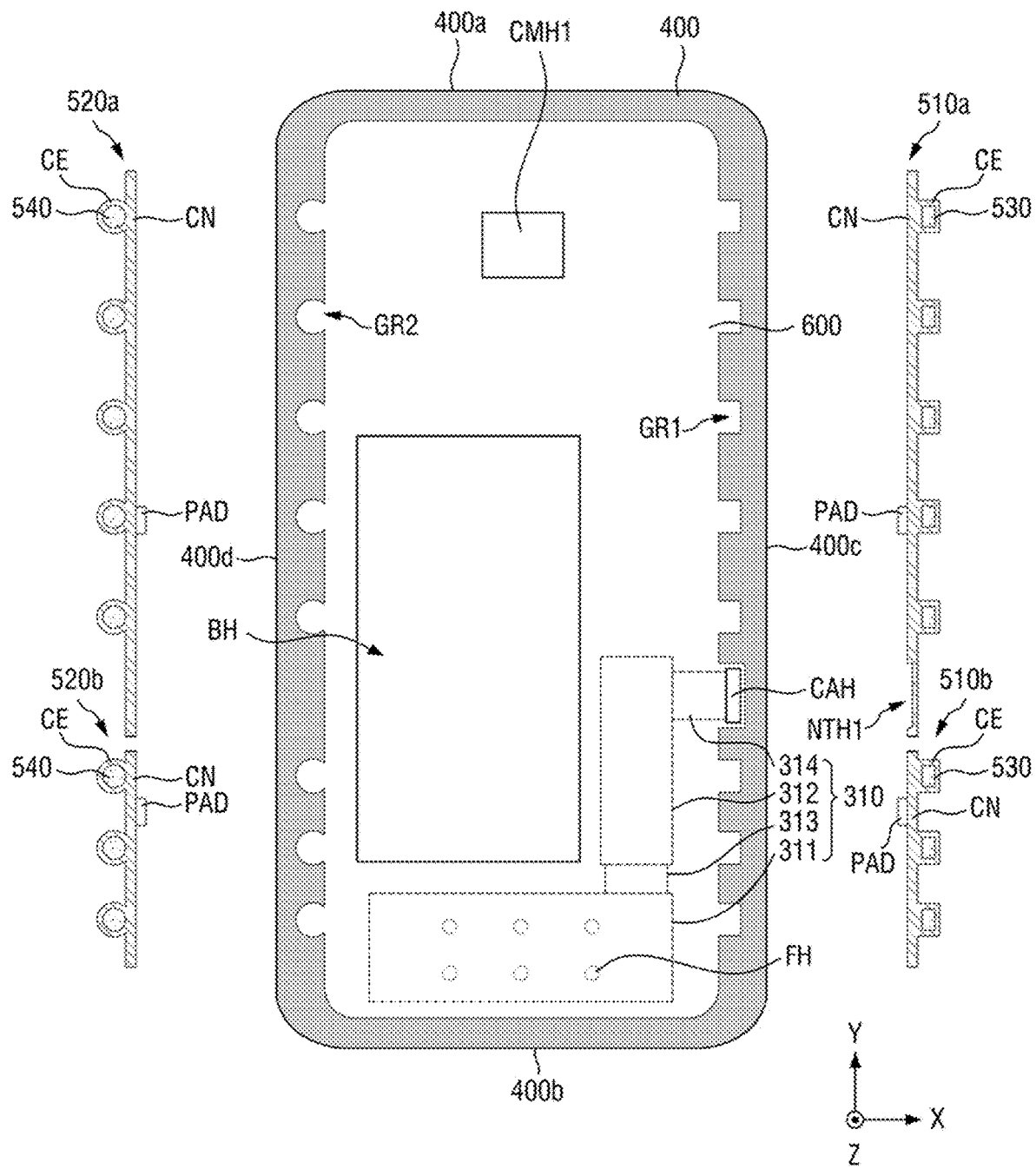
FIG. 21 is a plan view showing a waterproofing member and first and second pressure sensors according to another exemplary embodiment of the invention.

FIG. 21 is a plan view showing a waterproofing member and first and second pressure sensors according to another exemplary embodiment. The exemplary embodiment of FIG. 21 is different from the aforementioned exemplary embodiment of FIG. 20 in that each of a first pressure sensor and a second pressure sensor is disposed to be separated into two parts. A description overlapping the exemplary embodiment of FIG. 20 will be omitted, and differences will be mainly described.

Referring to FIG. 21, in an exemplary embodiment, the waterproofing member 400 may include a plurality of first accommodation portions GR1 and a plurality of second accommodation portions GR2, which have different shapes from each other. The first pressure sensor 510 may be configured to be separated into a first portion 510*a* and a second portion 510*b*, and the second pressure sensor 520 may be configured to be separated into a first portion 520*a* and a second portion 520*b*. The plurality of pressure sensing cells CE of the first portion 510*a* and second portion 510*b* of the first pressure sensor 510 may be inserted and accommodated in the plurality of first accommodation portions GR1 of the waterproofing member 400, respectively, and the plurality of pressure sensing cells CE of the first portion 520*a* and second portion 520*b* of the second pressure sensor 520 may be inserted and accommodated in the plurality of second accommodation portions GR2 of the waterproofing member 400, respectively. Accordingly, a space for disposing the first pressure sensor 510_2 and the second pressure sensor 520_1 can be substantially reduced, and the degree of freedom in designing the layout of the pressure sensors can be increased beyond the space limitations.

Figure 22:
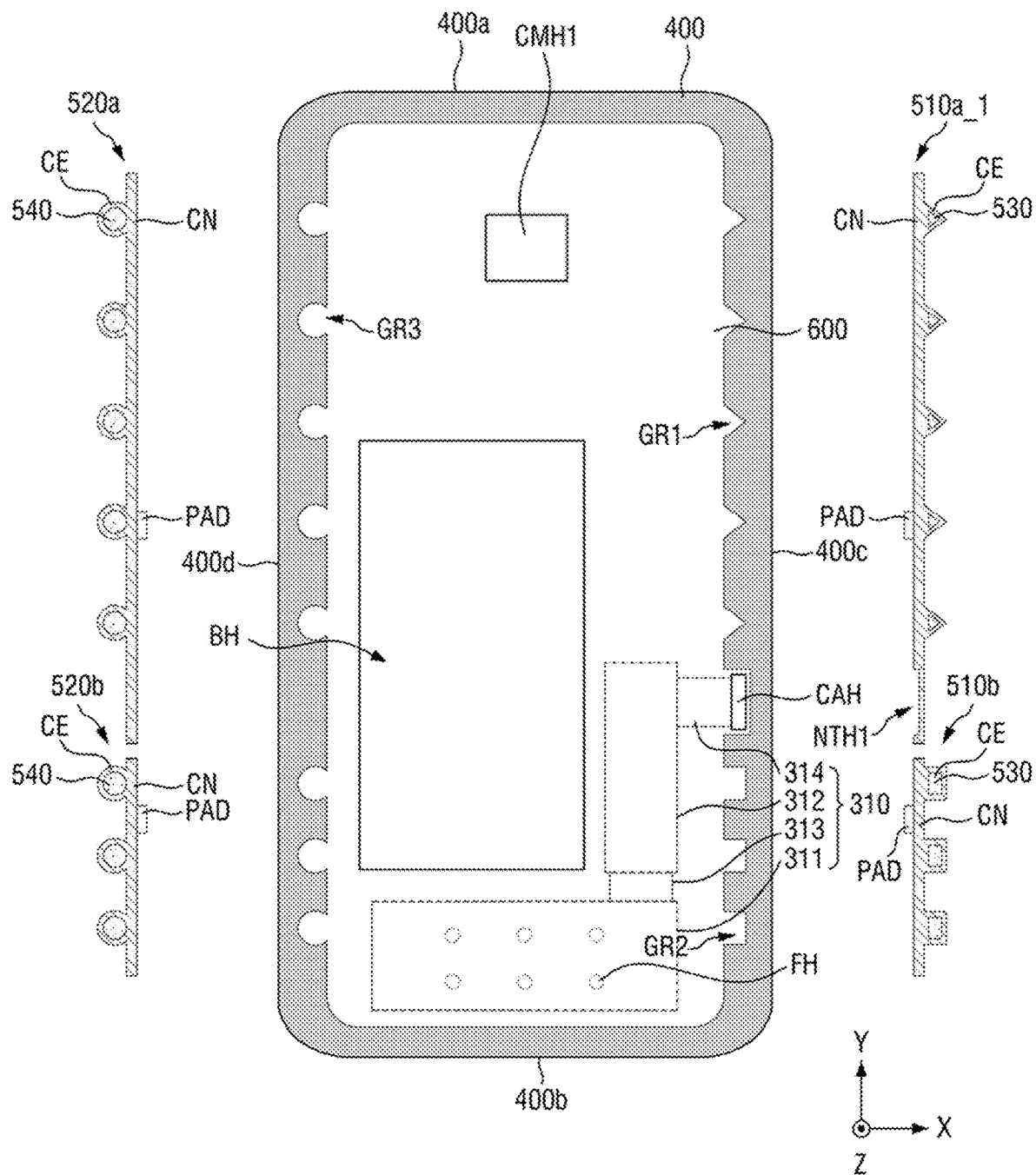
FIG. 22 is a plan view showing a waterproofing member and first and second pressure sensors according to another exemplary embodiment of the invention.

FIG. 22 is a plan view showing a waterproofing member and first and second pressure sensors according to another exemplary embodiment. The exemplary embodiment of FIG. 22 is different from the aforementioned exemplary embodiment of FIG. 21 in that the shape of a first portion of a first pressure sensor of FIG. 22 is different from the shape of the first portion of the first pressure sensor of FIG. 21. A description overlapping the exemplary embodiment of FIG. 21 will be omitted, and differences will be mainly described.

Referring to FIG. 22, in an exemplary embodiment, the waterproofing member 400 may include a plurality of first accommodation portions GR1, a plurality of second accommodation portions GR2, and a plurality of third accommodation portions GR3, which have different shapes from each other. Each of the first accommodation portions GR1 may have a triangular shape with one side thereof opened, each of the second accommodation portions GR2 may have a rectangular shape with one side thereof opened, and each of the third accommodation portions GR3 may have a circular shape with a part thereof opened.

The first pressure sensor 510 may be configured to be separated into a first portion 510*a*_1 and a second portion 510*b*, and the second pressure sensor 520 may be configured to be separated into a first portion 520*a* and a second portion 520*b*. The first portion 510*a*_1 of the first pressure sensor 510 may have a plurality of triangular pressure sensing cells CE, and the plurality of triangular pressure sensing cells CE may be inserted and accommodated in the plurality of first accommodation portions GR1 of the waterproofing member 400, respectively. The second portion 510*b* of the first pressure sensor 510 may have a plurality of rectangular pressure sensing cells CE, and the plurality of rectangular pressure sensing cells CE may be inserted and accommodated in the plurality of second accommodation portions GR2 of the waterproofing member 400, respectively. The first portion 520*a* and second portion 520*b* of the second pressure sensor 520 may have a plurality of circular pressure sensing cells CE, and the plurality of circular pressure sensing cells CE may be inserted and accommodated in the plurality of third accommodation portions GR3 of the waterproofing member 400, respectively. Accordingly, a space for disposing the first pressure sensor 510 and the second pressure sensor 520 can be substantially reduced, and the degree of freedom in designing the layout of the pressure sensors can be increased beyond the space limitations.

Figure 23:
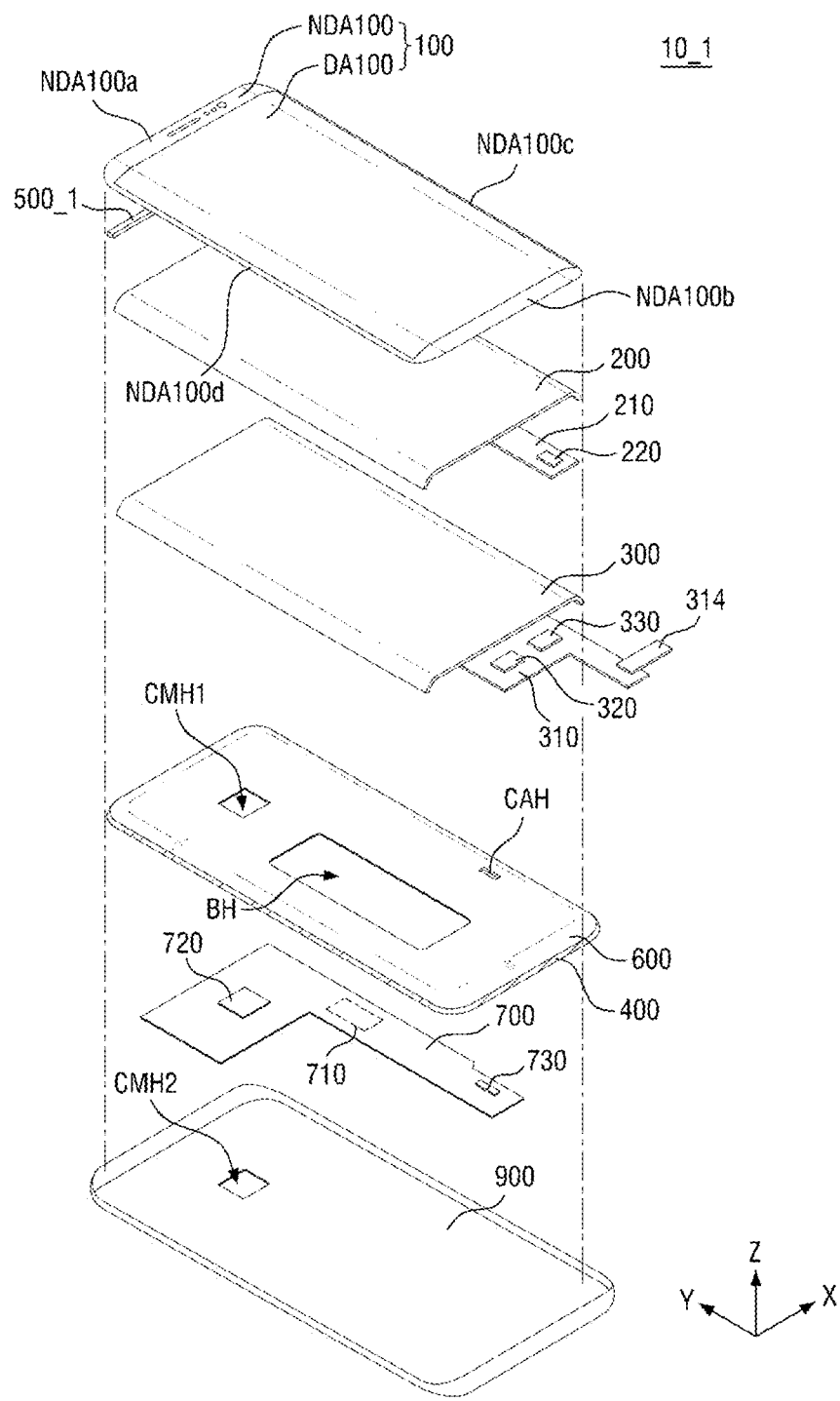
FIG. 23 is an exploded perspective view of a display device according to another exemplary embodiment of the invention.

FIG. 23 is an exploded perspective view of a display device according to another exemplary embodiment. The exemplary embodiment of FIG. 23 is different from the aforementioned embodiment of FIG. 2 in that a pressure sensor is disposed on the lower surface of a cover window. A description overlapping the exemplary embodiment of FIG. 2 will be omitted, and differences will be mainly described.

Referring to FIG. 23, a display device 10_1 according to another exemplary embodiment includes a cover window 100, a pressure sensor 500_1, a touch sensing unit 200, a touch circuit board 210, a touch driving unit 220, a display panel 300, a display circuit board 310, a display driving unit 320, a pressure sensing unit 330, a pressure sensing circuit board 550, a middle frame 600, a main circuit board 700, and a lower cover 900.

In an exemplary embodiment, the cover window 100 may include a light transmitting area DA100 corresponding to the display panel 300 and a light blocking area NDA100 corresponding to an area other than the display panel 300. The light blocking area NDA100 may include a first light blocking portion NDA100*a* and a second light blocking portion NDA100*b* facing each other in the second direction (Y-axis direction) and extending in the first direction (X-axis direction), and a third light blocking portion NDA100*c* and a fourth light blocking portion NDA100*d* facing each other in the first direction (X-axis direction) and extending in the second direction (Y-axis direction). The first light blocking portion NDA100*a*, the second light blocking portion NDA100*b*, the third light blocking portion NDA100*c*, and the fourth light blocking portion NDA100*d* are connected to each other to form an edge shape surrounding the outer side of the light transmitting area DA100, but the inventive concepts are not limited thereto.

In an exemplary embodiment, the light blocking area NDA100 may be provided with a plurality of holes HH for exposing a front camera, a front speaker, an infrared sensor, an iris recognition sensor, an ultrasonic sensor, an illuminance sensor, or the like, but the inventive concepts are not limited thereto.

The cover window 100 may be made of glass, sapphire, and/or plastic. The cover window 100 may be rigid or flexible.

The touch sensing unit 200 and the display panel 300 disposed under the cover window 100 may have a smaller area than the cover window 100. For example, the touch sensing unit 200 and the display panel 300 disposed under the cover window 100 may overlap the light transmitting area DA100 of the cover window 100, and may not overlap the light blocking area NDA100.

In an exemplary embodiment, the pressure sensor 500_1 may be disposed between the light blocking area NDA 100 of the cover window 100 and the middle frame 600. For example, the pressure sensor 500_1 may be disposed between the first light blocking portion NDA100a of the cover window 100 and the middle frame 600. However, the inventive concepts are not limited thereto. The pressure sensor 500_1 may be disposed between the middle frame 600 and any one of the first to fourth light blocking portions NDA100a, NDA100b, NDA100c, and NDA100d of the cover window 100, and may also be disposed between the middle frame 600 and two or more of the first to fourth light blocking portions NDA100a, NDA100b, NDA100c, and NDA100d. One surface of the pressure sensor 500_1 may be attached to one surface of the cover window 100, and the other surface thereof may be supported by the middle frame 600. However, the inventive concepts are not limited thereto, and the other surface of the pressure sensor 500_1 may be supported by the lower cover 900. Similar to this, the light blocking area NDA100 of the cover window 100 is provided with the pressure sensor 500_1, so that a non-display area from which no image is output can be utilized as a physical button for performing a specific function.

Figure 24:
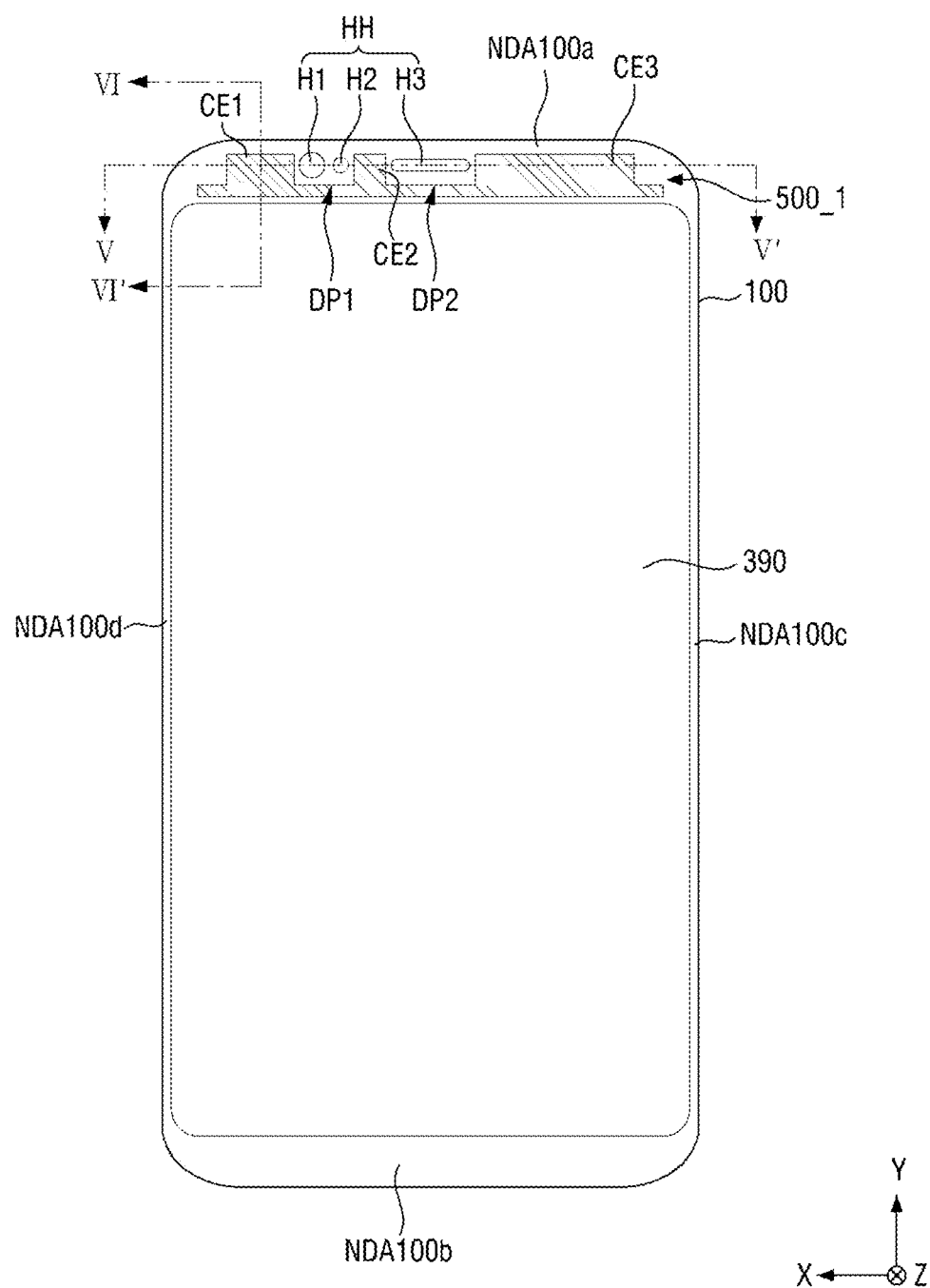
FIG. 24 is a bottom view showing an exemplary embodiment of a cover window and a pressure sensor.
Figure 25:
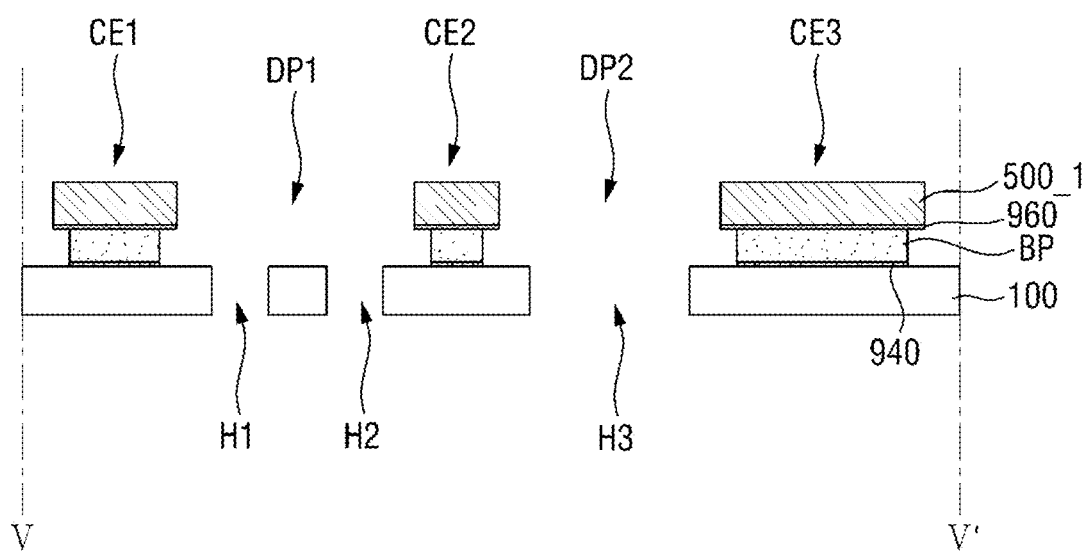
FIG. 25 is a cross-sectional view taken along the line V-V of FIG. 24.
Figure 26:
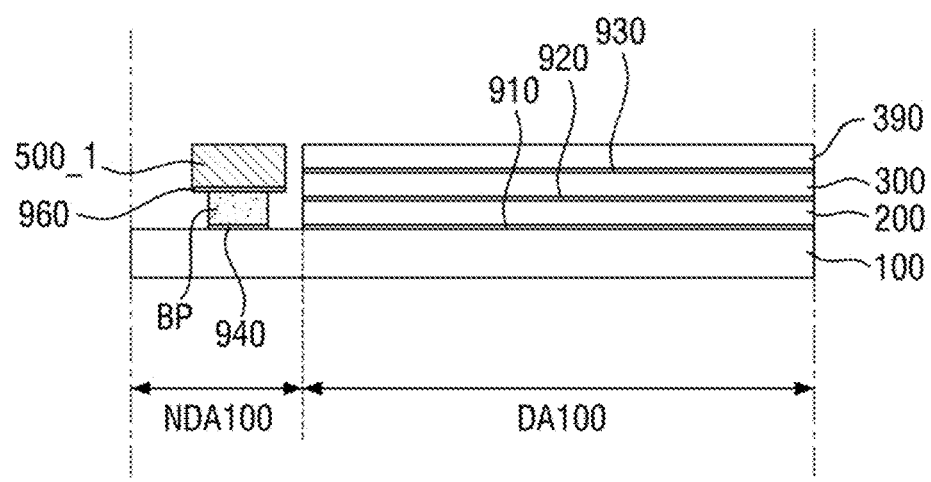
FIG. 26 is a cross-sectional view taken along the line VI-VI' of FIG. 24.
Figure 27:
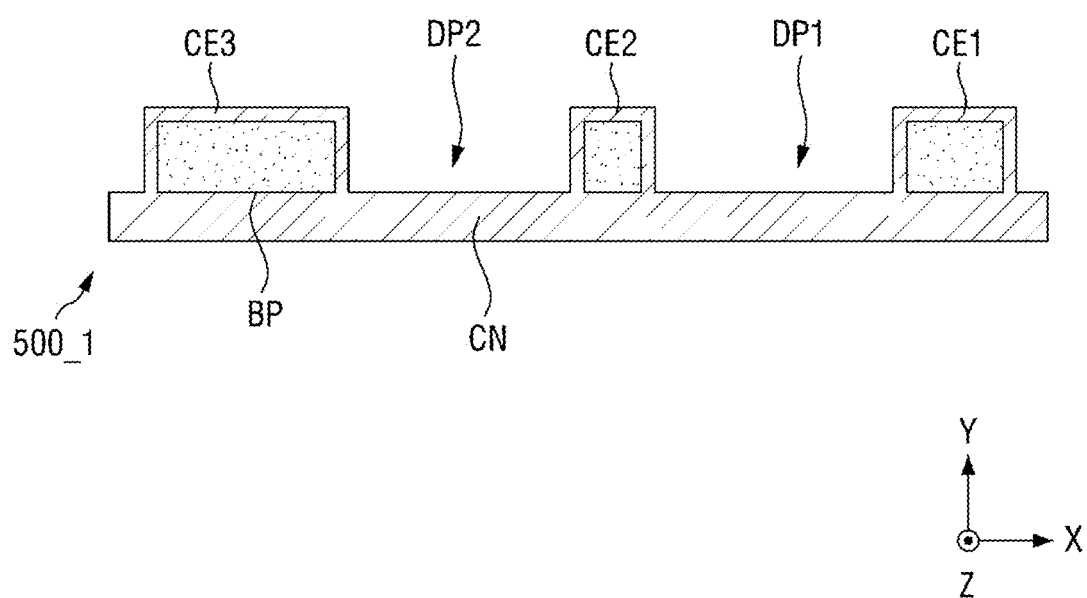
FIG. 27 is a plan view showing the upper surface of a pressure sensor.

FIG. 24 is a bottom view showing an exemplary embodiment of a cover window and a pressure sensor; FIG. 25 is a cross-sectional view taken along the line V-V of FIG. 24; FIG. 26 is a cross-sectional view taken along the line VI-VI' of FIG. 24; and FIG. 27 is a plan view showing the upper surface of a pressure sensor.

Referring to FIG. 24, in an exemplary embodiment, the touch sensing unit 200, the display panel 300, and the panel lower member 390 may be disposed on the back surface of the light transmitting area DA100 of the cover window 100, and the pressure sensor 500_1 may be disposed on the back surface of the first light blocking portion NDA100a, as shown in FIG. 26. In the exemplary embodiment, the first light blocking portion NDA100a may include a plurality of holes HH for exposing a front camera, a front speaker, an infrared sensor, an iris recognition sensor, an ultrasonic sensor, an illuminance sensor, or the like. However, for convenience of explanation, it is assumed that the plurality of holes HH include a first hole H1, a second hole H2, and a third hole H3.

The plurality of holes HH formed in the first light blocking portion NDA100a are arranged in one row in the first direction (X-axis direction). However, the inventive concepts are not limited thereto. The plurality of holes HH formed in the first light blocking portion NDA100a may be arranged in a plurality of rows in the first direction (X-axis direction), and may also be arranged irregularly.

The pressure sensor 500_1 may extend in the first direction (X-axis direction) to be disposed on the first light blocking portion NDA100a, and may be disposed to bypass the plurality of holes HH disposed in the first light blocking portion NDA 100a. For example, the pressure sensor 500_1 may include a first opening portion DP1 for exposing the first hole H1 and the second hole H2, and a second opening portion DP2 for exposing the third hole H3. However, the present invention is not limited thereto, and the pressure sensor 500_1 may include three opening portions for respectively exposing the first hole H1, the second hole H2, and the third hole H3, and may also include one opening portion for simultaneously exposing the first hole H1, the second hole H2, and the third hole H3. The pressure sensor 500_1 may be provided with the first pressure sensing cell CE1, the second pressure sensing cell CE2, and the third pressure sensing cell CE3, having protruding shapes, due to the first opening portion DP1 and the second opening portion DP2.

Figure 29:
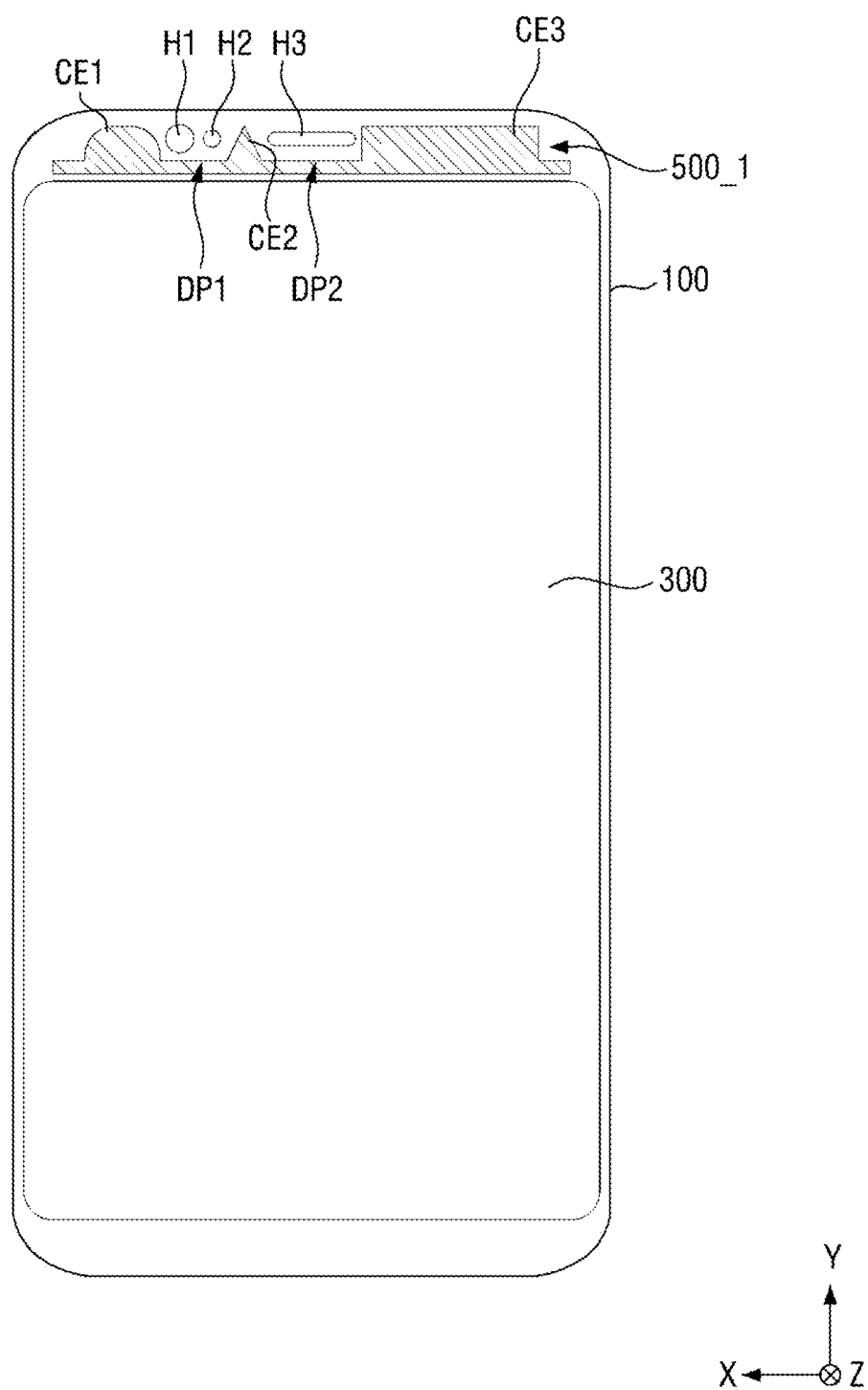
FIG. 29 and FIG. 30 are bottom views showing another exemplary embodiment of a cover window and a pressure sensor.
Figure 30:
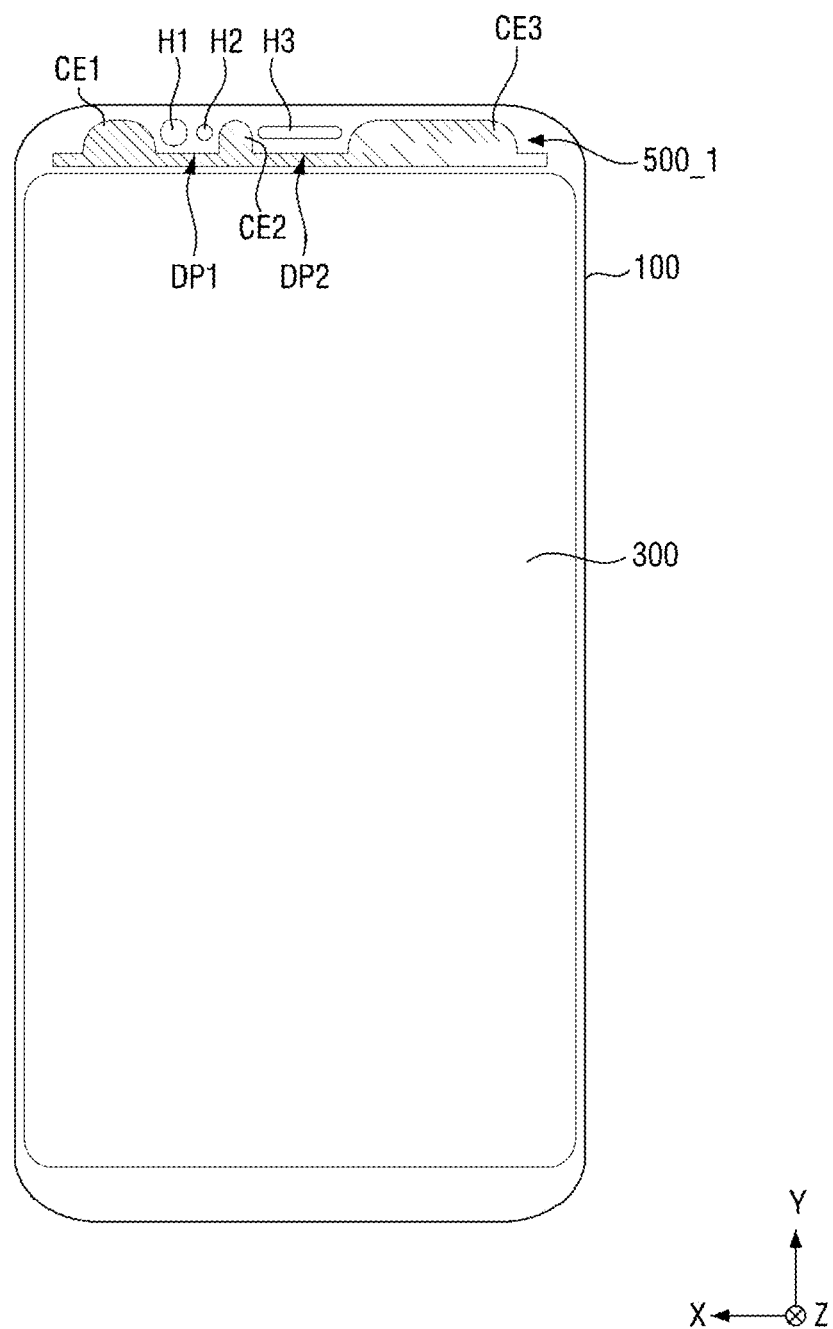

Although it is shown in FIG. 24 that the first opening portion DP1, the second opening portion DP2, the first pressure sensing cell CE1, the second pressure sensing cell CE2, and the third pressure sensing cell CE3 have rectangular shapes, this is an example. FIGS. 29 and 30 are bottom views showing another exemplary embodiment of a cover window and a pressure sensor. Referring to FIGS. 29 and 30, the first opening portion DP1 and the second opening portion DP2 may have various shapes capable of exposing the plurality of holes HH, and the first pressure sensing cell CE1, the second pressure sensing cell CE2, and the third pressure sensing cell CE3 may also have various shapes, such as a triangular shape and a semicircular shape.

Referring to FIGS. 25 and 27 together, in an exemplary embodiment, bumps BP may be disposed on the pressure sensor 500_1. The bumps BP may be disposed between the pressure sensor 500_1 and the back surface of the cover window 100. The pressure sensor 500_1 may include a first pressure sensing cell CE1, a second pressure sensing cell CE2, and a third pressure sensing cell CE. The first pressure sensing cell CE1 may be disposed in the first direction (X-axis direction) of the first opening portion DP1, the second pressure sensing cell CE2 may be disposed between the first opening portion DP1 and the second opening portion DP2, and the third pressure sensing cell CE3 may be disposed in a direction opposite to the first direction (X-axis direction) of the second opening portion DP2. However, the inventive concepts are not limited thereto. The bumps BP may be respectively disposed on the first to third pressure sensing cells CE1, CE2, and CE3 depending on the shapes and sizes the first to third pressure sensing cells CE1, CE2, and CE3. The size of each of the bumps BP may be smaller than that of each of the first to third pressure sensing cells CE1, CE2, and CE3. However, the inventive concepts are not limited thereto.

Referring to FIG. 26, the touch sensing unit 200 may be attached to the back surface of the light transmitting area DA100 of the cover window 100 through the first adhesive member 910, the display panel 300 may be attached to the back surface of the touch sensing unit 200 through the second adhesive member 920, and the panel lower member 390 may be attached to the back surface of the display panel 300 through the third adhesive member 930. The bump BP may be attached to the back surface of the first light blocking portion NDA100a through the fourth adhesive member 940, the pressure sensor 500_1 may be attached to the back surface of the bump BP through the sixth adhesive member 960, and, although not shown, the back surface of the pressure sensor 500_1 may be attached to the middle frame 600 through the fifth adhesive member 950. Similar to this, the light blocking area NDA100 of the cover window 100 is provided with the pressure sensor 500_1, so that a non-display area from which no image is output can be utilized as a physical button for performing a specific function.

Figure 28:
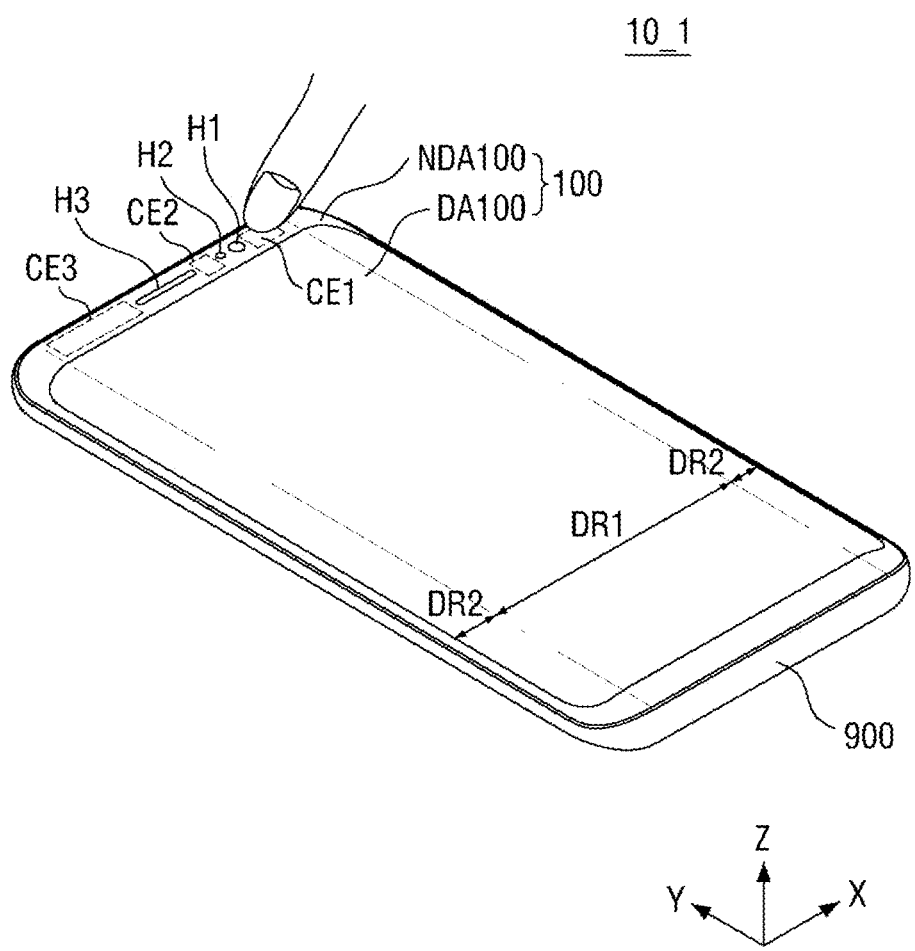
FIG. 28 is an exemplary view showing a display device utilizing a pressure sensor as a physical button according to an exemplary embodiment of the invention.

FIG. 28 is an exemplary view showing a display device utilizing a pressure sensor as a physical button according to an exemplary embodiment.

It is shown in FIG. 28 that the first to third pressure sensing cells CE1 to CE3 of the pressure sensor 500_1 are disposed on the first light blocking portion NDA100a of the display device 10_1 and that a user presses the first pressure sensing cell CE1 of the display device 10_1 with the forefinger of the user. When pressure is sensed from the first to third pressure sensing cells CE1 to CE3 of the pressure sensor 500_1 disposed on the first light blocking portion NDA100a of the display device 10_1, the main processor 710 may control the display device 10_1 to execute preset functions. For example, the main processor 710 may be programmed such that different operations from each other are executed for each of the first to third pressure sensing cells CE1 to CE3 of the pressure sensor 500_1. When pressure is sensed from the first to third pressure sensing cells CE1 to CE3, a camera, an internet application, power on/off of a display device, and the like may be executed.

Figure 31:
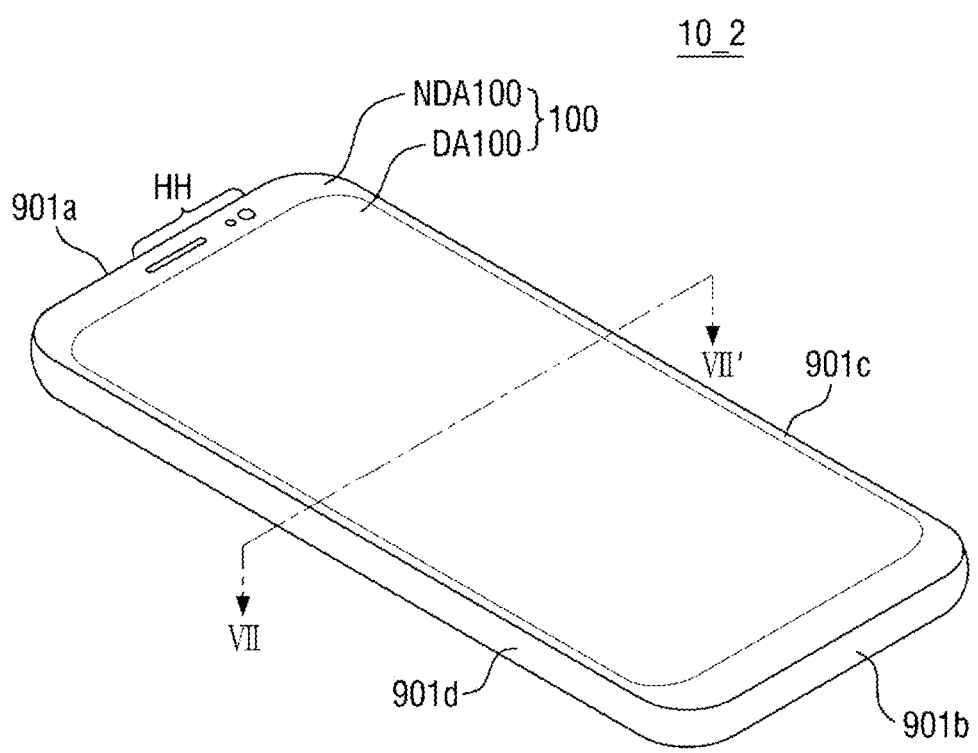
FIG. 31 is a perspective view of a display device according to another exemplary embodiment of the invention.
Figure 32:
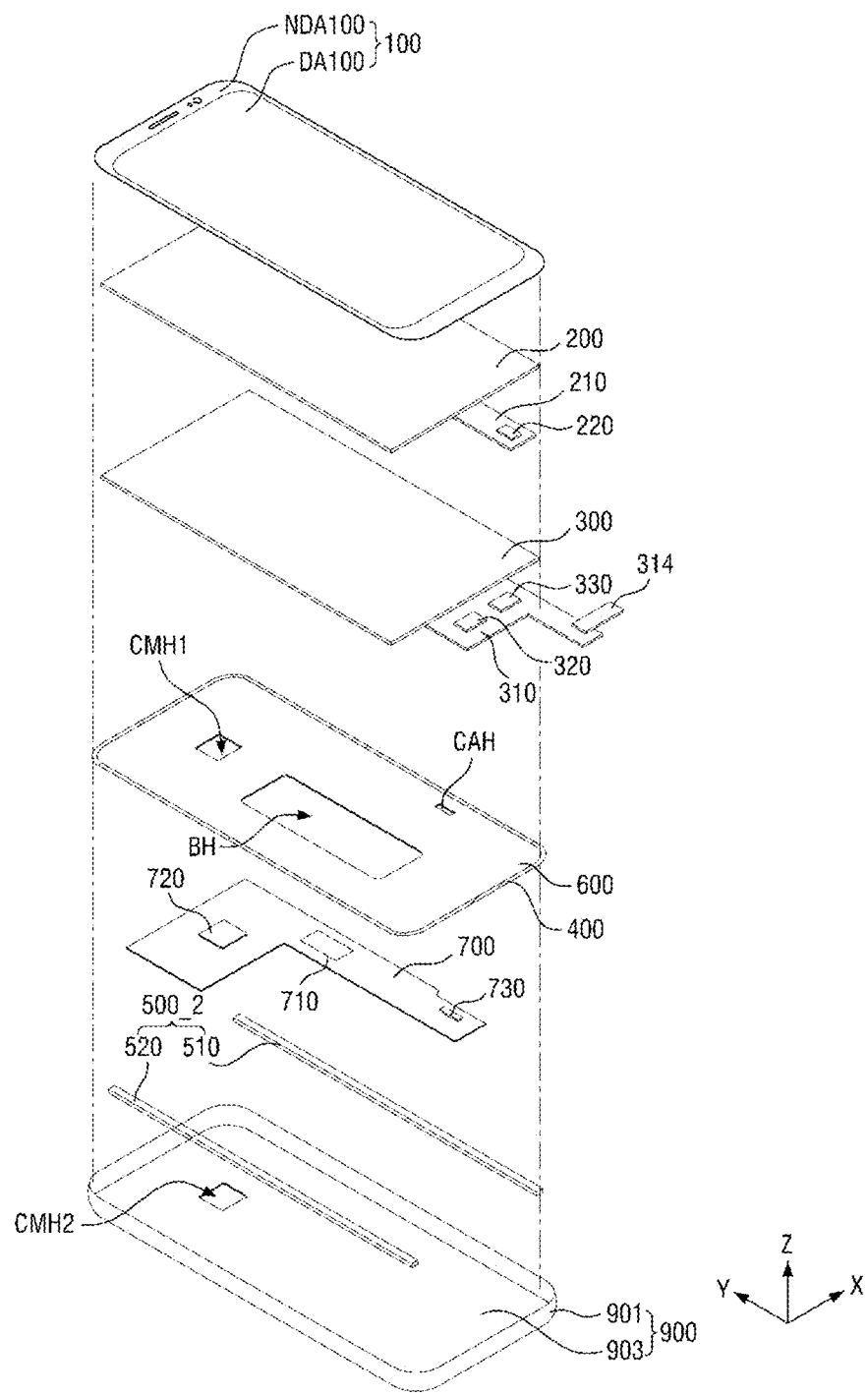
FIG. 32 is an exploded perspective view of a display device according to another exemplary embodiment of the invention.

FIG. 31 is a perspective view of a display device according to another exemplary embodiment. FIG. 32 is an exploded perspective view of a display device according to another exemplary embodiment. The display device 10_2 of FIGS. 31 and 32 is different from the display device 10 of FIGS. 1 and 2 in that the display device 10_2 has only a flat first area, a lower cover surrounds the side surface of the display device, and a pressure sensor is disposed on the side surface of the lower cover. A description overlapping the exemplary embodiment of FIGS. 1 and 2 will be omitted, and differences will be mainly described.

Referring to FIGS. 31 and 32, the display device 10_2 according to another exemplary embodiment includes a cover window 100, a touch sensing unit 200, a touch circuit board 210, a touch driving unit 220, a display panel 300, a display circuit board 310, a display driving unit 320, a pressure sensing unit 330, a pressure sensor 500_2, a pressure sensing circuit board 550, a middle frame 600, a main circuit board 700, and a lower cover 900.

In an exemplary embodiment, the cover window 100, the touch sensing unit 200, and the display panel 300 may be flat, and the lower cover 900 may include a flat bottom surface 903 and a side surface 901 bent from the bottom surface 903. The side surface 901 of the lower cover 900 may be coupled to the cover window 100 while covering the side surfaces of the cover window 100, the touch sensing device 200, and the display panel 300. However, the inventive concepts are not limited thereto, and the side surface 901 of the lower cover 900 may be disposed to cover some of the side surfaces of the cover window 100, the touch sensing unit 200, and the display panel 300.

The side surface 901 of the lower cover 900 may include first and second side surfaces 901a and 901b facing each other in the second direction (Y-axis direction) and extending in the first direction (X-axis direction), and third and fourth side surfaces 901c and 901d facing each other in the first direction (X-axis direction) and extending in the second direction (Y-axis direction). The first side surface 901a, the second side surface 901b, the third side surface 901c, and the fourth side surface 901d are connected to each other to cover the side surfaces of the cover window 100, the touch sensing unit 200, and the display panel 300, so that the cover window 100, the touch sensing unit 200, and the display panel 300 may be stably accommodated in the lower cover 900.

In an exemplary embodiment, the pressure sensor 500_2 may include a first pressure sensor 510 and a second pressure sensor 520, and the first pressure sensor 510 and the second pressure sensor 520 may be disposed on the side surface 901 of the lower cover 900.

Figure 33:
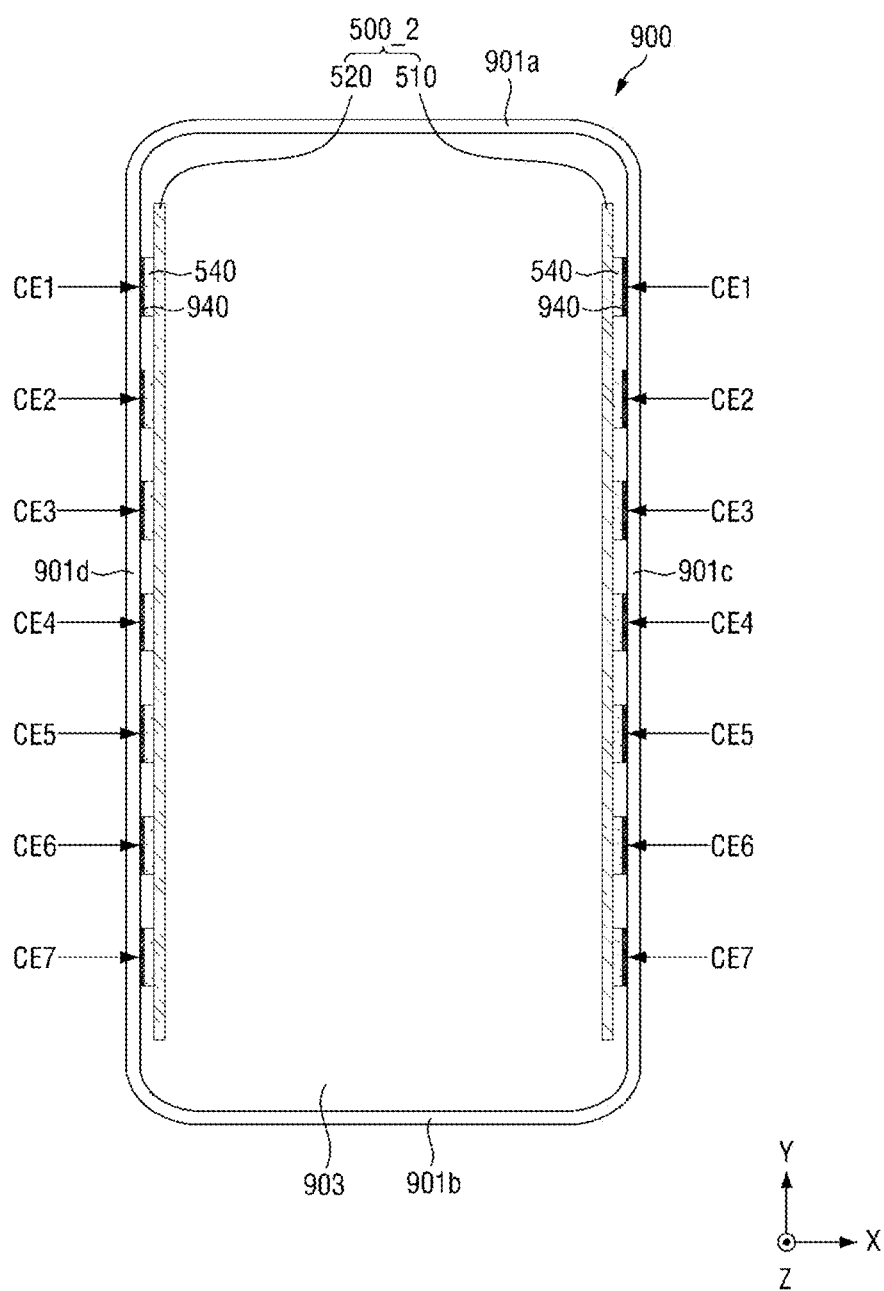
FIG. 33 is a plan view schematically showing a lower cover and a pressure sensor disposed on the lower cover.

FIG. 33 is a plan view schematically showing a lower cover and a pressure sensor disposed on the lower cover.

Referring to FIG. 33, in an exemplary embodiment, the first pressure sensor 510 may be disposed on the third side surface 901c of the lower cover 900, and the second pressure sensor 520 may be disposed on the fourth side surface 901d of the lower cover 900. However, the inventive concepts are not limited thereto.

Each of the first pressure sensor 510 and the second pressure sensor 520 may include a plurality of pressure sensing cells CE1 to CE7. For example, each of the first pressure sensor 510 and the second pressure sensor 520 may include first to seventh pressure sensing cells CE1 to CE7 spaced apart from each other in the second direction (Y-axis direction). Although it is illustrated in the exemplary embodiment that each of the first pressure sensor 510 and the second pressure sensor 520 includes seven pressure sensing cells CE1 to CE7, the number of pressure sensing cells is not limited thereto.

A plurality of first bumps 530 spaced apart from each other along the second direction (Y-axis direction) may be disposed between the first to seventh pressure sensing cells CE1 to CE7 of the first pressure sensor 510 and the third side surface 901c of the lower cover 900. The plurality of first bumps 530 may be attached and fixed to the third side surface 901c of the lower cover 900 by the fourth adhesive member 940. Further, as shown in FIG. 35, the back surfaces of the plurality of first bumps 530 may be attached to the first to seventh pressure sensing cells CE1 to CE7 of the first pressure sensor 510 by the sixth adhesive member 960, respectively.

A plurality of second bumps 540 spaced apart from each other along the second direction (Y-axis direction) may be disposed between the first to seventh pressure sensing cells CE1 to CE7 of the second pressure sensor 520 and the fourth side surface 901d of the lower cover 900. The plurality of second bumps 540 may be attached and fixed to the fourth side surface 901d of the lower cover 900 by the fourth adhesive member 940. Similarly to the back surfaces of the plurality of first bumps 530, the back surfaces of the plurality of second bumps 540 may also be attached to the first to seventh pressure sensing cells CE1 to CE7 of the second pressure sensor 520 by the sixth adhesive member 960, respectively.

Figure 34:
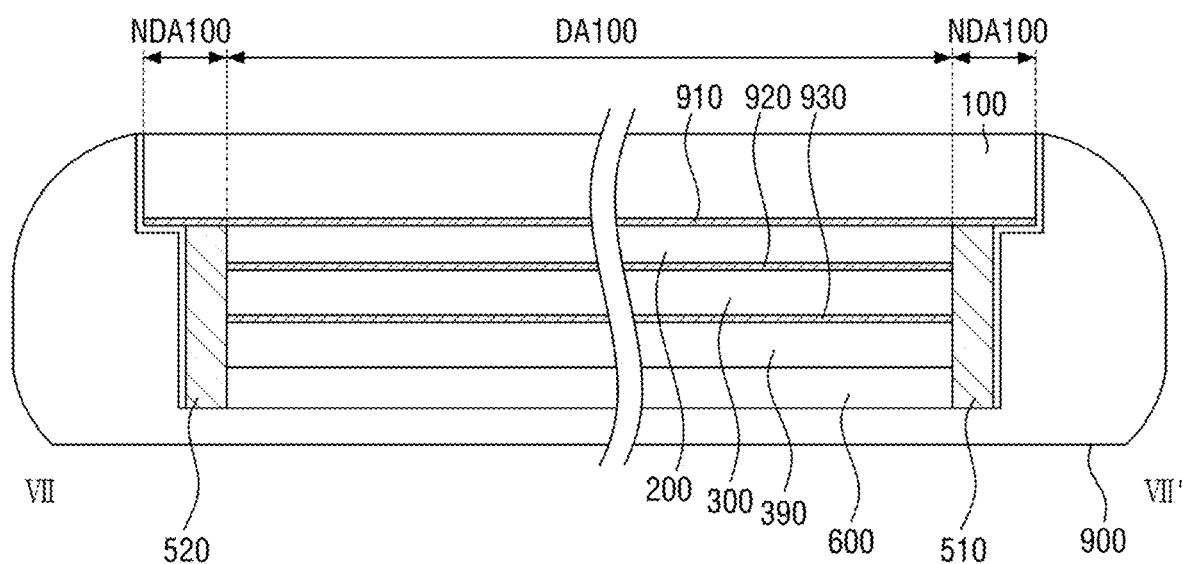
FIG. 34 is a cross-sectional view taken along the line VII-VII' of FIG. 31.
Figure 35:
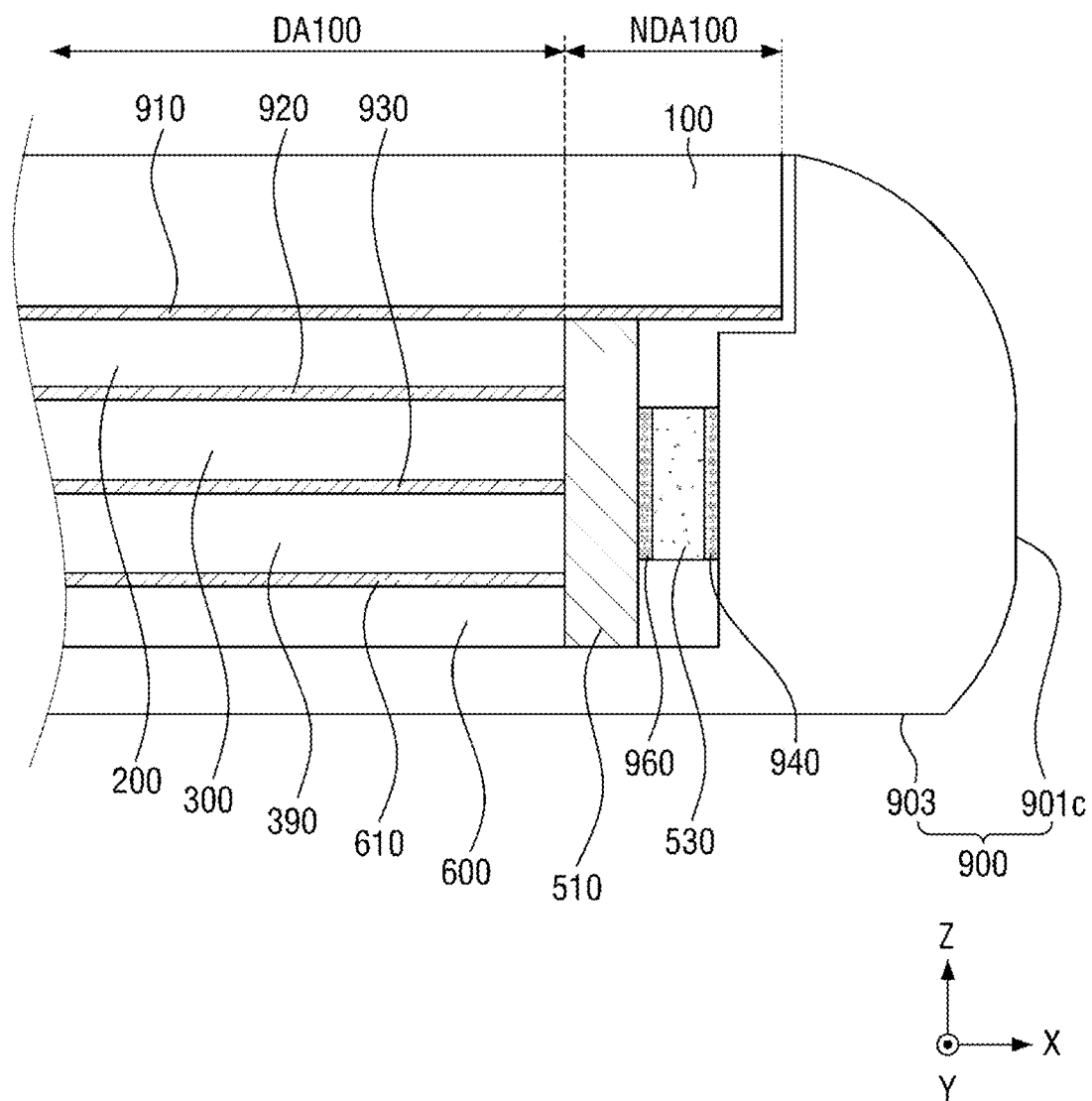
FIG. 35 is an enlarged cross-sectional view of a part of FIG. 34.

FIG. 34 is a cross-sectional view taken along the line VII-VII' of FIG. 31, and FIG. 35 is an enlarged cross-sectional view of a part of FIG. 34.

Referring to FIG. 34, in an exemplary embodiment, the touch sensing unit 200 may be attached to the back surface of the light transmitting area DA100 of the cover window 100 through the first adhesive member 910, the display panel 300 may be attached to the back surface of the touch sensing unit 200 through the second adhesive member 920, and the panel lower member 390 may be placed on the middle frame 600. The cover window 100, the touch sensing unit 200, the display panel 300, and the middle frame 600 may be accommodated in the lower cover 900. Such a configuration is merely an example, and the inventive concepts are not limited thereto. Some configurations may be omitted, or additional configurations may be provided.

Pressure sensors 510 and 520 may be disposed between the side surface 901 of the lower cover 900 and the side surfaces of the touch sensing device 200, the display panel 300 and the middle frame 600. More specifically, the cover window 100 may include a light transmitting area DA100 and a light blocking area NDA100, the touch sensing unit 200 and the display panel 300 may be disposed so as to overlap the light transmitting area DA100 of the cover window 100, and the pressure sensors 510 and 520 may be disposed under the light blocking area NDA100 of the cover window 100.

Referring to FIG. 35, the first pressure sensor 510 may be disposed such that the plurality of pressure sensing cells CE1 to CE7 face the third side 901c of the lower cover 900, and the first bumps 530 may be respectively disposed on the plurality of pressure sensing cells CE1 to CE7 and the third side surface 901c of the lower cover 900. The first bump 530 may be attached and fixed to the third side surface 901c of the lower cover 900 through the fourth adhesive member 940, and the first bump 530 may be attached and fixed to the plurality of pressure sensing cells CE1 to CE7 of the first pressure sensor 510 through the sixth adhesive member 940.

When pressure is applied to the first pressure sensor 510, the first pressure sensor 510 may sense the applied pressure because the side surfaces of the display panel 300 and the middle frame 600 support the back surface of the first pressure sensor 510. Although not shown, the back surface of the first pressure sensor 510 may be attached and fixed to the side surfaces of the touch sensing unit 200, the display panel 300 and the middle frame 600 through the fifth adhesive member 950.

Figure 36:
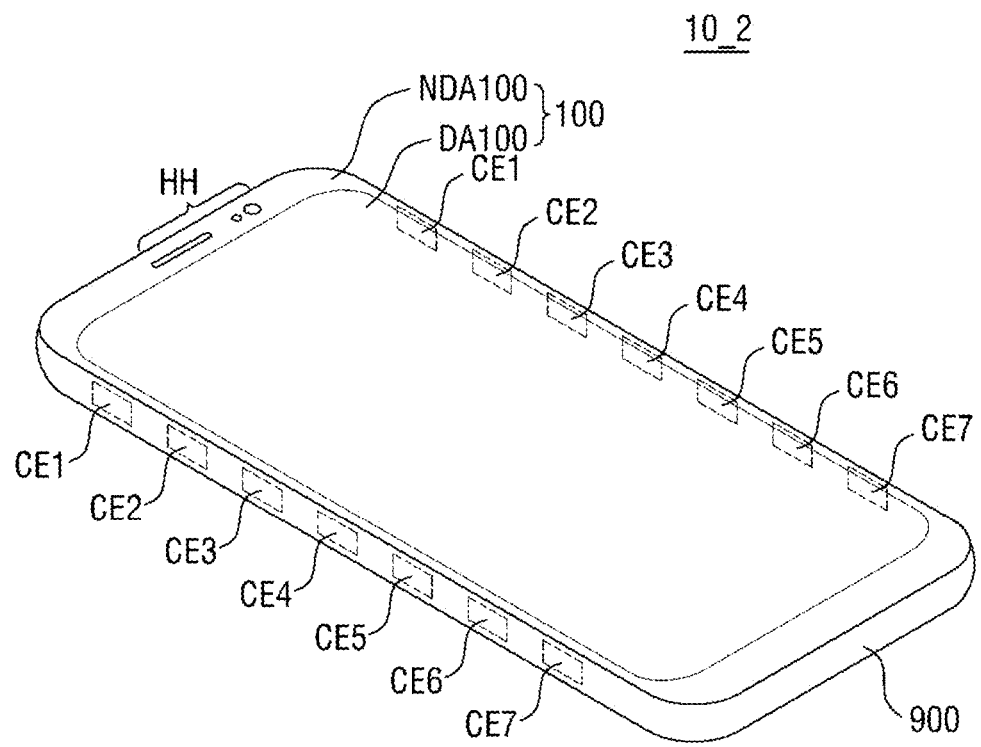
FIG. 36 is a perspective view schematically showing a pressure sensor of a display device according to an exemplary embodiment of the invention.

FIG. 36 is a perspective view schematically showing a pressure sensor of a display device according to an exemplary embodiment. The exemplary embodiment of FIG. 6 is different from the aforementioned exemplary embodiment of FIGS. 11 and 12 in that pressure sensing cells are formed on the side surface of a lower cover. Therefore, a description overlapping the exemplary embodiment of FIGS. 11 and 12 will be omitted, and differences will be mainly described.

Referring to FIG. 36, the first pressure sensor 510 and the second pressure sensor 520 are disposed on the side surface 901 of the lower cover 900 corresponding to the side surface portion of the display device 10_2, so that the plurality of pressure sensing cells CE1 to CE7 of the side surface portion of the display device 10_2 may be used as physical buttons such as a volume control button, a power button, a call button, a camera button, an internet button, and a squeezing sensing button. Therefore, a non-display area from which no image is output can be utilized as a physical button for performing a specific function.

Figure 37:
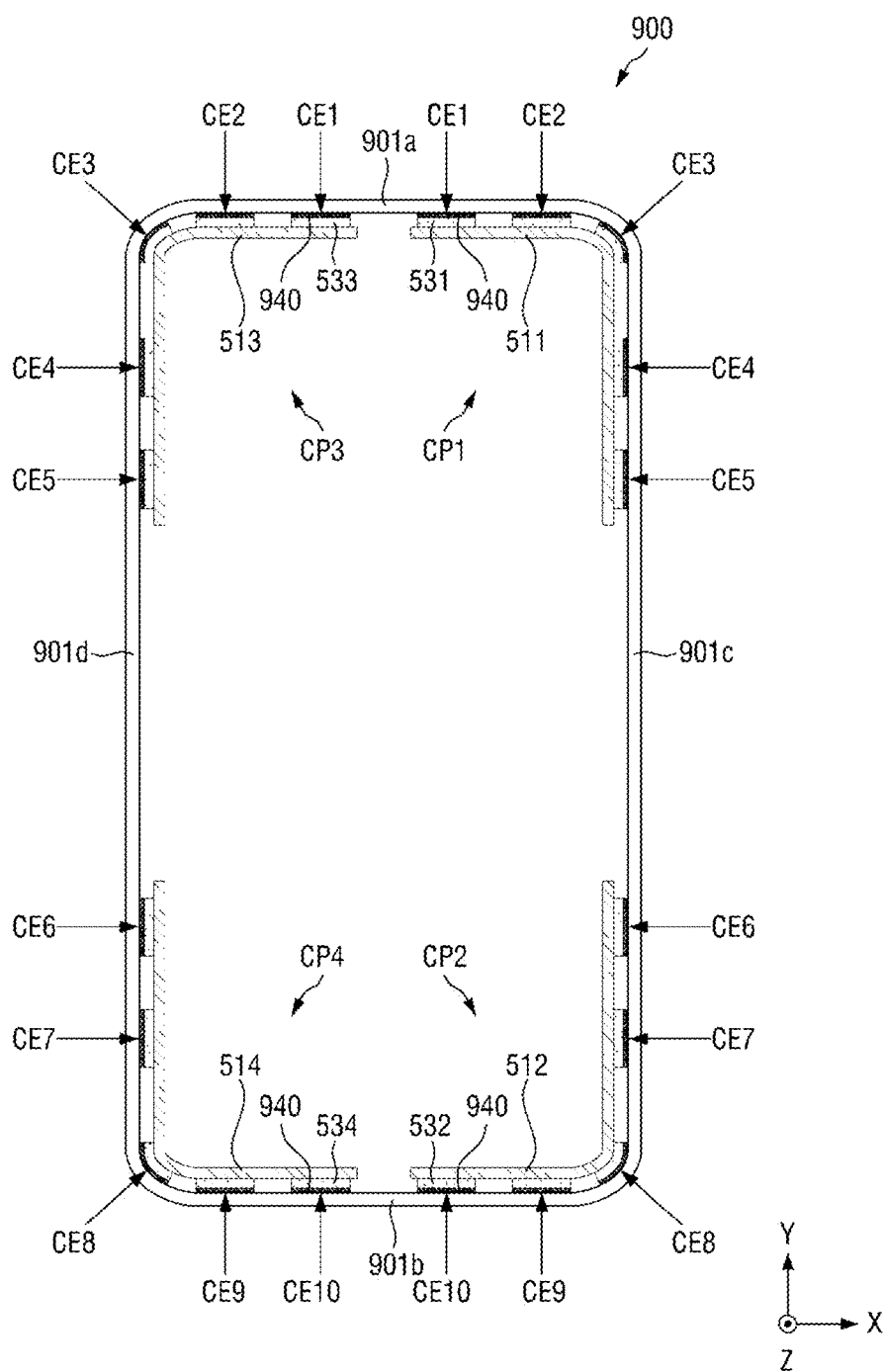
FIG. 37 is a plan view schematically showing a lower cover and a pressure sensor disposed on the lower cover according to another exemplary embodiment of the invention.
Figure 38:
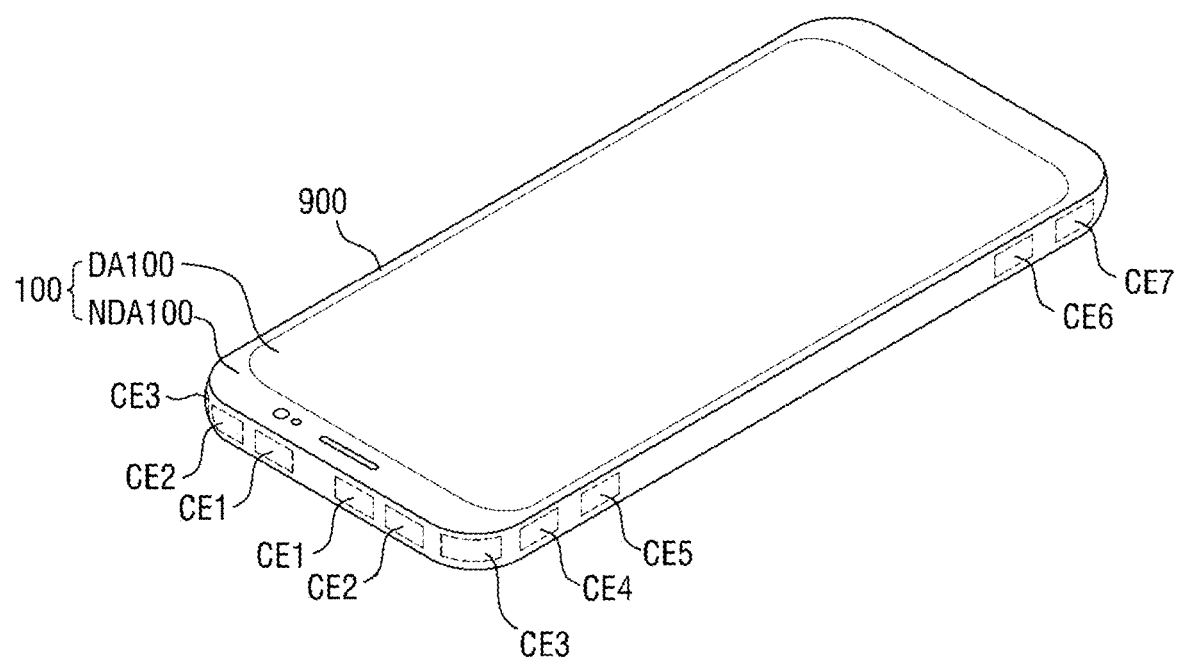
FIG. 38 is a perspective view schematically showing a pressure sensor of a display device according to another exemplary embodiment of the invention.

FIG. 37 is a plan view schematically showing a lower cover and a pressure sensor disposed on the lower cover according to another exemplary embodiment, and FIG. 38 is a perspective view schematically showing a pressure sensor of a display device according to another embodiment. A display device of FIGS. 37 and 38 is different from the aforementioned display device of FIGS. 31 to 36 in that pressure sensors are arranged at the corner regions of a lower cover. Therefore, a description overlapping the exemplary embodiment of FIGS. 31 to 36 will be omitted, and differences will be mainly described.

Referring to FIG. 37, in an exemplary embodiment, pressure sensors 511, 512, 513, and 514 may be arranged at the corner regions CP1, CP2, CP3, and CP4 of the side surface 901 of the lower cover 900. The lower cover 900 may include a first corner region CP1, a second corner region CP2, a third corner region CP3, and a fourth corner region CP4.

The first corner region CP1 is defined as a region where the first side surface 901a and third side surface 901c of the lower cover 900 are connected to each other, the second corner region CP2 is defined as a region where the third side surface 901c and second side surface 901b of the lower cover 900 are connected to each other, the third corner region CP3 is defined as a region where the second side surface 901b and fourth side surface 901d of the lower cover 900 are connected to each other, and the fourth corner region CP4 is defined as a region where the fourth side surface 901d and first side surface 901a of the lower cover 900 are connected to each other.

Although FIG. 37 illustrates an example in which the lower cover 900 includes four corner regions, the inventive concepts are not limited thereto, and the number of corner regions may be variously changed depending on the shape of the lower cover 900.

In an exemplary embodiment, pressure sensors 511, 512, 513, and 514 may be arranged at the first to fourth corner regions CP1, CP2, CP3, and CP4. For example, the first pressure sensor 511 may be disposed at the first corner region CP1, the second pressure sensor 512 may be disposed at the second corner region CP2, the third pressure sensor 513 may be disposed at the third corner region CP3, and the fourth pressure sensor 514 may be disposed at the fourth corner region CP4. However, the inventive concepts are not limited thereto, and the pressure sensors 511, 512, 513, and 514 may also be disposed at only some of the first to fourth corner regions CP1, CP2, CP3, and CP4.

The first pressure sensor 511 may be disposed at the first corner region CP1 such that the plurality of pressure sensing cells CE1 to CE5 face the first side surface 901a and third side surface 901c of the lower cover 900, first bumps 531 may be respectively disposed on the plurality of pressure sensing cells CE1 to CE5, and the first bumps 531 may be attached to the first corner region CP1 through the fourth adhesive member 940.

The second pressure sensor 512 may be disposed at the second corner region CP2 such that the plurality of pressure sensing cells CE1 to CE5 face the third side surface 901c and second side surface 901b of the lower cover 900, first bumps 532 may be respectively disposed on the plurality of pressure sensing cells CE1 to CE5, and the second bumps 532 may be attached to the second corner region CP2 through the fourth adhesive member 940.

The third pressure sensor 513 may be disposed at the third corner region CP3 such that the plurality of pressure sensing cells CE1 to CE5 face the second side surface 901b and fourth side surface 901d of the lower cover 900, third bumps 533 may be respectively disposed on the plurality of pressure sensing cells CE1 to CE5, and the third bumps 533 may be attached to the third corner region CP3 through the fourth adhesive member 940.

The fourth pressure sensor 514 may be disposed at the fourth corner region CP4 such that the plurality of pressure sensing cells CE1 to CE5 face the fourth side surface 901d and first side surface 901a of the lower cover 900, fourth bumps 534 may be respectively disposed on the plurality of pressure sensing cells CE1 to CE5, and the fourth bumps 534 may be attached to the fourth corner region CP4 through the fourth adhesive member 940.

Referring to FIG. 38, the first pressure sensor 511, the second pressure sensor 512, the third pressure sensor 513, and the fourth pressure sensor 514 are disposed at the first to fourth corner regions CP1, CP2, CP3, and CP4 of the lower cover 900 corresponding to the side edge of the display device 10_3, so that the plurality of pressure sensing cells CE1 to CE7 of the side edge of the display device 10_3 may be used as physical buttons such as a volume control button, a power button, a call button, a camera button, an internet button, and a squeezing sensing button. Therefore, a non-display area from which no image is output can be utilized as a physical button for performing a specific function.

Figure 39:
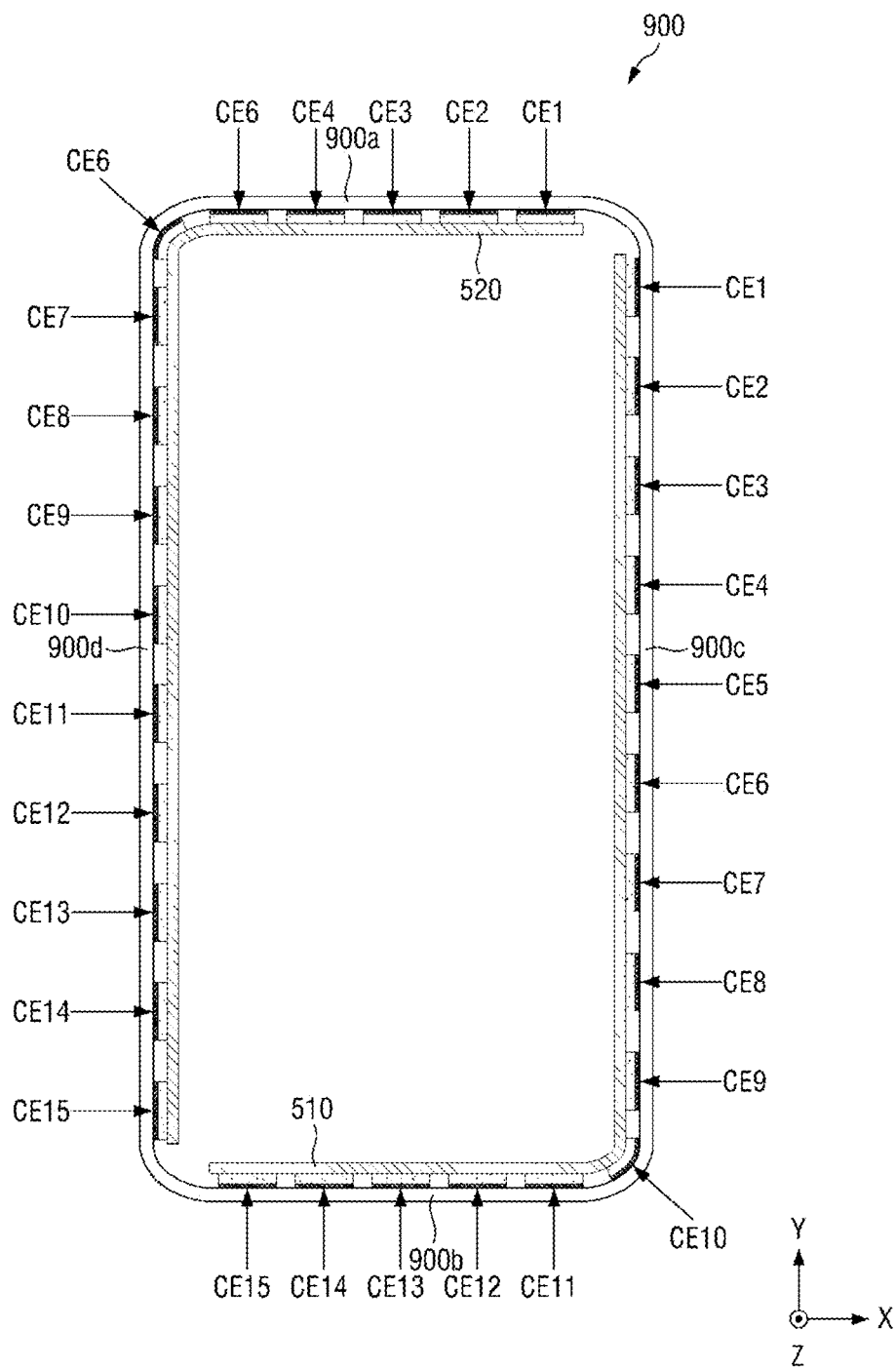
FIG. 39 is a plan view schematically showing a lower cover and a pressure sensor disposed on the lower cover according to another exemplary embodiment of the invention.
Figure 40:
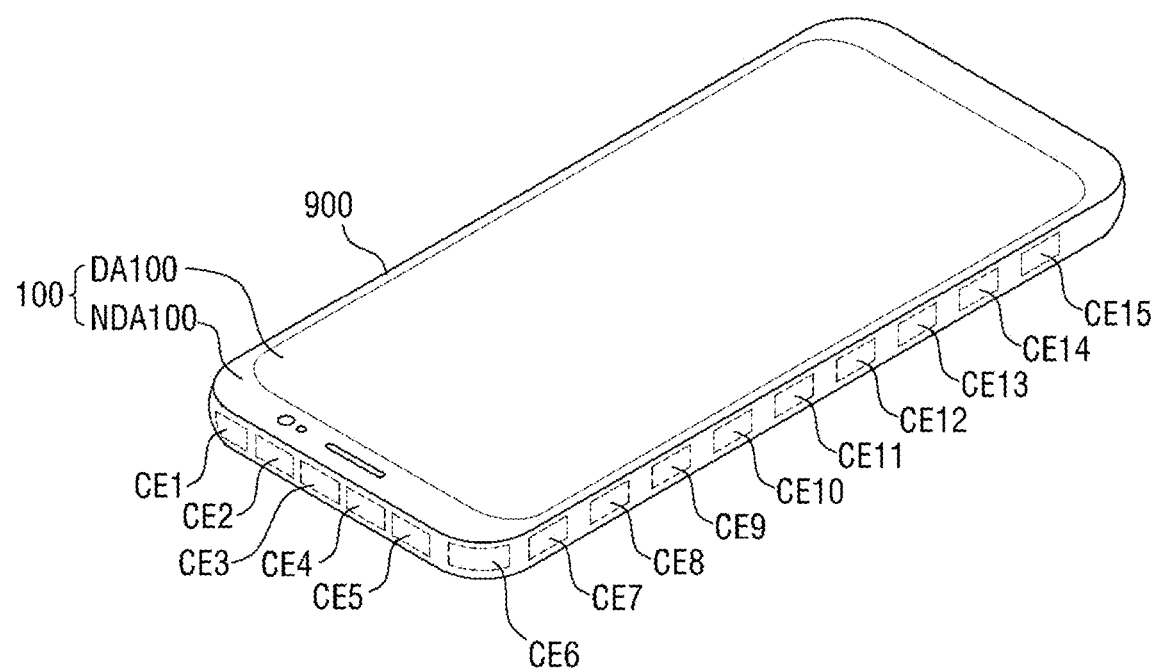
FIG. 40 is a perspective view schematically showing a pressure sensor of a display device according to another exemplary embodiment of the invention.

FIG. 39 is a plan view schematically showing a lower cover and a pressure sensor disposed on the lower cover according to another exemplary embodiment, and FIG. 40 is a perspective view schematically showing a pressure sensor of a display device according to another exemplary embodiment. The display device of FIGS. 39 and 40 is different from the aforementioned display device of FIGS. 31 to 36 in that pressure sensors are disposed to extend to the side surfaces and corners of a lower cover. Therefore, a description overlapping the exemplary embodiment of FIGS. 31 to 36 will be omitted, and differences will be mainly described.

Referring to FIGS. 39 and 40, in an exemplary embodiment, two pressure sensors 510 and 520 may be disposed at four side surfaces of a display device 10_4. For example, the first pressure sensor 510 may be disposed to extend from the second side surface 900b to the third side surface 900c of the lower cover 900, and the second pressure sensor 520 may be disposed to extend from the first side surface 900a to the fourth side surface 900d of the lower cover 900. As described above, the first pressure sensor 510 and the second pressure sensor 520 are disposed at the first to fourth side surfaces 900a, 900b, 900c, and 900d of the lower cover 900 corresponding to the four side surfaces of the display device 10_4, so that process convenience can be provided, and a non-display area from which no image is output can be utilized as a physical button for performing a specific function.

Figure 41:
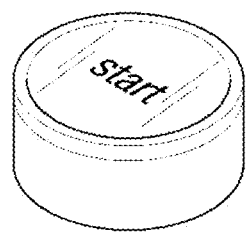
FIG. 41 is a perspective view schematically showing a display device according to another exemplary embodiment of the invention.
Figure 42:
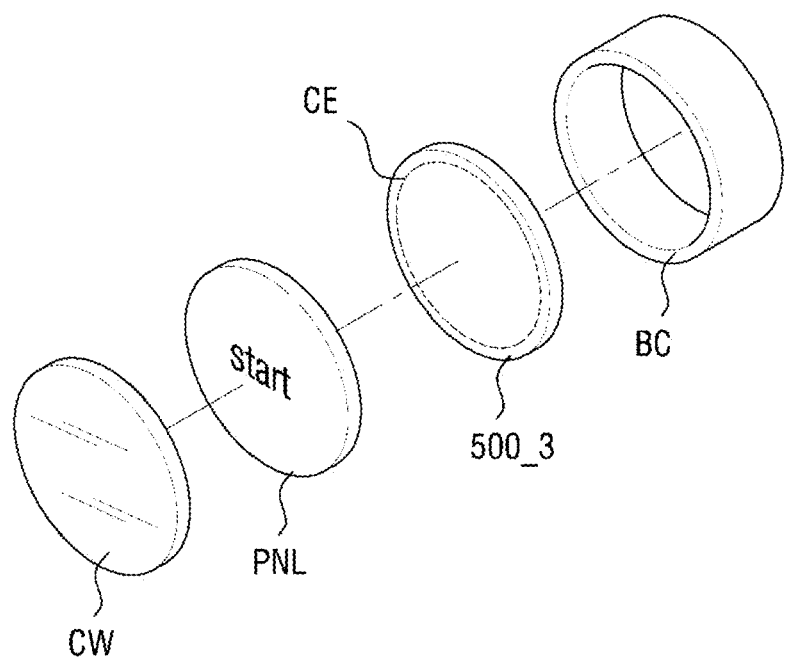
FIG. 42 is an exploded perspective view schematically showing a display device according to another exemplary embodiment of the invention.
Figure 43:
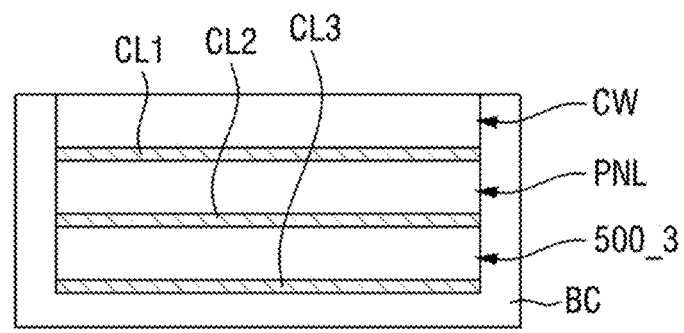
FIG. 43 is a cross-sectional view schematically showing a display device according to another exemplary embodiment of the invention.
Figure 44:
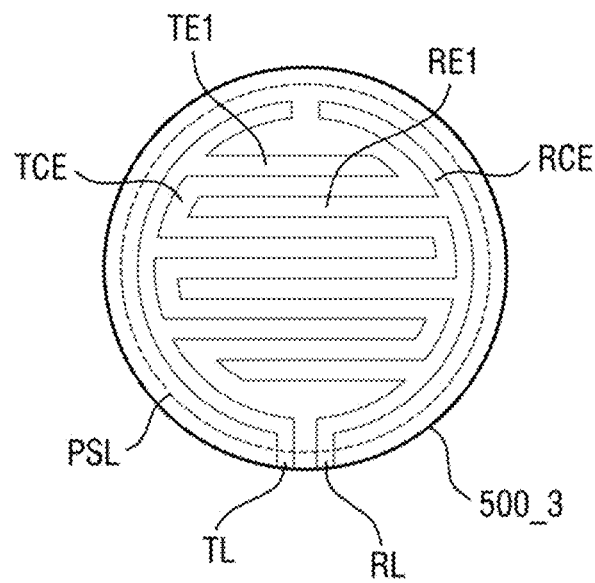
FIG. 44 is a plan view schematically showing a pressure sensor of a display device according to another exemplary embodiment of the invention.
Figure 45:
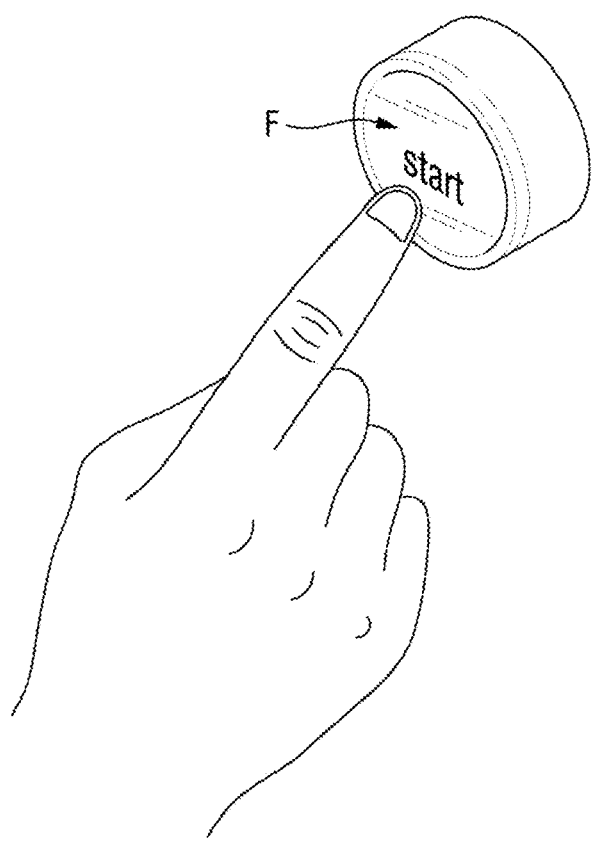
FIG. 45 is a view schematically showing the operation of a pressure sensor of another display device.

FIG. 41 is a perspective view schematically showing a display device according to another exemplary embodiment; FIG. 42 is an exploded perspective view schematically showing a display device according to another exemplary embodiment; FIG. 43 is a cross-sectional view schematically showing a display device according to another exemplary embodiment; FIG. 44 is a plan view schematically showing a pressure sensor of a display device according to another exemplary embodiment; and FIG. 45 is a view schematically showing the operation of a pressure sensor of another display device.

Referring to FIGS. 41 to 45, in an exemplary embodiment, a display device 10_5 may be a display device for vehicles. For example, the display device 10_5 may be a smart key button for starting a vehicle. However, the display device 10_5 is not limited thereto, and may be a vehicle instrument panel, a door lock button, or the like. Hereinafter, a case where the display device 10_5 is a smart key button will be described as an example.

The smart key button 10_5 may include a cover window CW, a display panel PNL under the cover window CW, a pressure sensor 500_3 under the display panel PNL, and a lower cover BC. The cover window CW, the display panel PNL, and the pressure sensor 500_3 may be accommodated in the lower cover BC. However, the inventive concepts are not limited thereto.

The cover window CW and the display panel PNL may be attached and fixed to each other by a first adhesive layer CL1, the display panel PNL and the pressure sensor 500_3 may be attached and fixed to each other by a second adhesive layer CL2, and the pressure sensor 500_3 and the bottom surface of the lower cover BC may be attached and fixed to each other by a third adhesive layer CL3.

In an exemplary embodiment, the pressure sensor 500_3 is disposed over the entire lower surface of the display panel PNL, but the inventive concepts are not limited thereto. The pressure sensor 500_3 may be disposed on a part of the lower surface of the display panel PNL, and the plurality of pressure sensors 500_3 may be disposed on the lower surface of the display panel PNL.

In an exemplary embodiment, the pressure sensor 500_3 may include a pressure sensing cell CE. Although it is shown in FIG. 42 that the pressure sensor 500_3 is provided with one pressure sensing cell CE, the inventive concepts are not limited thereto, and the pressure sensor 500_3 may be provided with a plurality of pressure sensing cells CE.

The pressure sensing cell CE may include a driving connection electrode TCE, a sensing connection electrode RCE, a plurality of driving electrodes TE1 extending from the driving connection electrode TCE, a plurality of sensing electrodes RE1 extending from the sensing connection electrode RCE, and a pressure sensing layer PSL. The driving connection electrode TCE and the sensing connection electrode RCE may be disposed corresponding to the shape of the smart key button 10_5. For example, when the smart key button 10_5 has a circular shape, the driving connection electrode RCE may have a curvature corresponding to the shape of the smart key button 10_5 and may be disposed in the form of a semi-circular rim, and the sensing connection electrode RCE may be symmetrical with the driving connection electrode TCE and may be disposed in the form of a semi-circular rim. The driving connection electrode TCE is connected to a driving line TL, and the sensing connection electrode RCE is connected to a sensing line RL. However, the inventive concepts are not limited thereto.

The driving electrodes TE1 and the sensing electrodes RE1 may be alternately arranged, and the pressure sensing layer PSL may be disposed to overlap the driving electrodes TE1 and the sensing electrodes RE1. As described above, since the contact area of the pressure sensing layer PSL with the plurality of driving electrodes TE1 and the plurality of sensing electrodes RE1 is changed depending on the pressure applied to the pressure sensing cell CE, the resistance value of the sensing line RL electrically connected to the plurality of sensing electrodes RE1 is changed, and thus a change in a current value or a voltage value is sensed, thereby sensing the pressure P pressed by a user's hand. Similar to this, the smart key button 10_5 is provided with the pressure sensor 500_3, so that the smart key button 10_5 may be used as a physical button, and the reliability of operation of the smart key button 10_5 can be improved.

As described above, according to the display device of exemplary embodiments, waterproofing members and pressure sensors have various shapes, so that it is possible to increase the degree of freedom in design of the display device and utilize the pressure sensor in various areas of the display device.

The effects of the present invention are not limited by the foregoing, and other various effects are anticipated herein.

Although exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A display device, comprising:
   a cover window comprising a light transmitting area and a light blocking area;
   a display panel disposed under the light transmitting area; and
   a pressure sensor disposed under the light blocking area, wherein:
   the light blocking area comprises a plurality of holes;
   the pressure sensor comprises:
   a plurality of opening portions corresponding to and exposing the plurality of holes; and
   a pressure sensing cell disposed between the plurality of opening portions;

the display device further comprises a bump disposed on the pressure sensing cell;

the bump is attached onto the pressure sensing cell by a first adhesive member; and the bump is attached to a back surface of the cover window by a second adhesive member.

2. The display device of claim 1, further comprising:

a middle frame disposed under the display panel, wherein a lower surface of the pressure sensor is supported by the middle frame.

3. The display device of claim 1, wherein the pressure sensing cell comprises a driving electrode and a sensing electrode, which are disposed on one surface of a first substrate, and a pressure sensing layer, which is disposed on one surface of a second substrate facing the one surface of the first substrate.

4. A display device, comprising:

a display panel;

a middle frame disposed under the display panel;

a lower cover disposed under the middle frame and comprising a bottom surface and side surfaces bent upward from the bottom surface; and a pressure sensor disposed on at least one of the side surfaces of the lower cover, wherein:

the side surfaces are disposed on planes intersecting a plane on which the bottom surface is disposed;

a surface of the pressure sensor facing the at least one of the side surfaces of the lower cover is covered by at least one of the side surfaces of the lower cover;

the pressure sensor comprises a pressure sensing cell; and the pressure sensing cell comprises a plurality of driving electrodes and a plurality of sensing electrodes, which are alternately arranged in a same direction and disposed on one surface of a first substrate, and a pressure sensing layer, which is disposed on one surface of a second substrate facing the one surface of the first substrate.

5. The display device of claim 4, wherein the side surfaces comprise:

first and second side surfaces facing each other in a first direction; and third and fourth side surfaces facing each other in a second direction perpendicular to the first direction.

6. The display device of claim 5, wherein the pressure sensor comprises:

a first pressure sensor disposed on the third side surface; and a second pressure sensor disposed on the fourth side surface.

7. The display device of claim 6, wherein:

the first pressure sensor is disposed to extend to the second side surface; and the second pressure sensor is disposed to extend to the first side surface.

8. The display device of claim 5, wherein:

the lower cover comprises a first corner region between the first side surface and the fourth side surface, a second corner region between the third side surface and the second side surface, a third corner region between the second side surface and the fourth side surface, and a fourth corner region between the third side surface and the first side surface; and the pressure sensor is disposed on at least one of the first to fourth corner regions.

9. The display device of claim 8, wherein the pressure sensor comprises:

a first pressure sensor disposed on the third side surface and the second corner region; and a second pressure sensor disposed on the fourth side surface and the first corner region.

10. The display device of claim 9, wherein the first pressure sensor is disposed to extend to the second side surface.

11. The display device of claim 10, wherein the second pressure sensor is disposed to extend to the first side surface.

* * * * *